United States Patent
Takenaka et al.

(10) Patent No.: US 9,032,203 B2
(45) Date of Patent: May 12, 2015

(54) KEY SETTING METHOD, NODE, SERVER, AND NETWORK SYSTEM

(71) Applicant: Fujitsu Limited, Kawasaki-shi, Kanagawa (JP)

(72) Inventors: Masahiko Takenaka, Kawasaki (JP); Tetsuya Izu, Ichikawa (JP); Kazuyoshi Furukawa, Kawasaki (JP); Hisashi Kojima, Yokosuka (JP)

(73) Assignee: Fujitsu Limited, Kawasaki (JP)

( * ) Notice: Subject to any disclaimer, the term of this patent is extended or adjusted under 35 U.S.C. 154(b) by 181 days.

(21) Appl. No.: 13/930,815

(22) Filed: Jun. 28, 2013

(65) Prior Publication Data
US 2013/0290701 A1    Oct. 31, 2013

Related U.S. Application Data

(63) Continuation of application No. PCT/JP2010/073813, filed on Dec. 28, 2010.

(51) Int. Cl.
*H04L 29/06* (2006.01)
*H04L 9/08* (2006.01)
(Continued)

(52) U.S. Cl.
CPC .......... *H04L 63/0428* (2013.01); *H04L 9/0833* (2013.01); *H04L 9/3215* (2013.01); *H04L 63/061* (2013.01); *H04W 12/04* (2013.01); *H04W 84/18* (2013.01); *H04W 12/02* (2013.01)

(58) Field of Classification Search
CPC . H04L 63/0428; H04L 9/0833; H04L 9/3215; H04L 63/061; H04W 12/04; H04W 84/18; H04W 12/02
USPC ......................................................... 713/153
See application file for complete search history.

(56) References Cited

U.S. PATENT DOCUMENTS 7,650,500 B2 * 1/2010 Matoba ........................ 713/163
2006/0251256 A1 11/2006 Asokan et al.
(Continued)

FOREIGN PATENT DOCUMENTS

JP    2003-348072    12/2003
JP    2006-135874    5/2006
(Continued)

OTHER PUBLICATIONS

Du et al. "A Pairwise Key Predistribution Scheme for Wireless Sensor Networks" ACM Transactions on Information and System Security, vol. 8, No. 2, May 2005, pp. 228-258.*
(Continued)

*Primary Examiner* — Saleh Najjar
*Assistant Examiner* — Oleg Korsak
(74) *Attorney, Agent, or Firm* — Staas & Halsey LLP

(57) ABSTRACT

A key setting method executed by a node within communication ranges of multiple ad-hoc networks, includes receiving encrypted packets encrypted by respective keys specific to gateways and broadcasted from the gateways in the ad-hoc networks; detecting connection with a mobile terminal communicable with a server retaining the keys specific to the gateways in each ad-hoc network among the ad-hoc networks; transmitting to the server when connection with the mobile terminal is detected, the encrypted packets via the mobile terminal; receiving from the server via the mobile terminal, the keys that are specific to the gateways in the ad-hoc networks and that are for decrypting each encrypted packet among the encrypted packets; and setting each of the received keys as a key to encrypt data that is to be encrypted in the node and decrypt data that is to be decrypted in the node.

18 Claims, 65 Drawing Sheets

(51) Int. Cl.
*H04L 9/32* (2006.01)
*H04W 12/04* (2009.01)
*H04W 84/18* (2009.01)
*H04W 12/02* (2009.01)

(56) References Cited

U.S. PATENT DOCUMENTS

| | | | |
|---|---|---|---|
| 2007/0064950 | A1 | 3/2007 | Suzuki et al. |
| 2007/0078817 | A1* | 4/2007 | Girao et al. ............ 707/2 |
| 2007/0253376 | A1 | 11/2007 | Bonta et al. |
| 2007/0291682 | A1* | 12/2007 | Anjum ............ 370/328 |
| 2008/0261509 | A1* | 10/2008 | Sen ............ 455/1 |

FOREIGN PATENT DOCUMENTS

| | | |
|---|---|---|
| JP | 2007-13386 | 1/2007 |
| JP | 2007-74393 | 3/2007 |
| JP | 2007-88799 | 4/2007 |
| JP | 2008-537381 | 9/2008 |
| JP | 2009-81854 | 4/2009 |
| JP | 2009-535921 | 10/2009 |

OTHER PUBLICATIONS

Ren et al. "Secure and Efficient Multicast in Wireless Sensor Networks Allowing Ad hoc Group Formation" IEEE Transactions on Vehicular Technology, vol. 58, No. 4, May 2009, pp. 2018-2029.*

C Amtepe et al. "Key Distribution Mechanisms for Wireless Sensor Networks: a Survey" Technical Report TR-05-07 (Mar. 23, 2005), pp. 1-27.*

Yick et al. "Wireless sensor network survey", Computer Networks 52 (2008) pp. 2292-2330.*

Xiao et al. "A survey of key management schemes in wireless sensor networks", Computer Communications 30 (2007) pp. 2314-2341.*

Simplicio Jr. et al. "A survey on key management mechanisms for distributed Wireless Sensor Networks", Computer Networks 54 (Apr. 18, 2010) pp. 2591-2612.*

International Search Report mailed Feb. 1, 2011 in corresponding International Application No. PCT/JP2010/073813.

PCT International Preliminary Report on Patentability mailed Jul. 11, 2013 in corresponding International Application No. PCT/JP2010/073813.

* cited by examiner

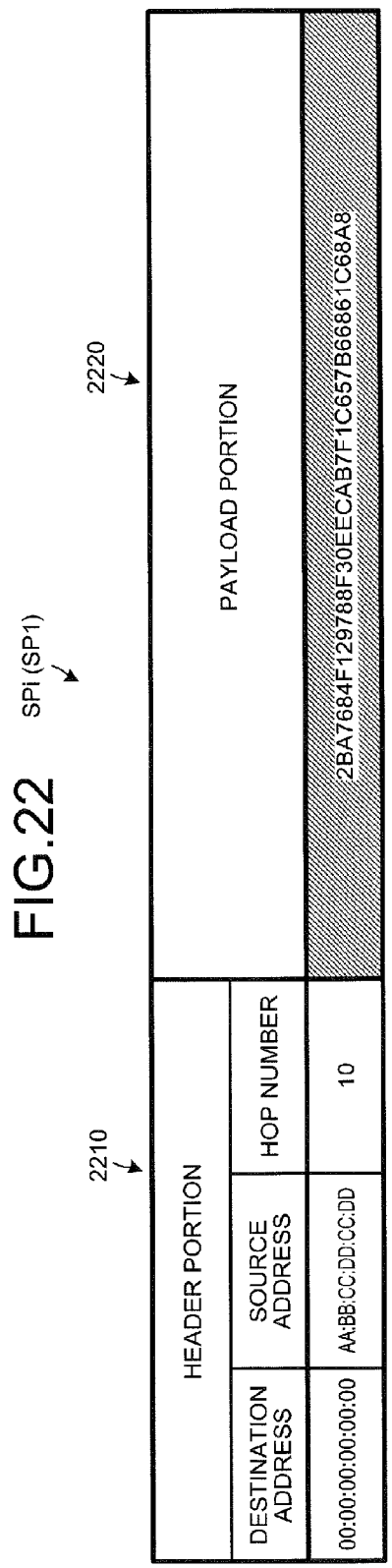

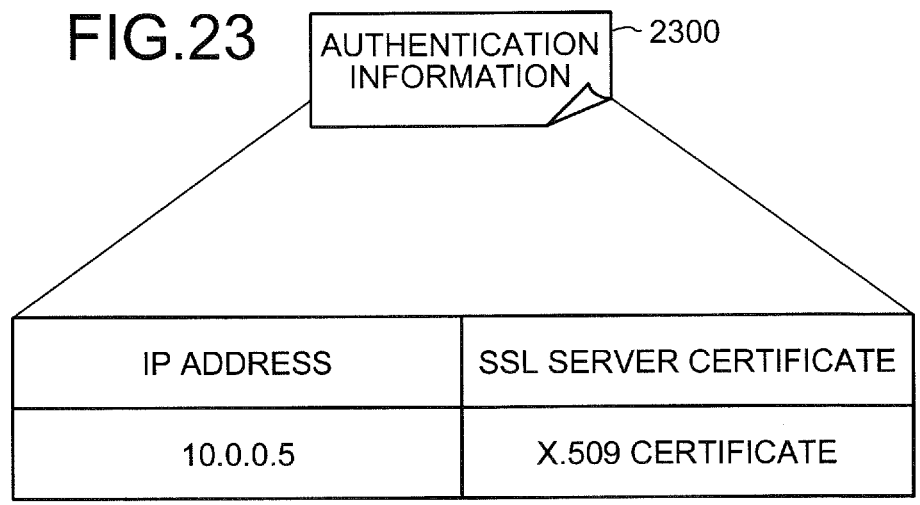
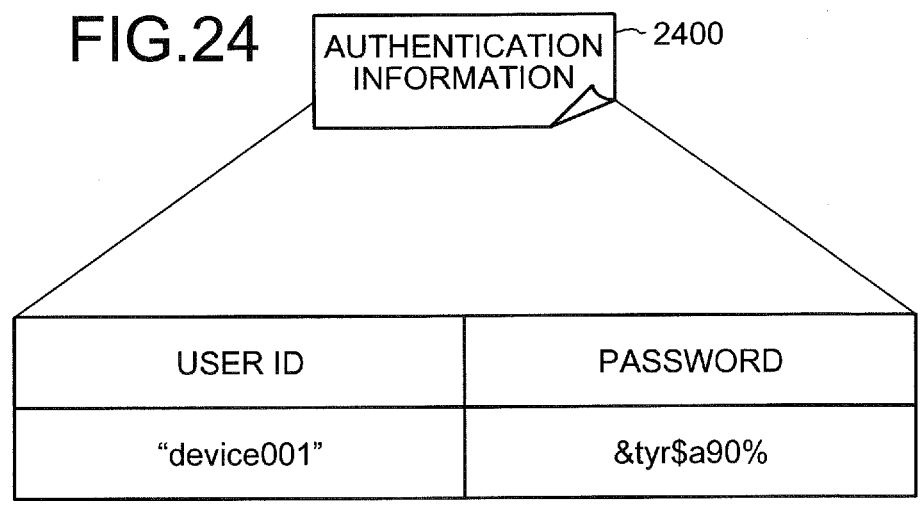

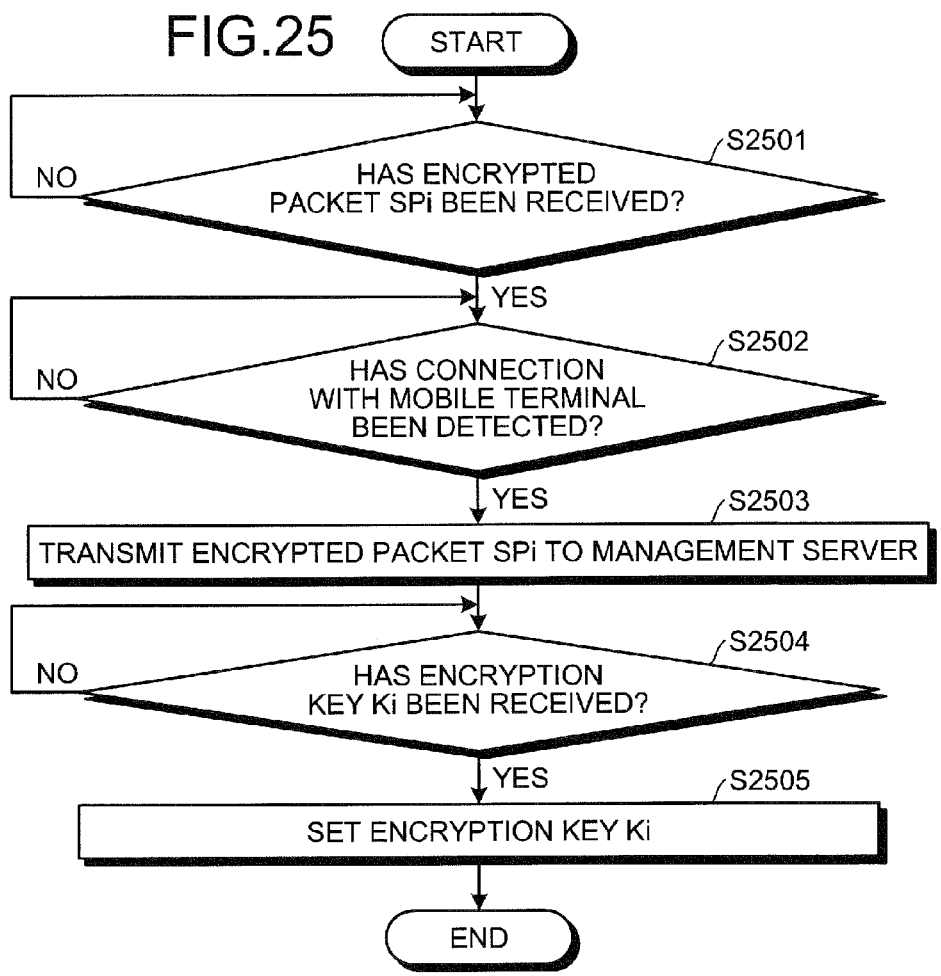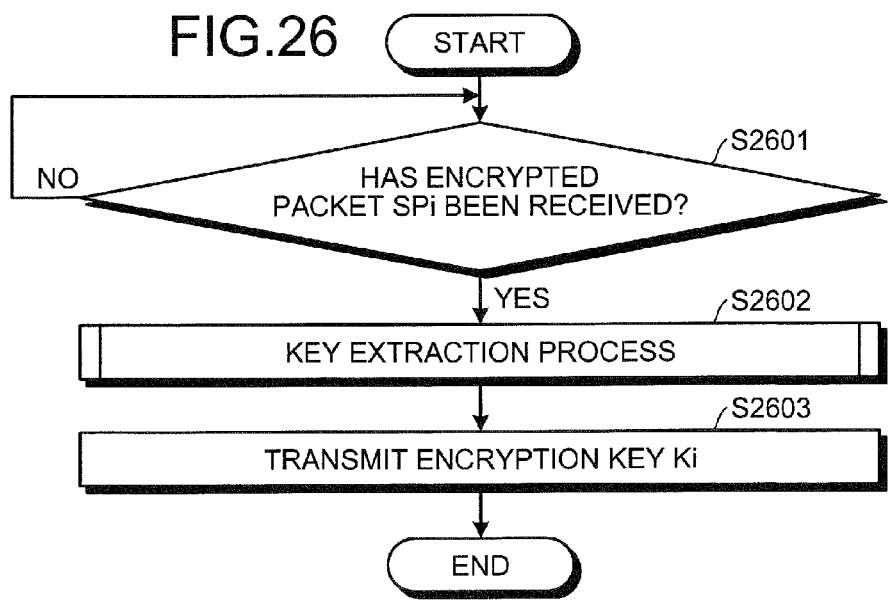

(B)

(D)

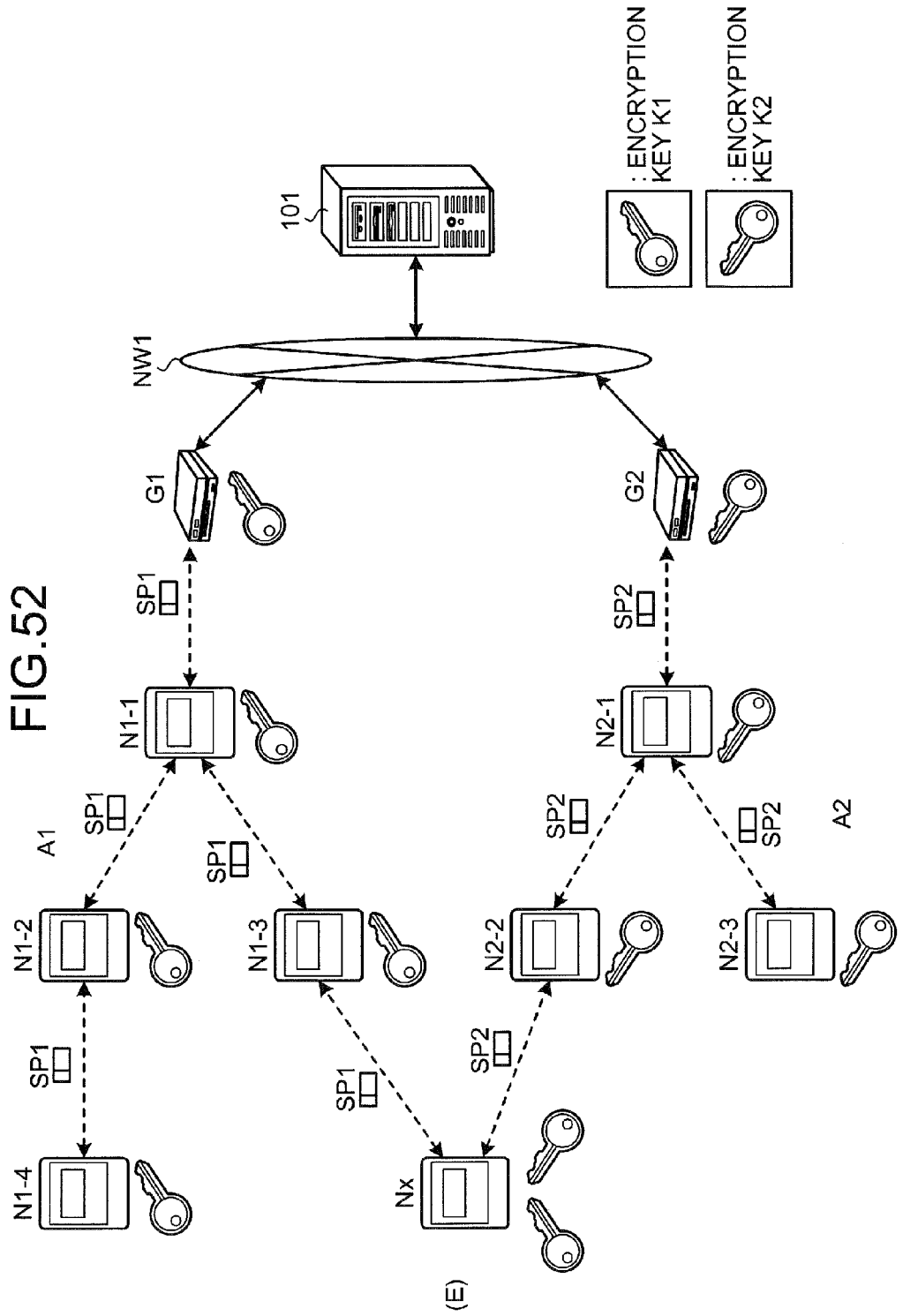

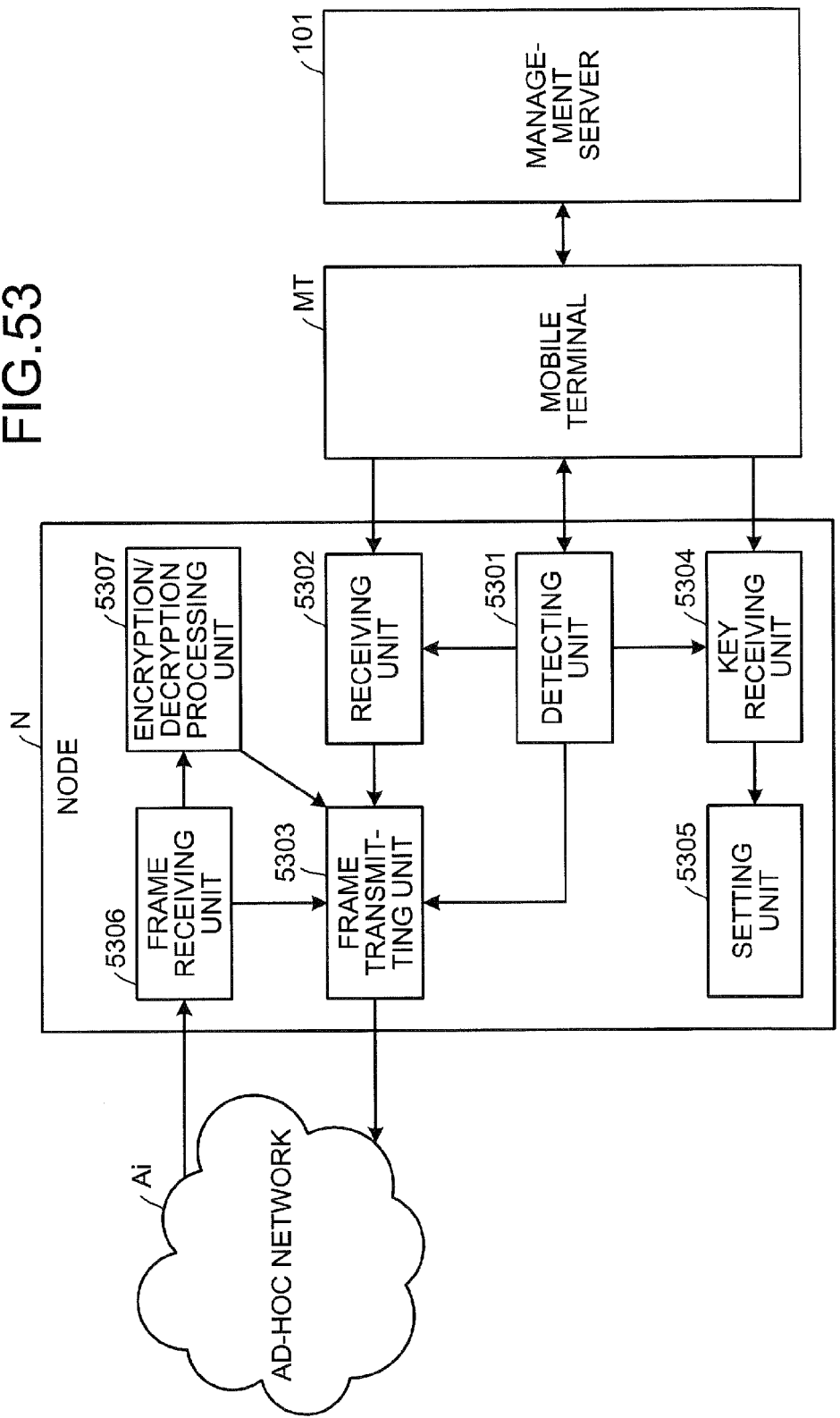

FIG.54                5400

| COMMAND | USER ID |
|---|---|
| search gw | D1 |

| USER ID | NODE ID | GATEWAY ID | ENCRYPTION KEY |
|---------|---------|------------|----------------|
| D1 | Nx | Gi | Ki |

AFi

| USER ID | NODE ID | GATEWAY ID |
|---------|---------|------------|
| D1 | Nx | Gi |

FIG.72  AF1

| USER ID | NODE ID | GATEWAY ID | ENCRYPTION KEY | MAIN/SUB |
|---------|---------|------------|----------------|----------|
| D1 | Nx | G1 | K1 | MAIN |

FIG.73  AF2

| USER ID | NODE ID | GATEWAY ID | ENCRYPTION KEY | MAIN/SUB |
|---------|---------|------------|----------------|----------|
| D1 | Nx | G2 | K2 | SUB |

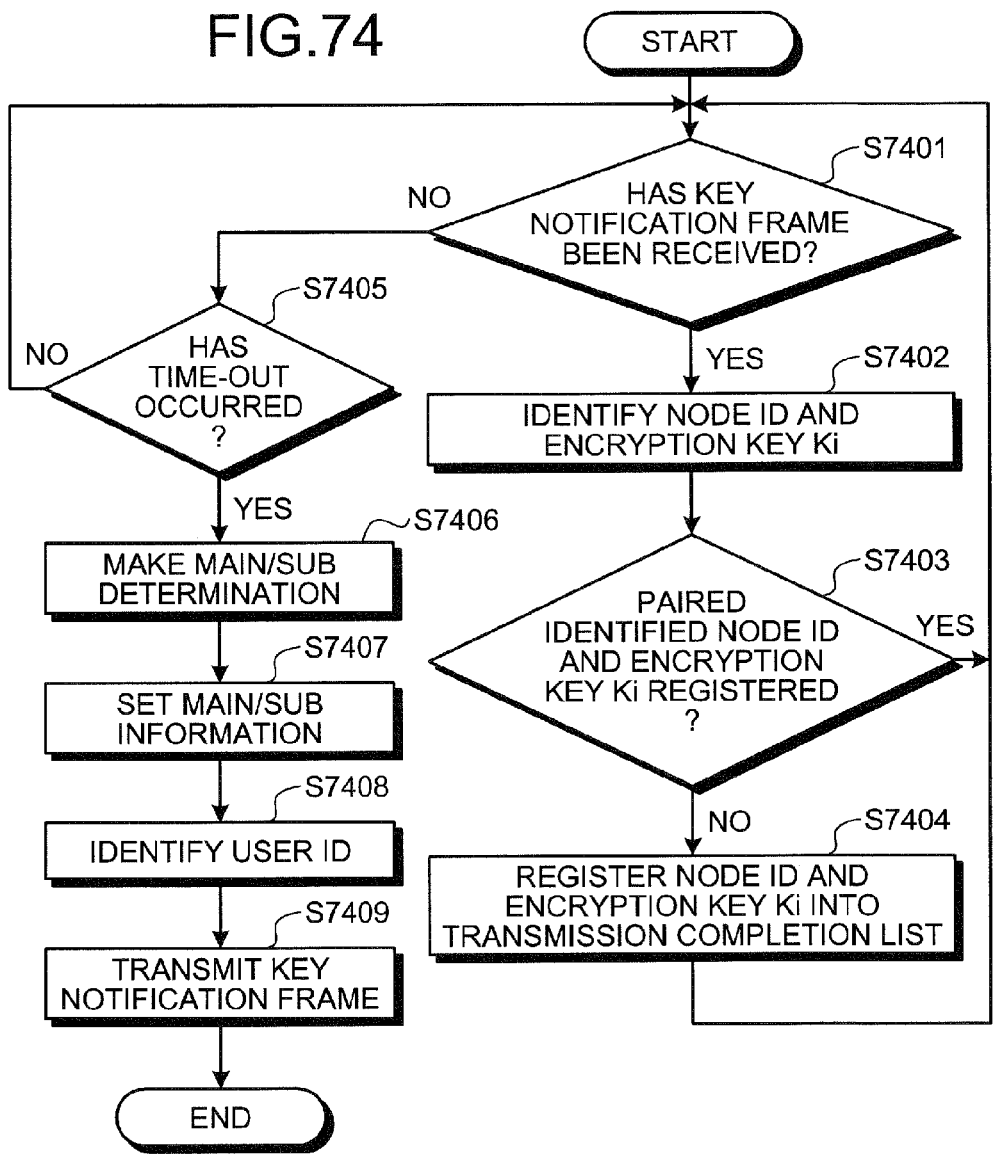

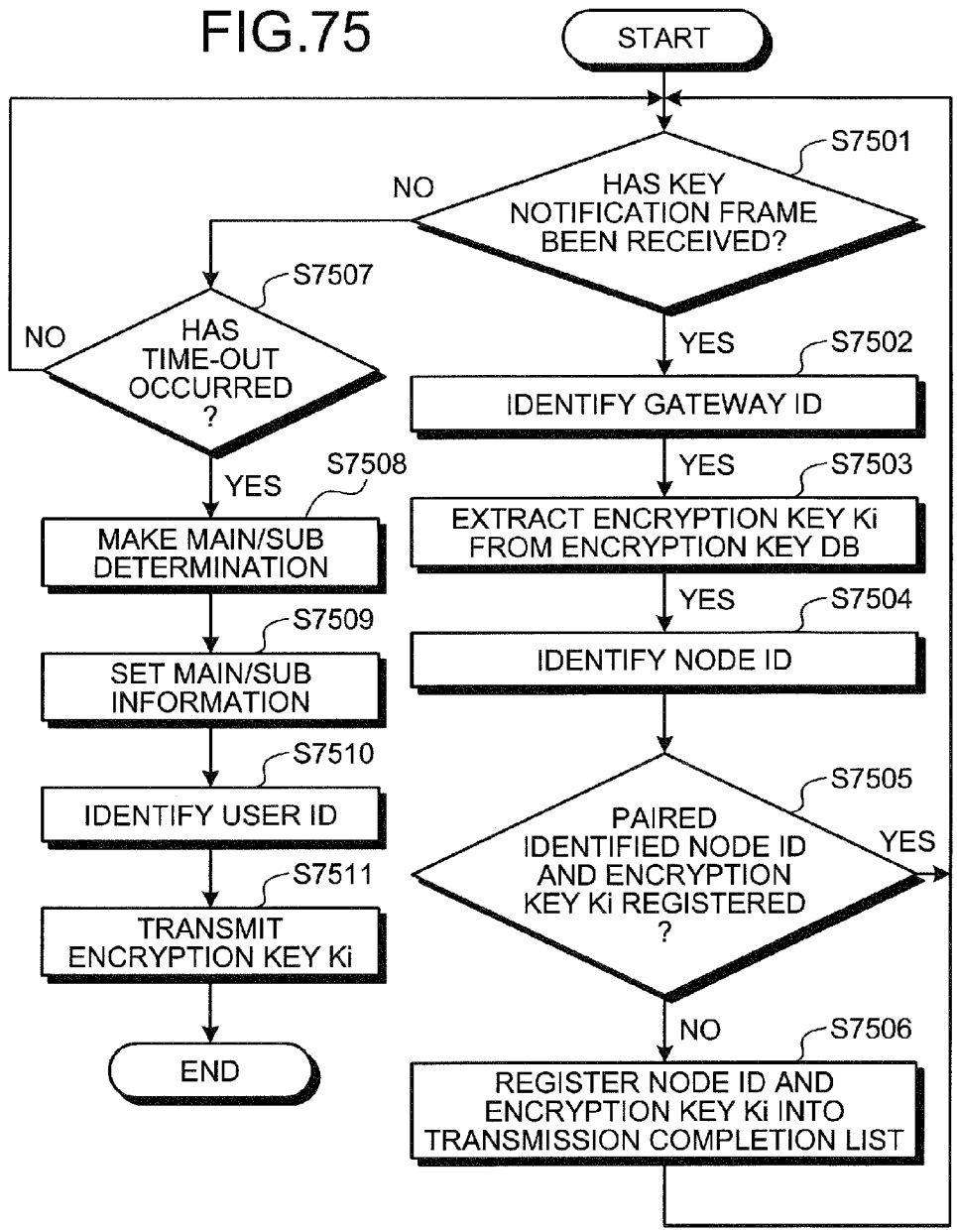

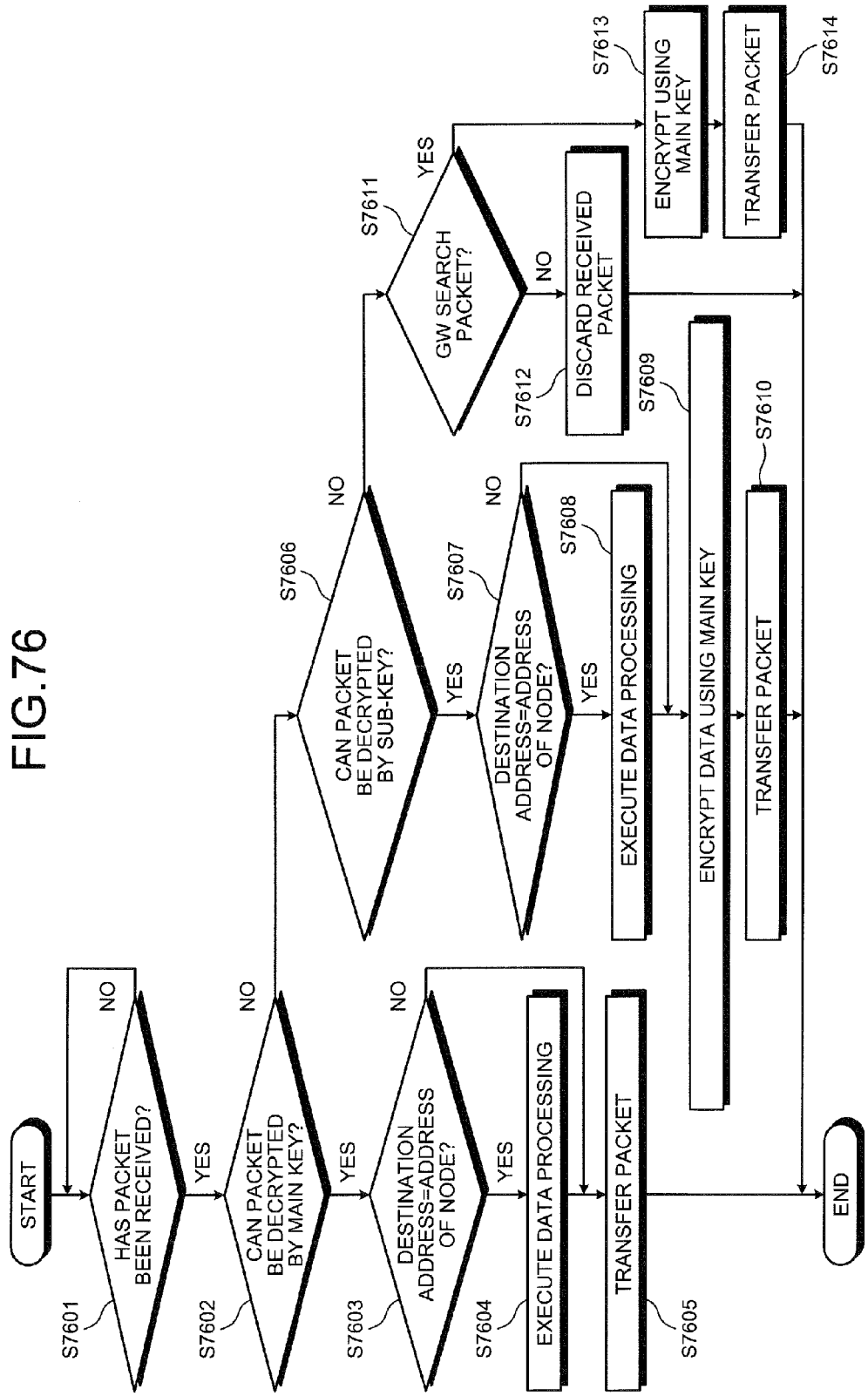

US 9,032,203 B2

KEY SETTING METHOD, NODE, SERVER, AND NETWORK SYSTEM

CROSS REFERENCE TO RELATED APPLICATIONS

This application is a continuation application of International Application PCT/JP2010/073813, filed on Dec. 28, 2010 and designating the U.S., the entire contents of which are incorporated herein by reference.

FIELD

The embodiments discussed herein are related to a key setting method, a node, a server, and a network system for encrypting data.

BACKGROUND

An ad-hoc network is a kind of a self-configuring network linked through wireless communication. The ad-hoc network is made up of multiple nodes. The nodes in the ad-hoc network transmit and receive packets through multi-hop communication. The multi-hop communication is a technique of allowing nodes not present in each other's communication ranges to communicate via other nodes present in the communication ranges of the nodes.

If the ad-hoc network is connected to another network such as the Internet, a local area network (LAN), and a wide area network (WAN), a relay device called gateway is used to transfer communication between networks.

If the number of nodes belonging to the ad-hoc network exceeds a certain level, processing becomes difficult for one gateway. In such a case, multiple gateways are disposed to distribute the processing.

As described above, with the multi-hop communication in the ad-hoc network, communication between nodes is autonomously performed through a path selected by a relay node and therefore, the path is momentarily changed depending on the state of each node and the communication environment. This is true in the ad-hoc network with multiple gateways as well and, when a given node communicates with another network, the gateway that relays the communication generally changes depending on the state of the network. The ad-hoc network is characterized by having autonomy and robustness from such free path selection.

On the other hand, a technique that utilizes the ad-hoc network includes a system in which nodes capable of wireless communication are incorporated into electricity meters of households so that operations such as checking of the meters are performed through the ad-hoc network without an operator physically going to the actual sites. The ad-hoc network further handles personal information such as electricity usage of households is required to perform secure communication in terms of ensuring confidentiality and preventing tampering.

Therefore, packets transmitted and received between nodes in the ad-hoc network are conventionally encrypted to ensure secure communication. In general, one key for encryption is used in the system and the nodes and the gateways retain this key to perform secure communication.

However, if all the nodes in the system use a common encryption key and one node is analyzed, whereby the key is leaked, the contents of communications on the entire system are at risk of being leaked. Therefore, multiple keys have to be used in the system to reduce risk in the event of key leakage.

At the time of initial introduction, etc. of a new node into a system, the new node cannot perform secure communication with other nodes in an ad-hoc network until an encryption key is set. Therefore, since it is difficult to automatically set an encryption key for the new node through the ad-hoc network, an operator has to physically go to the actual site to set the encryption key.

Prior arts related to secure communication include, for example, a technique of managing an encryption key of a network in which communication is performed by broadcasting (see, e.g., Japanese Laid-Open Patent Publication No. 2003-348072) as well as a technique for stably executing key exchange at the start of communication in an ad-hoc network (see, e.g., Japanese Laid-Open Patent Publication No. 2007-88799). A further related technique is for allowing each node in an ad-hoc network to select an adaptive gateway (see, e.g., Japanese Laid-Open Patent Publication No. 2009-81854).

Prior arts related to secure communication include, for example, a technique in which a terminal utilizes another communication device different from the terminal to acquire various types of communication control information required for providing communication control from an authentication server (see, e.g., Japanese Laid-Open Patent Publication No. 2006-135874). A further technique is related to an ad-hoc network in which each communication terminal performs mutual authentication with a nearby communication terminal by using a public key (see, e.g., Japanese Laid-Open Patent Publication No. 2007-13386).

However, if an encryption key set in nodes in an ad-hoc network is changed for each gateway, it is problematically difficult to identify a gateway to which a new node belongs at the time of initial introduction, etc. of the new node. For example, even if candidate gateways can be narrowed down by an address of the installation location of a new node, a communication state changes due to factors such as weather and a positional relationship with nearby buildings. This causes a problem in that an operator must go to the actual site and confirm which gateway is actually communicable, resulting in increases in working hours and workload required for the encryption key setting operation performed by the operator.

It is further problematic that setting only a portion of keys in an introduced new node disables autonomous gateway selection, which is one of the features of the ad-hoc network, and reduces robustness, potentially resulting in a reduction in communication efficiency.

In the case of using a common encryption key in a system, if the encryption key is leaked for some reason (e.g., physical analysis of a node), the entire system is affected. Therefore, all the contents of communications in the system are problematically at risk of being leaked. Thus, multiple keys have to be used in the system to reduce risk in the event of key leakage.

On the other hand, if multiple keys are set in all the nodes in a system, encryption and decryption processes are executed for respective keys and packets encrypted by respective keys are distributed in the ad-hoc network, which may cause breakdown of the ad-hoc network.

SUMMARY

According to an aspect of an embodiment, a key setting method executed by a node within communication ranges of multiple ad-hoc networks, includes receiving encrypted packets encrypted by respective keys specific to gateways and broadcasted from the gateways in the ad-hoc networks; detecting connection with a mobile terminal communicable with a server retaining the keys specific to the gateways in each ad-hoc network among the ad-hoc networks; transmitting to the server when connection with the mobile terminal is detected, the encrypted packets via the mobile terminal; receiving from the server via the mobile terminal, the keys that are specific to the gateways in the ad-hoc networks and that are for decrypting each encrypted packet among the encrypted packets; and setting each of the received keys as a key to encrypt data that is to be encrypted in the node and decrypt data that is to be decrypted in the node.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 22 is an explanatory view (part 2) of an example of a data structure of the encrypted packet according to the first embodiment;

FIG. 23 is an explanatory view of an example of authentication information of the management server;

FIG. 24 is an explanatory view of an example of the authentication information of a mobile terminal;

FIG. 25 is a flowchart of an example of a key setting process procedure of the node according to the first embodiment;

FIG. 26 is a flowchart of an example of a key providing process procedure of the management server;

FIGS. 48, 49, 50, 51, and 52 are explanatory views of an example of introduction of a new node at a boundary between (within communication ranges of) multiple ad-hoc networks of the downstream type according to the third embodiment;

FIG. 53 is a block diagram of a functional configuration example of a node according to the third embodiment;

FIG. 54 is an explanatory view of a specific example of transmission instruction data for a GW search frame according to the third embodiment;

FIG. 72 is an explanatory view of a first example of setting the key notification frame by a setting unit according to the fourth embodiment;

FIG. 73 is an explanatory view of a second example of setting the key notification frame by the setting unit according to the fourth embodiment;

FIG. 74 is a flowchart (part 1) of an example of the key providing process procedure of the management server according to the fourth embodiment;

FIG. 75 is a flowchart (part 2) of an example of the key providing process procedure of the management server according to the fourth embodiment; and FIG. 76 is a flowchart of the communication process procedure of the boundary node according to the fourth embodiment.

DESCRIPTION OF EMBODIMENTS

Embodiments of a key setting method, a node, a server, and a network system according to the present invention will be described in detail with reference to the accompanying drawings. An ad-hoc network is an autonomous, distributed wireless network made up of a group of nodes capable of wireless connection without the need for an access point as in the case of a wireless local area network (LAN). In this description, a gateway (so-called sink node) is considered to be included in an ad-hoc network.

In some ad-hoc networks, for security, etc., the encryption key set in the nodes of the ad-hoc network is changed for each gateway. Changing the encryption key for each gateway in this way arises in a situation that prevents autonomous gateway selection, which can be performed in an ad-hoc network that does not consider security or in an ad-hoc network having one encryption key shared by all the nodes. As a result, robustness, which is one of the features of the ad-hoc network, is reduced, whereby communication efficiency may be reduced.

Figure 1:
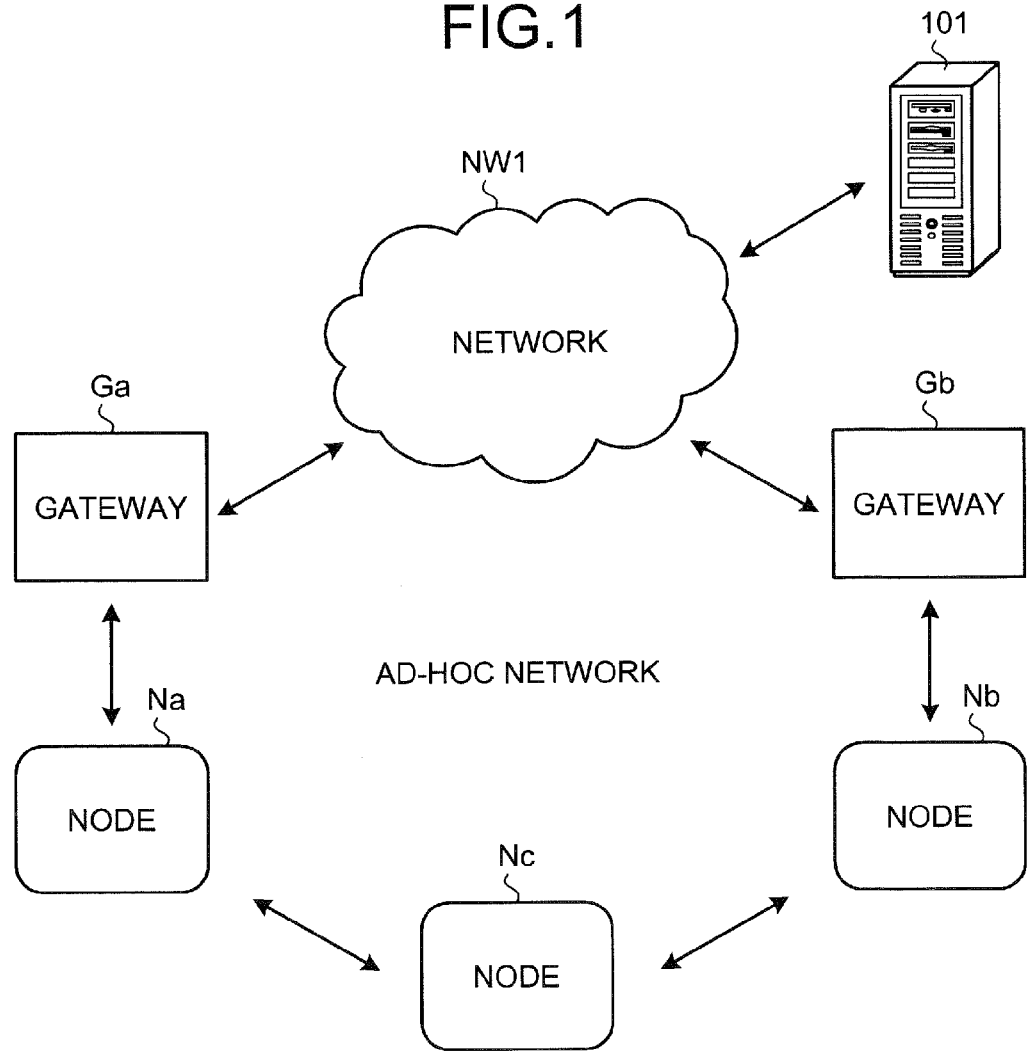
FIG. 1 is an explanatory view of a first example of a network system.

FIG. 1 is an explanatory view of a first example of a network system. The first example represents a network system that does not take security into consideration, i.e., a network system without an encryption key. In FIG. 1, a management server 101 and a group of gateways (Ga, Gb) can communicate via a network NW1. In FIG. 1, for simplicity of description, the number of gateways is two and the number of nodes is three. Since no consideration is given to security, no encryption key exists.

A node Nc is within communication ranges of nodes Na and Nb. The node Nc can communicate with the node Na or the node Nb depending on the communication state for communication with the management server 101 through the network NW1 via either of the gateways (Ga or Gb). Although autonomous gateway selection is enabled, the first example has a problem of security because no encryption key is used.

Figure 2:
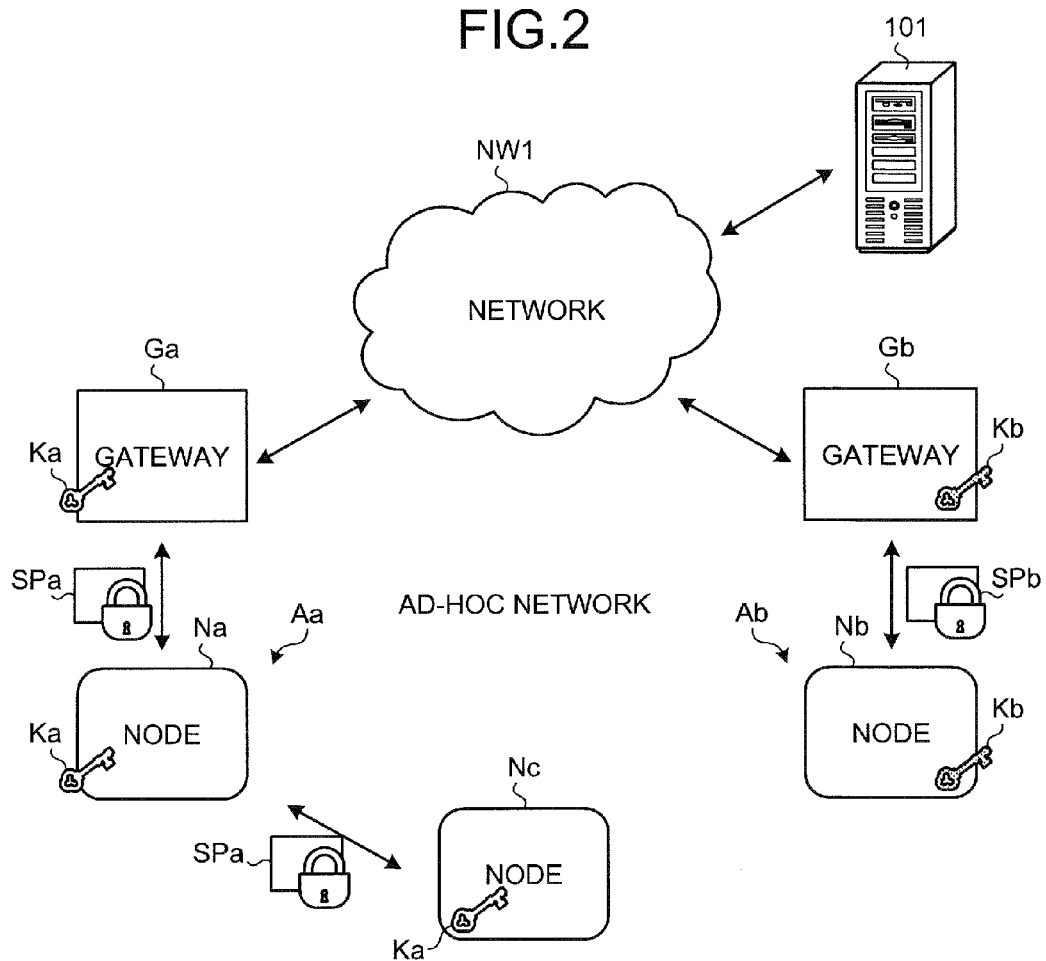
FIG. 2 is an explanatory view of a second example of a network system.

FIG. 2 is an explanatory view of a second example of a network system. The second example represents a network system that takes security into consideration, i.e., a network system with encryption keys. Constituent elements identical to those depicted in FIG. 1 are denoted by the same reference numerals used in FIG. 1 and will not be described. In FIG. 2, since security is considered, the nodes Na and Nc belong to the gateway Ga and the node Nb belongs to the gateway Gb.

Therefore, in FIG. 2, an ad-hoc network Aa made up of the gateway Ga and the nodes Na and Nc retains an encryption key Ka. An encrypted packet SPa is transmitted in the ad-hoc network Aa. An ad-hoc network Ab made up of the gateway Gb and the node Nb retains an encryption key Kb. An encrypted packet SPb is transmitted in the ad-hoc network Ab. In this case, the node Nc cannot communicate with the gateway Gb of the ad-hoc network Ab.

In FIGS. 1 and 2, if only the communication between the nodes Na and Nc is disconnected at a given point in time consequent to the weather, etc., the node Nc can communicate via the node Nb in FIG. 1; however, the communication through the encrypted packet SPb is interrupted in the node Nc in FIG. 2. Therefore, if security is considered as depicted in FIG. 2, autonomous gateway selection is disabled and robustness is reduced, causing reduction in communication efficiency.

On the other hand, it is conceivable that multiple encryption keys are set in each node of the ad-hoc network to prevent reductions in robustness.

Figure 3:
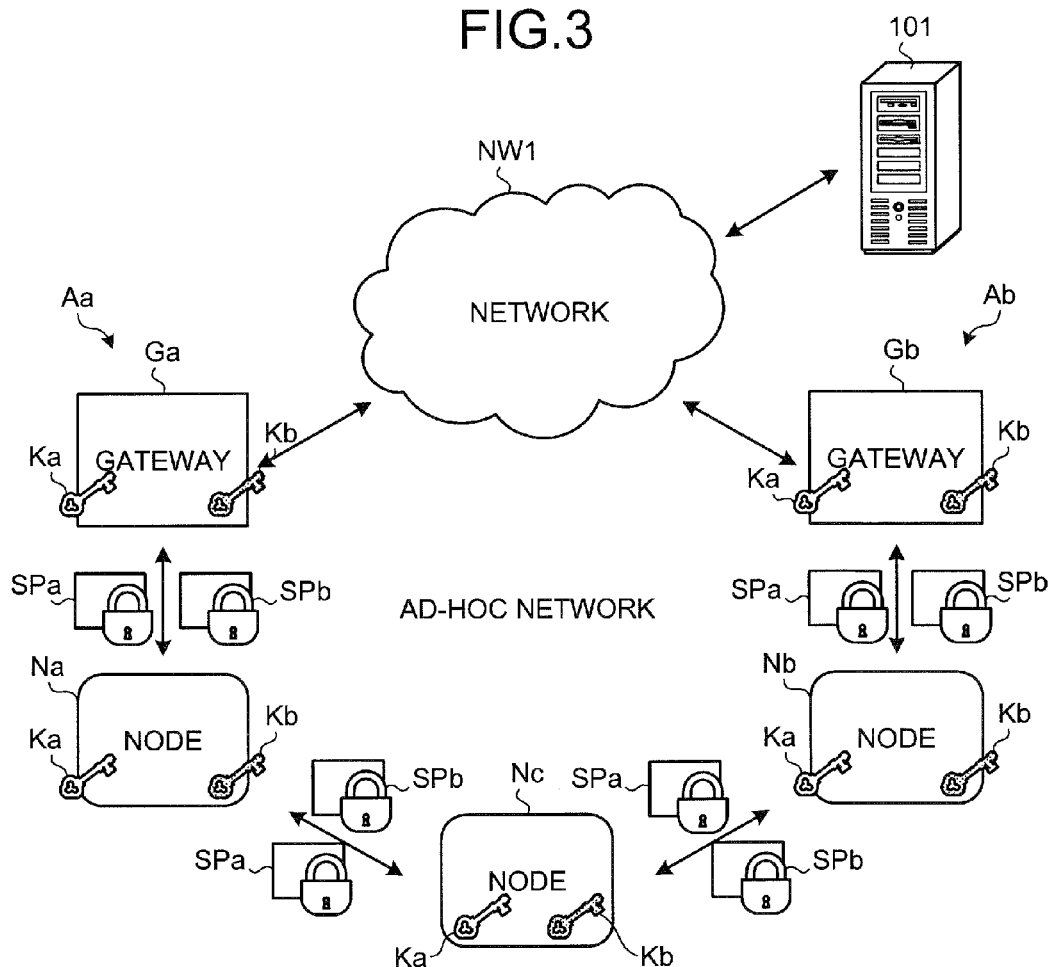
FIG. 3 is an explanatory view of a third example of a network system.

FIG. 3 is an explanatory view of a third example of a network system. The third example represents a network system that takes security into consideration and maintains the robustness. Constituent elements identical to those depicted in FIGS. 1 and 2 are denoted by the same reference numerals used in FIGS. 1 and 2, and will not be described. In FIG. 3, each of the gateways Ga, Gb and the nodes Na to Nc retains the encryption keys Ka and Kb.

In this case, even if only the communication between the nodes Na and Nc is disconnected at a given point in time consequent to the weather, etc., the node Nc can perform communication through the encrypted packet SPb in FIG. 3. However, if multiple (m) encryption keys are set in n nodes, the volume of processing using multiple encryption keys is increased m-fold at each node. In the worst case, the volume of communication increases by a factor of $n^m$ (m-th power of n), which may cause breakdown of the ad-hoc network, and this phenomenon becomes more prominent as the number of gateways increases.

For example, in the case of FIG. 3, the amount of processing at each of the nodes Na to Nc is doubled and the volume of communication is increased by a factor of $3^2=9$ in the worst case. Therefore, in the ad-hoc networks Aa and Ab in which one of the encryption keys Ka and Kb is set to each of the gateways Ga and Gb as depicted in FIG. 2, the number of nodes retaining multiple encryption keys must be minimized.

In this embodiment, although an ad-hoc network is constructed with consideration given to security (with an encryption key set) for each gateway, multiple encryption keys are given only to a node newly set within communication rages of multiple ad-hoc networks.

Figure 4:
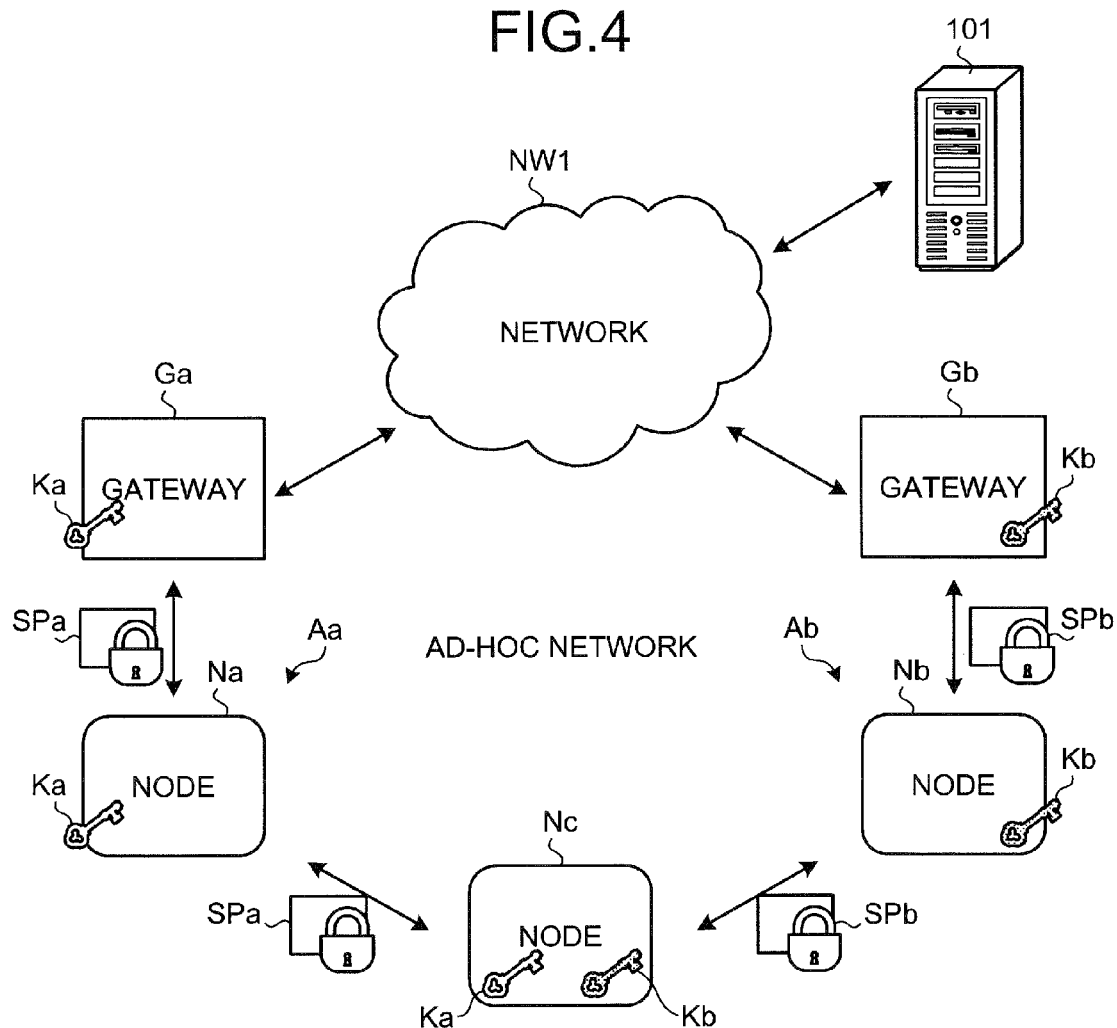
FIG. 4 is an explanatory view of a fourth example of a network system.

FIG. 4 is an explanatory view of a fourth example of a network system. The fourth example represents a network system that takes security into consideration, maintains robustness, and has better communication efficiency. Constituent elements identical to those depicted in FIGS. 1 to 3 are denoted by the same reference numerals used in FIGS. 1 to 3 and will not be described. In FIG. 4, the gateway Ga and the node Na in the ad-hoc network Aa retain the encryption key Ka. The gateway Gb and the node Nb in the ad-hoc network Ab retain the encryption key Kb. Only the node Nc in the both communication ranges of the ad-hoc networks Aa and Ab retains the encryption keys Ka and Kb.

In the fourth example, the respective specific encryption keys Ka and Kb are set in the ad-hoc networks Aa and Ab. Therefore, security can be maintained.

Since the encryption keys Ka and Kb are set in the node Nc, if communication with one of the nodes Na and Nb is interrupted, communication can be performed through the other path. Therefore, a gateway can be selected autonomously and drops in robustness can be prevented. Since the encryption keys Ka and Kb are set in the node Nc, a reduction of risk in the event of key leakage can be achieved.

Since the gateway Ga and the node Na has only the encryption key Ka and the gateway Gb and the node Nb has only the encryption key Kb, the volume of processing and the volume of communication do not increase at the nodes and therefore, the ad-hoc networks Aa and Ab do not break down. Thus, communication efficiency can be improved in the ad-hoc networks Aa and Ab.

Figure 5:
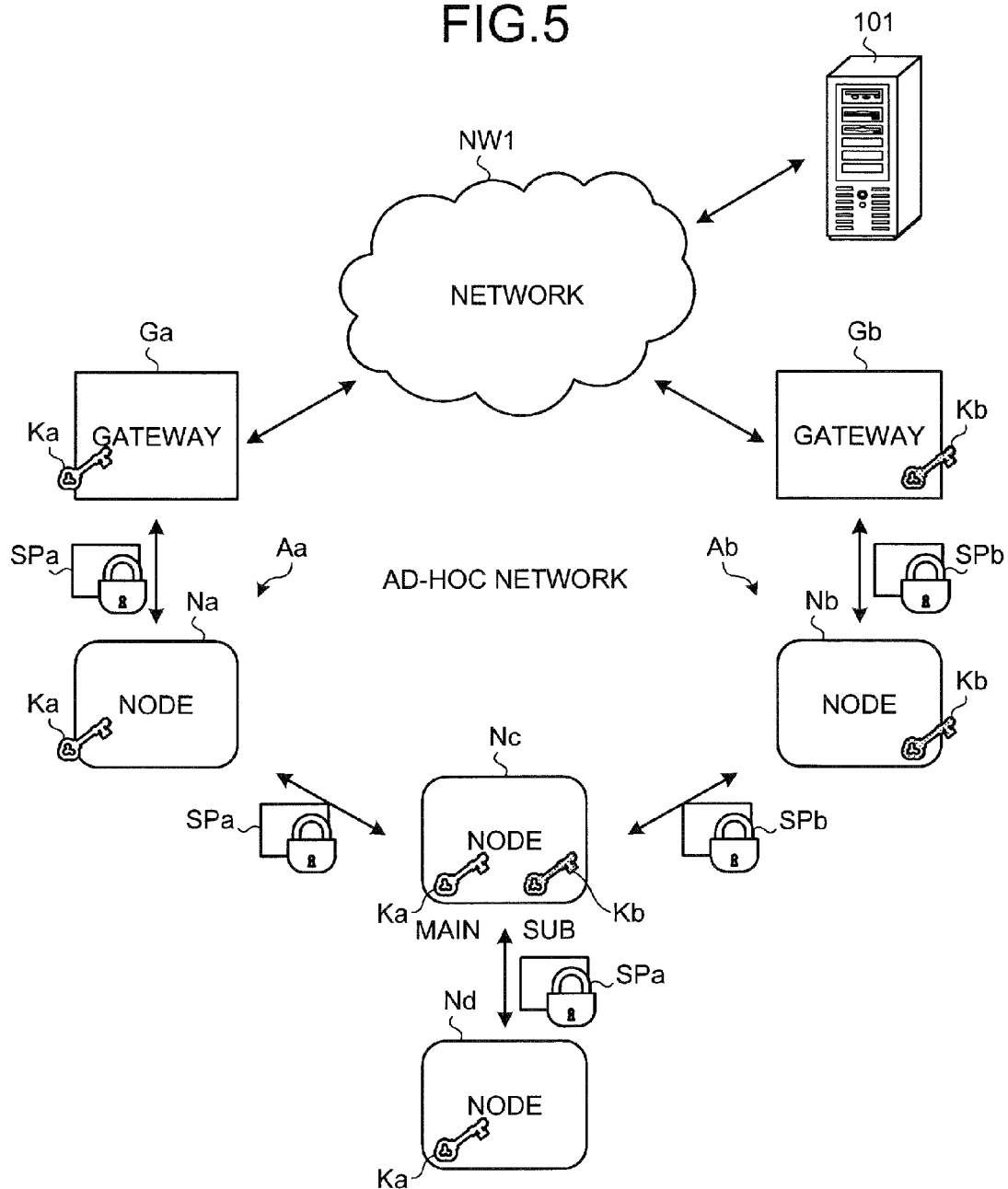
FIG. 5 is an explanatory view of a fifth example of a network system.

FIG. 5 is an explanatory view of a fifth example of a network system. The fifth example is an example when a node Nd is added as a subordinate of the node Nc in the fourth example depicted in FIG. 4. Although the node Nc retains the encryption keys Ka and Kb to enable autonomous selection of the gateways Ga and Gb, one of the keys is set as a main key (e.g., the encryption key Ka) while the other is set as a sub-key (e.g., the encryption key Kb) in the fifth example. Therefore, since the node Nc normally uses the main key, i.e., the encryption key Ka, the encrypted packet Spa is transferred to the gateway Ga; however, if a communication failure occurs between the nodes Nc and Na, the node Nc uses the sub-key, i.e., the encryption key Kb, to transfer the encrypted packet SPb to the gateway Gb.

In this case, in the disposed node Nd subordinate to the node Nc, only the main key, i.e., the encryption key Ka is set. As a result, the number of nodes having multiple encryption keys can be limited and, as is the case with the fourth example, the communication efficiency can be improved in the ad-hoc networks Aa and Ab.

In the following embodiments, a key setting example will be described in which multiple encryption keys are set in the node Nc (boundary node) disposed as a new node at the boundary between the ad-hoc networks Aa and Ab as described in the fourth example. A key setting example will also be described in which only a main key is set when the node Nd is disposed as a new node under the node Nc after the key setting is performed for the node Nc.

A key setting process is categorized into two types, which are a downstream type and an upstream type. The downstream type refers to a process of setting a key by broadcasting a packet from the upstream side (gateway) to a new node. On the other hand, the upstream type refers to a process of setting a key by uploading a packet from a new node to the upstream side (gateway). The downstream type will hereinafter be described with reference to FIGS. 6 to 45. On the other hand, the upstream type will be described with reference to FIGS. 46 to 76.

A first embodiment will be described. The first embodiment is a process of setting multiple encryption keys in a new node (the node Nc in FIG. 4) according to the so-called downstream type key setting process, with respect to the example depicted in FIG. 4. Description will hereinafter be made with reference to FIGS. 6 to 30.

Figure 6:
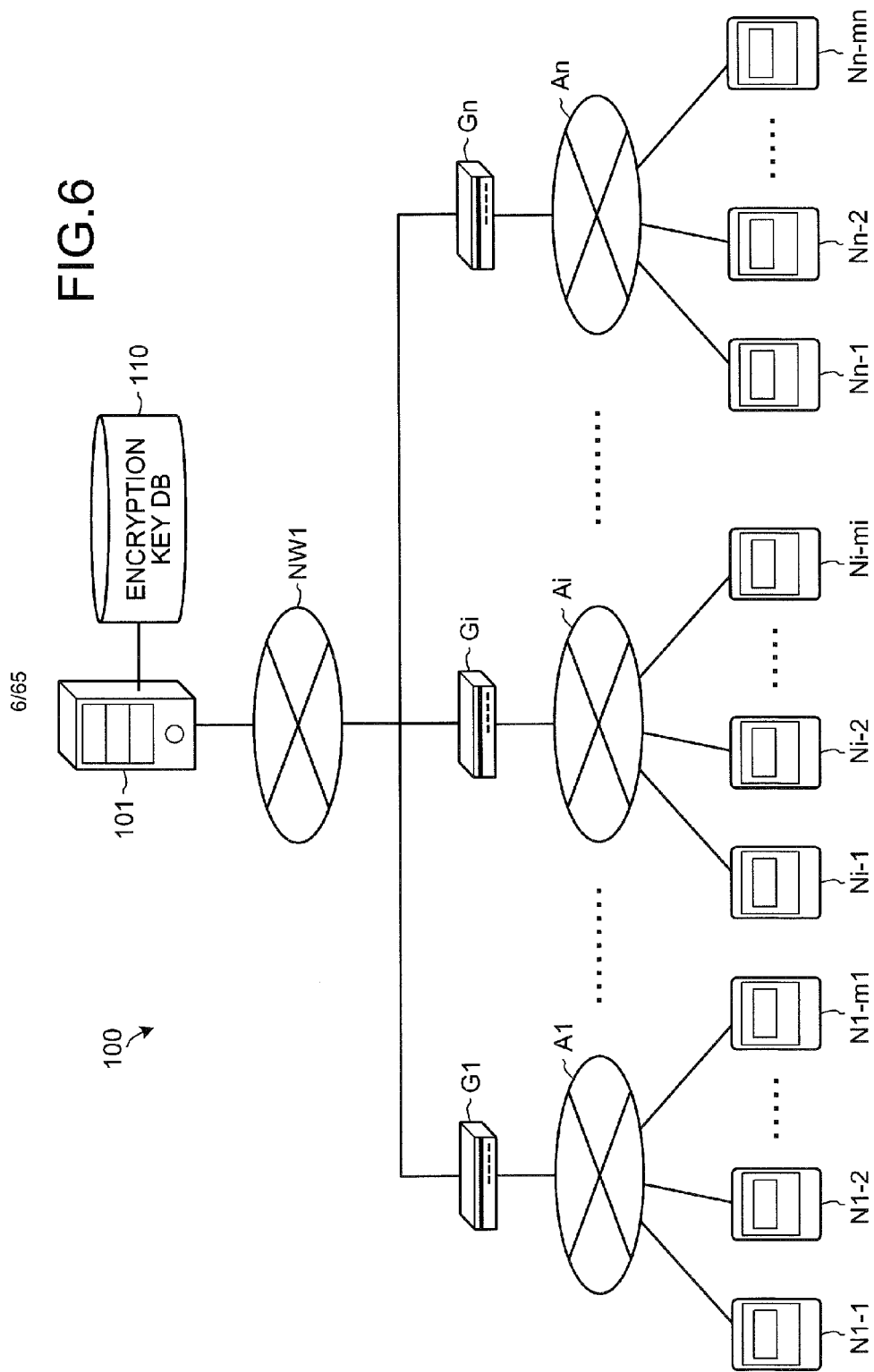
FIG. 6 is an explanatory view of one example of a network system according to a first embodiment.

FIG. 6 is an explanatory view of one example of a network system according to the first embodiment. In FIG. 6, a network system 100 includes a management server 101, gateways G1 to Gn, and nodes N1-1 to N1-m1, . . . , Ni-1 to Ni-mi, . . . , Nn-1 to Nn-mn.

In the network system 100, the management server 101 and the gateways G1 to Gn are connected in a mutually communicable manner via a network NW1 such as the Internet, a LAN, and a WAN. A gateway Gi and the nodes Ni-1 to Ni-mi are connected via an ad-hoc network Ai (i=1, 2, . . . , n).

The management server 101 is a computer that has an encryption key DB (database) 110 and manages encryption keys specific to the gateways G1 to Gn. The encryption key specific to the gateway Gi (hereinafter referred to as an "encryption key Ki") is key information for encrypting a packet transmitted and received between the nodes in the ad-hoc network Ai to which the gateway Gi belongs. The encryption key DB 110 will be described in detail later with reference to FIG. 18.

The gateway Gi is a relay device connecting the ad-hoc network Ai and the network NW1. The gateway Gi understands both the protocol of the ad-hoc network Ai and the protocol of the network NW1 and transfers communications between the ad-hoc network Ai and the network NW1.

The nodes Ni-1 to Ni-mi are wireless communication apparatuses performing multi-hop communication with other nodes within a predetermined communication range. In the ad-hoc network Ai, all the nodes Ni-1 to Ni-mi need not be communicable with the gateway Gi directly and only a portion of the nodes needs to be communicable with the gateway Gi.

The network system 100 is applicable to a system that collects electricity and gas usage figures of households, for example. For example, the nodes Ni-1 to Ni-mi are incorporated into electricity meters and gas meters of households to transmit and receive between the nodes in the ad-hoc network Ai, the electricity and gas usage figures of the households. The electricity and gas usage of the households may be measured by the nodes Ni-1 to Ni-mi or may be acquired by the nodes Ni-1 to Ni-mi from the electricity meters and the gas meters.

The gateway Gi transmits the electricity and gas usage figures of the households, received from the nodes Ni-1 to Ni-mi in the ad-hoc network Ai to servers (e.g., the management server 101) of an electric power company and a gas company via the network NW1. As a result, the electricity and gas usage figures can be collected without an operator going to the actual sites.

The network system 100 encrypts a packet by using the encryption key Ki specific to the gateway Gi for each ad-hoc network Ai. This ensures secure communication (data confidentiality, prevention of tampering) of the ad-hoc network Ai. Changing the encryption key Ki for each ad-hoc network Ai reduces risk in the event of key leakage.

Although each node belongs to one ad-hoc network in the described configuration, some configurations may include a node belonging to multiple ad-hoc networks and gateways. In this case, a node belonging to multiple ad-hoc networks retains multiple corresponding gateway keys.

A setting example of the encryption key Ki at the time of introduction of a new node into the network system 100 depicted in FIG. 6 will be described. Although multiple encryption keys are set in the new node in the first embodiment, an example of setting one encryption key will first be described and an example of setting multiple keys (FIGS. 10 to 15) will be described. Even in the example of setting multiple keys (FIGS. 10 to 15), the setting of each key is the same as the setting depicted in FIGS. 7 to 9.

Figure 7:
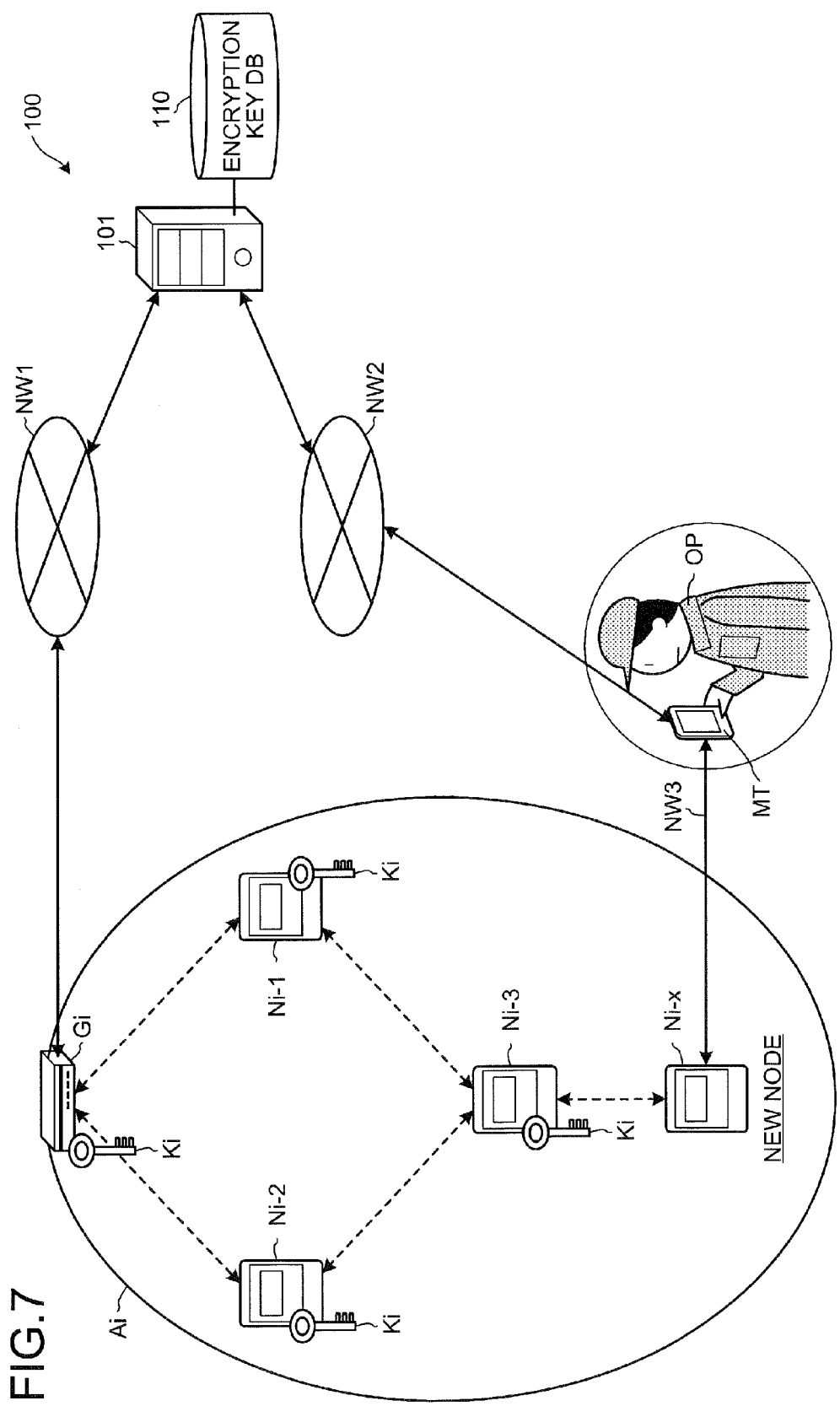
FIG. 7 is an explanatory view of an example of introduction of a new node into the network system 100 according to the first embodiment.

FIG. 7 is an explanatory view of an example of introduction of a new node into the network system 100 according to the first embodiment. In FIG. 7, a new node Ni-x is introduced into the ad-hoc network Ai of the network system 100. FIG. 7 depicts the nodes Ni-1 to Ni-3 as the representatives of the nodes Ni-1 to Ni-mi in the ad-hoc network Ai.

At the time of introduction of the new node Ni-x, an operator OP does not know to which ad-hoc network Ai the new node Ni-x belongs. Therefore, an encrypted packet from the gateway Gi and intercepted by the new node Ni-x is transmitted to the management server 101 by utilizing a mobile terminal MT used by the operator OP to make an inquiry about the encryption key Ki to be set in the new node Ni-x to the management server 101. As a result, the proper encryption key Ki is acquired from the management server 101 and automatically set in the new node Ni-x.

The mobile terminal MT is a mobile type communication apparatus used by the operator OP and is, for example, a mobile telephone, a Personal Handy-phone System (PHS) telephone, a smartphone, and a notebook personal computer. The mobile terminal MT relays communication between the new node Ni-x and the management server 101, which are unable to communicate directly.

Figure 8:
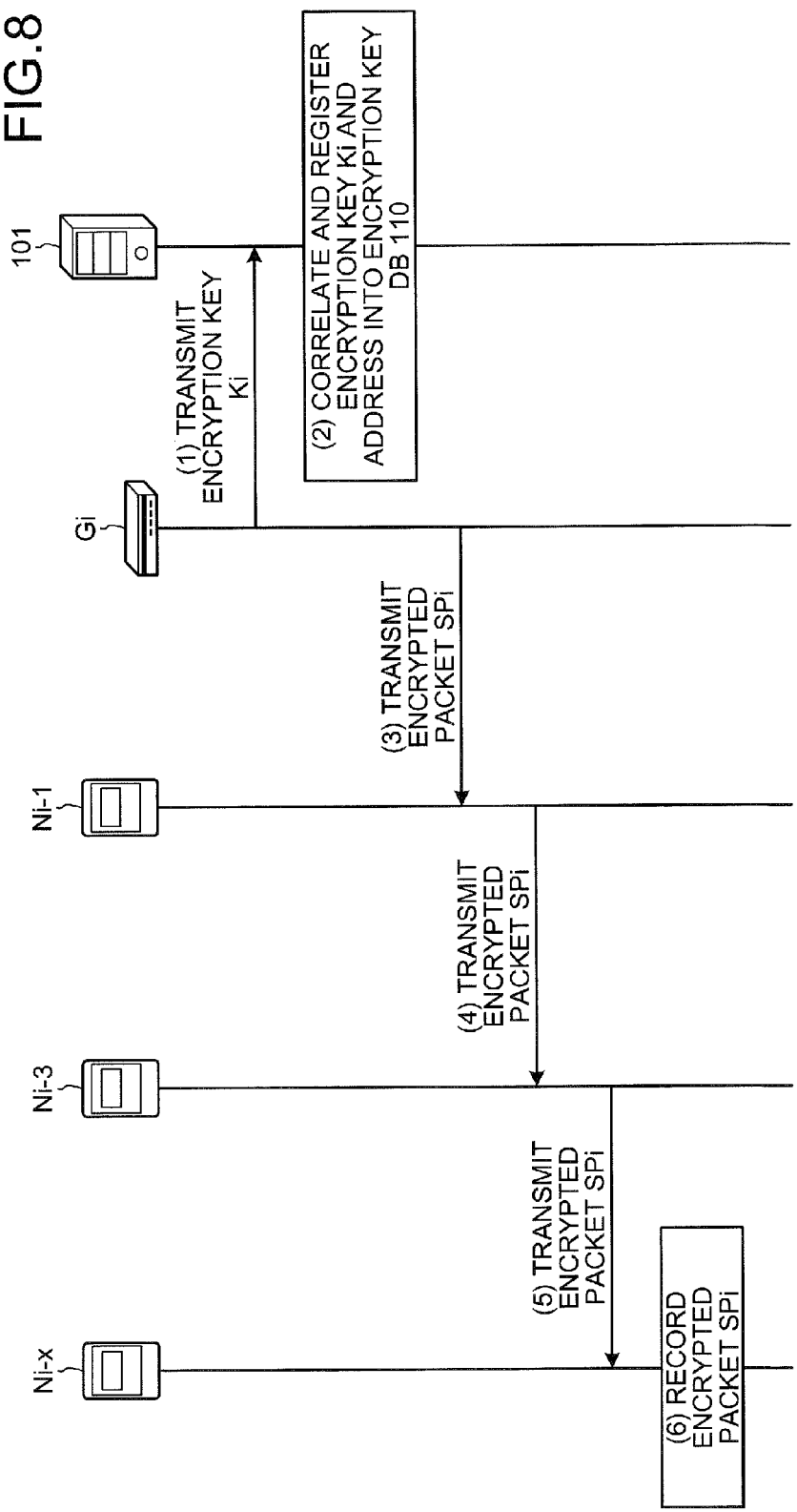
FIGS. 8 and 9 are sequence diagrams of an example of operation of the network system 100 at the time of introduction of a new node according to the first embodiment.
Figure 9:
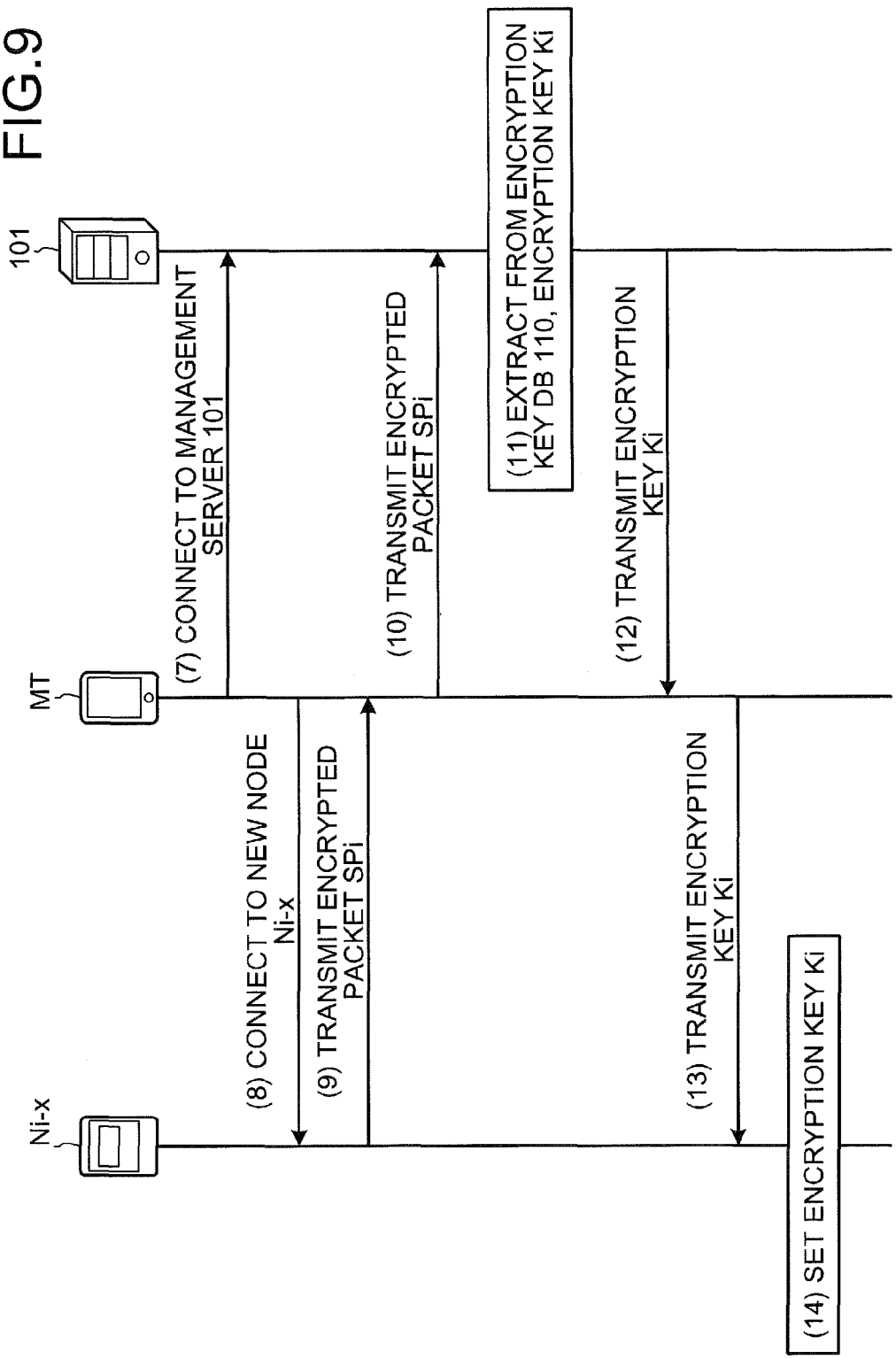

FIGS. 8 and 9 are sequence diagrams of an example of operation of the network system 100 at the time of introduction of the new node Ni-x according to the first embodiment. The sequence of FIG. 8 is an example of operation performed before the operator OP goes to an actual site (installation location of the new node Ni-x), for example. The sequence of FIG. 9 is an example of operation performed after the operator OP goes to the actual site, for example.

In the sequence of FIG. 8, (1) the gateway Gi transmits the encryption key Ki specific to the gateway Gi to the management server 101. (2) The management server 101 registers the encryption key Ki specific to the gateway Gi and the address of the gateway Gi in a correlated manner into the encryption key DB 110.

(3) The gateway Gi broadcasts (simultaneously reports) on the ad-hoc network Ai, a packet (hereinafter referred to as an "encrypted packet SPi") encrypted by using the encryption key Ki specific to the gateway Gi. The encrypted packet SPi includes the address of the gateway Gi, for example.

(4) The node Ni-1 transmits to the node Ni-3 that is within communication range, the encrypted packet SPi that is from the gateway Gi. (5) The node Ni-3 transmits to the new node Ni-x that is within communication range, the encrypted packet SPi that is from the node Ni-1. (6) The new node Ni-x records the encrypted packet SPi that is from the node Ni-3. However, since the encryption key Ki is not set, the new node Ni-x cannot decrypt the encrypted packet SPi at this point.

In the sequence of FIG. 9, (7) the mobile terminal MT connects to the management server 101, via the network NW2, such as a mobile telephone network and the Internet. In this case, the mobile terminal MT uses, for example, Secure Socket Layer (SSL) to perform secure communication with the management server 101. A communication mode for implementing secure communication between the management server 101 and the mobile terminal MT will be described later with reference to FIGS. 23 and 24.

(8) The mobile terminal MT connects to the new node Ni-x, via a wired or wireless network NW3. For example, the operator OP connects the mobile terminal MT and the new node Ni-x by using a Universal Serial Bus (USB) cable, thereby establishing the network NW3 between the mobile terminal MT and the new node Ni-x.

(9) The new node Ni-x transmits to the mobile terminal MT through the network NW3, the encrypted packet SPi recorded at (6) depicted in FIG. 8. (10) The mobile terminal MT transmits the encrypted packet SPi from the new node Ni-x via the network NW2 to the management server 101.

(11) The management server 101 extracts from the encryption key DB 110, the encryption key Ki for decrypting the encrypted packet SPi from the mobile terminal MT. For example, the management server 101 extracts from the encryption key DB 110, the encryption key Ki stored and correlated with the address of the gateway Gi included in the encrypted packet SPi.

(12) The management server 101 transmits the extracted encryption key Ki via the network NW2 to the mobile terminal MT. (13) The mobile terminal MT transmits the encryption key Ki from the management server 101 via the network NW3 to the new node Ni-x. (14) The new node Ni-x sets the encryption key Ki from the mobile terminal MT as a key for decrypting a packet.

As described above, by using, as a clue, the encrypted packet SPi that can be received from the gateway Gi even if the encryption key Ki for secure communication is not set, the new node Ni-x can make a key request via the mobile terminal MT to the management server 101 to acquire the encryption key Ki to be set. An example of introducing a new node at a boundary between multiple ad-hoc networks (communication ranges) will be described.

FIGS. 10 to 15 are explanatory views of an example of introduction of a new node at a boundary between (within communication ranges of) multiple ad-hoc networks of the downstream type according to the first embodiment. In FIGS. 10 to 15, description will be given taking as an example, an introduction of a new node Nx at the boundary between two ad-hoc networks A1 and A2.

Figure 10:
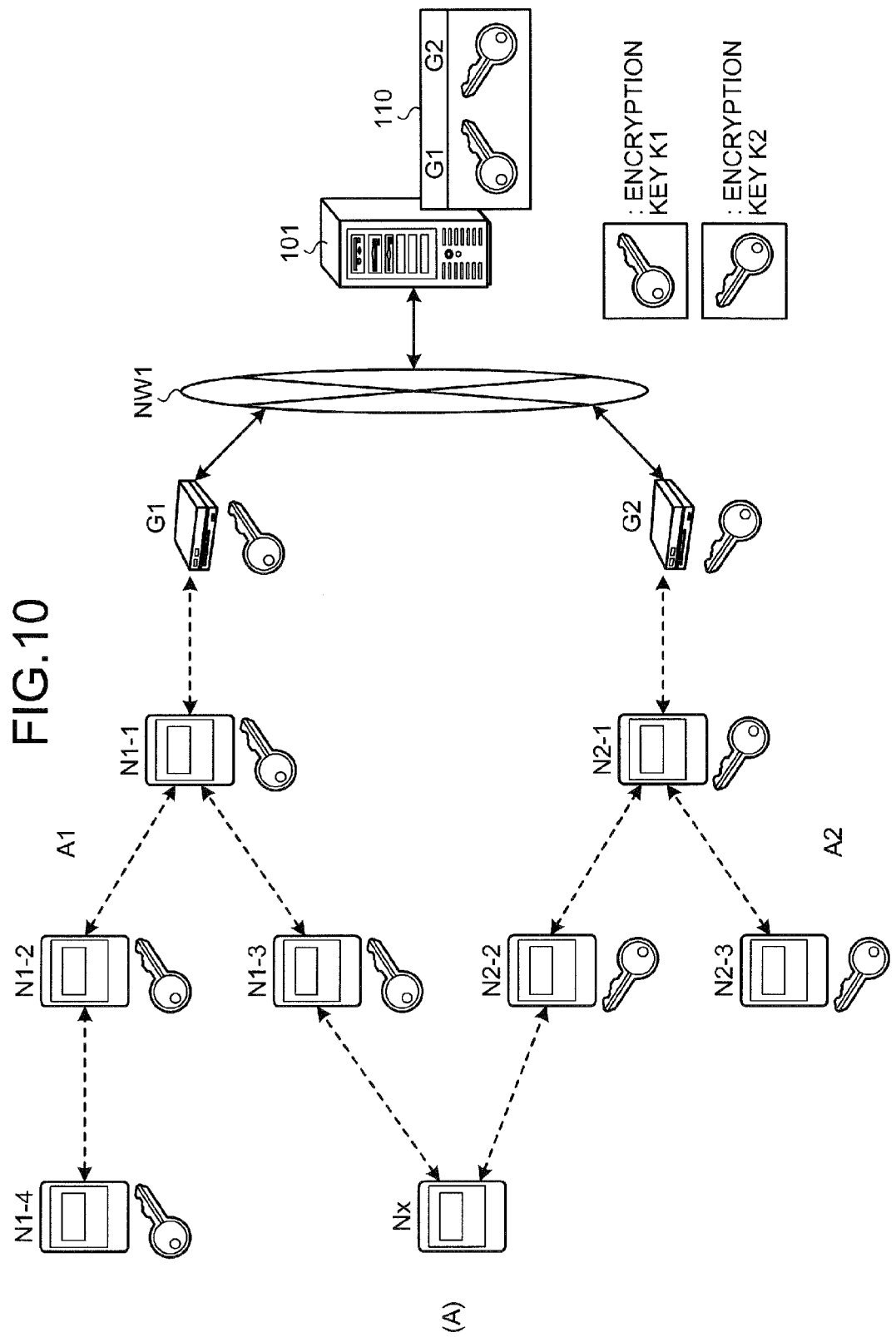
FIGS. 10, 11, 12, 13, 14, and 15 are explanatory views of an example of introduction of a new node at a boundary between (within communication ranges of) multiple ad-hoc networks of a downstream type according to the first embodiment.

FIG. 10 depicts an initial state (A). It is assumed that nodes in the ad-hoc network A1 are nodes N1-1 to N1-4 and that nodes in the ad-hoc network A2 are nodes N2-1 to N2-3. A gateway G1 and the nodes N1-1 to N1-4 in the ad-hoc network A1 retain an encryption key K1 specific to the gateway G1. A gateway G2 and the nodes N2-1 to N2-3 in the ad-hoc network A2 retain an encryption key K2 specific to the gateway G2.

The new node Nx is assumed to be disposed within communication ranges of the node N1-3 and the node N2-2. It is assumed that the encryption key K1 correlated with the address of the gateway G1 and the encryption key K2 correlated with the address of the gateway G2 are stored in the encryption key DB 110 of the management server 101.

Figure 11:
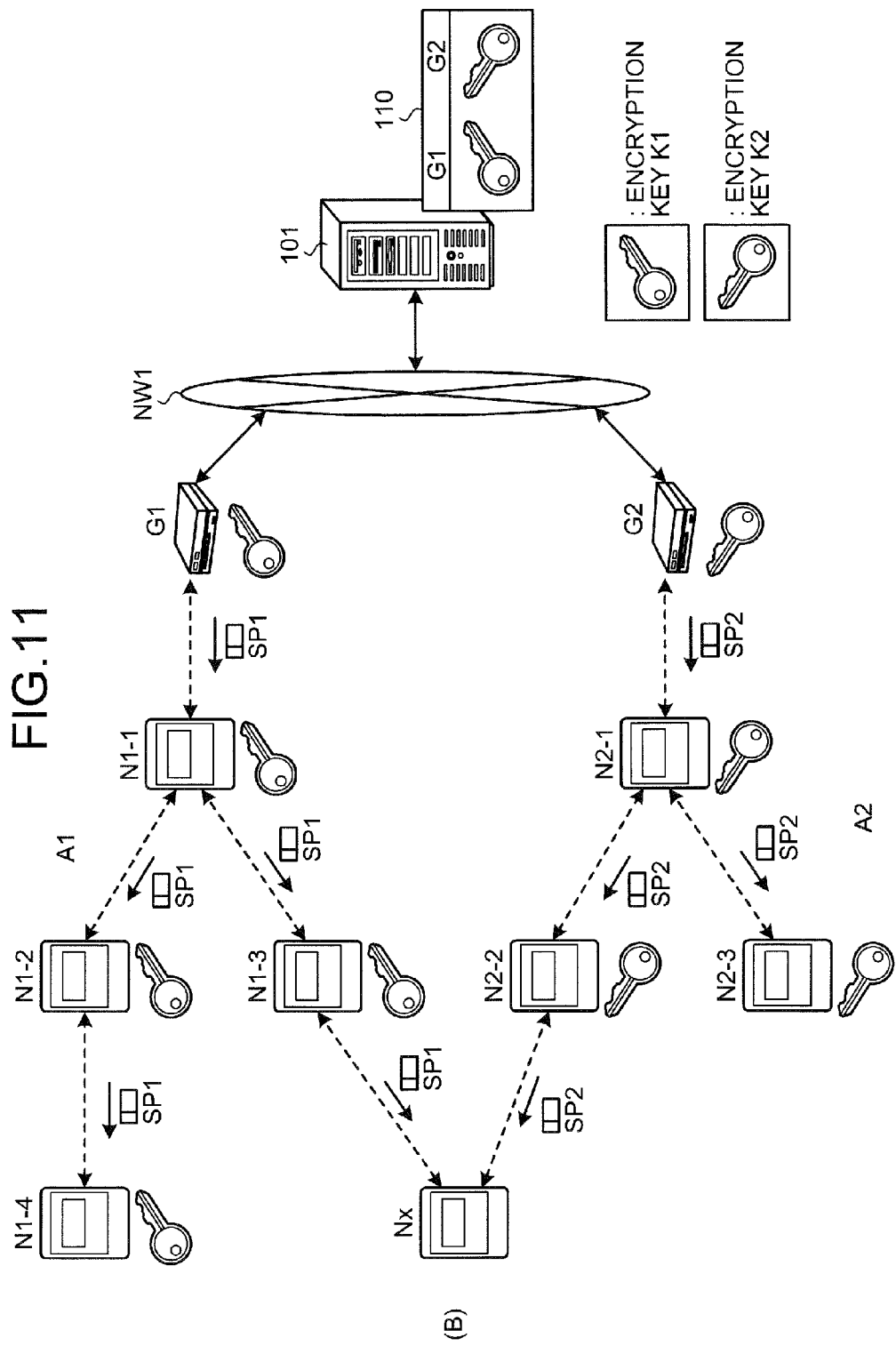

FIG. 11 depicts a state (B) subsequent to the initial state (A). In the state (B), as depicted in FIG. 8, the gateway G1 broadcasts on the ad-hoc network A1, an encrypted packet SP1 encrypted using the encryption key K1. Similarly, the gateway G2 broadcasts on the ad-hoc network A2, an encrypted packet SP2 encrypted using the encryption key K2. The new node Nx is within the communication range of the node N1-3 and therefore, intercepts the encrypted packet SP1 that is received by the node N1-3, from the node N1-1.

Similarly, the new node Nx is within the communication range of the node N2-2 and therefore, intercepts the encrypted packet SP2 received by the node N2-2, from the node N2-1. Since the encryption keys K1 and K2 are not set at this stage, the new node Nx cannot decrypt the encrypted packets SP1 and SP2.

Figure 12:
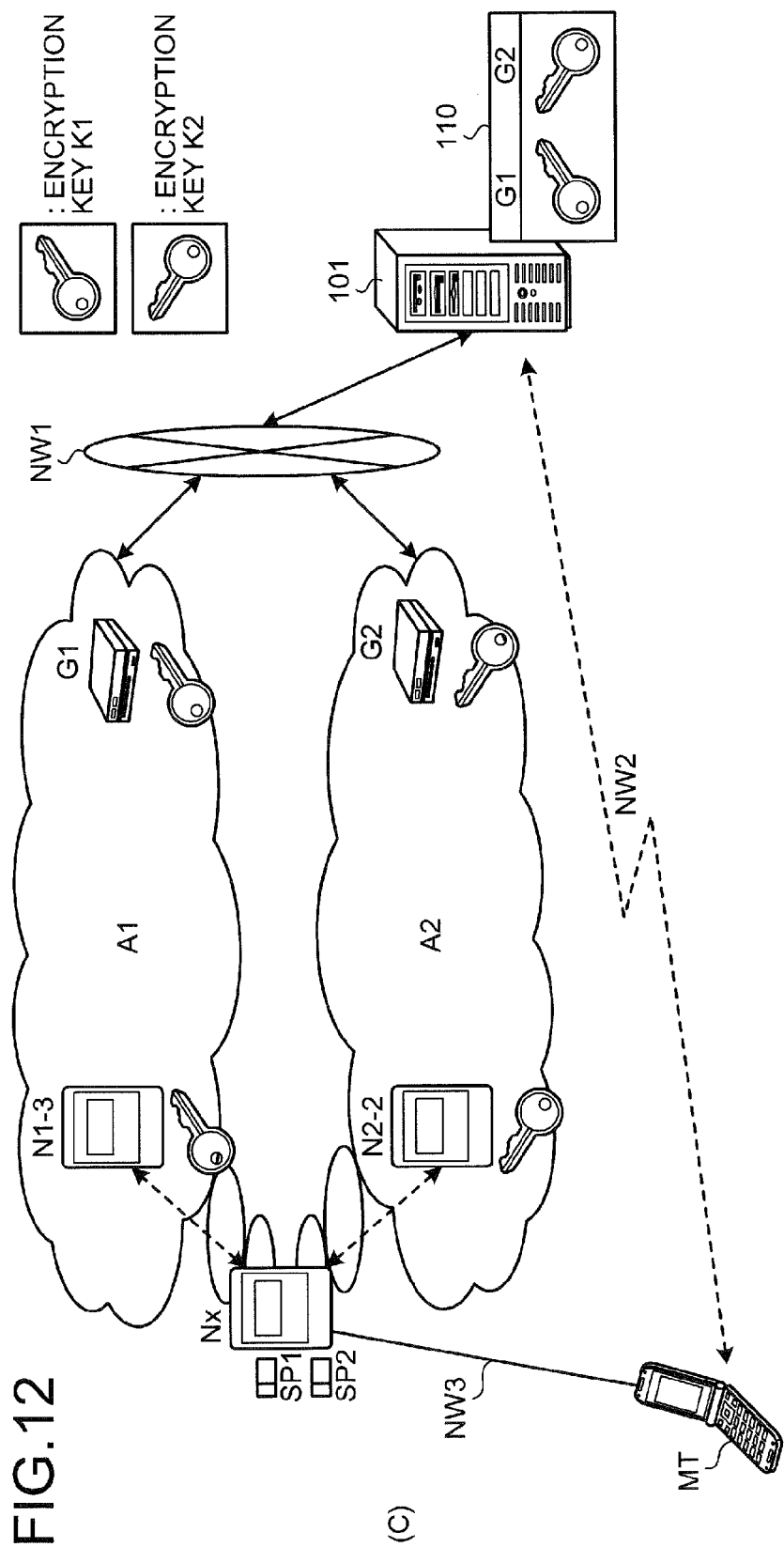

FIG. 12 depicts a state (C) subsequent to the state (B). The state (C) depicts a state in which the mobile terminal MT connectable, via the secure network NW2, to the management server 101 is connected to the new node Nx as depicted in FIGS. 7 and 9.

Figure 13:
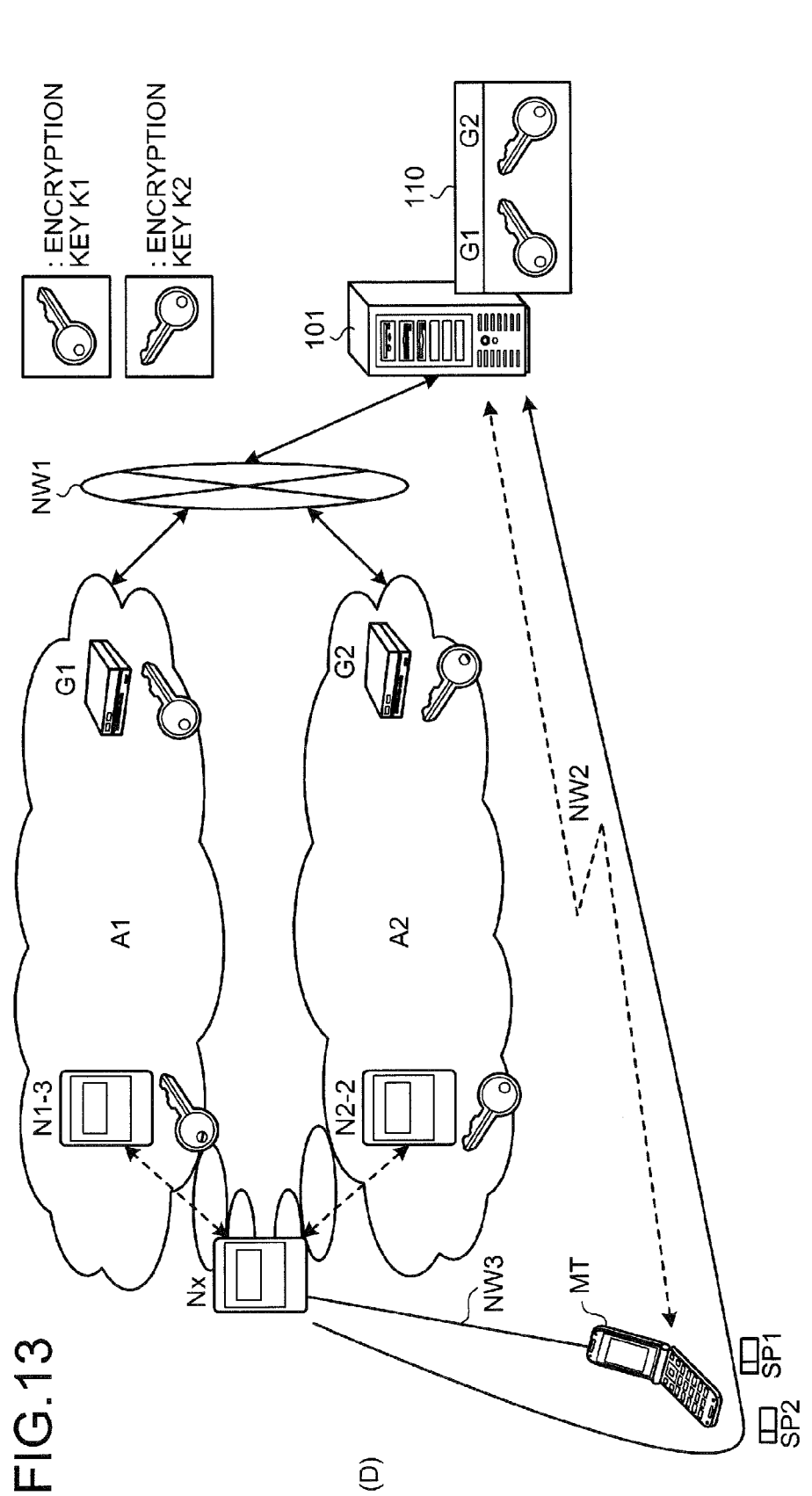

FIG. 13 depicts a state (D) subsequent to the state (C). In the state (D), from the state (C), the new node Nx transmits the intercepted encrypted packets SP1 and SP2 via the network NW3 to the mobile terminal MT, and the mobile terminal MT transmits the encrypted packets SP1 and SP2 received from the new node Nx to the management server 101, via the network NW2.

Figure 14:
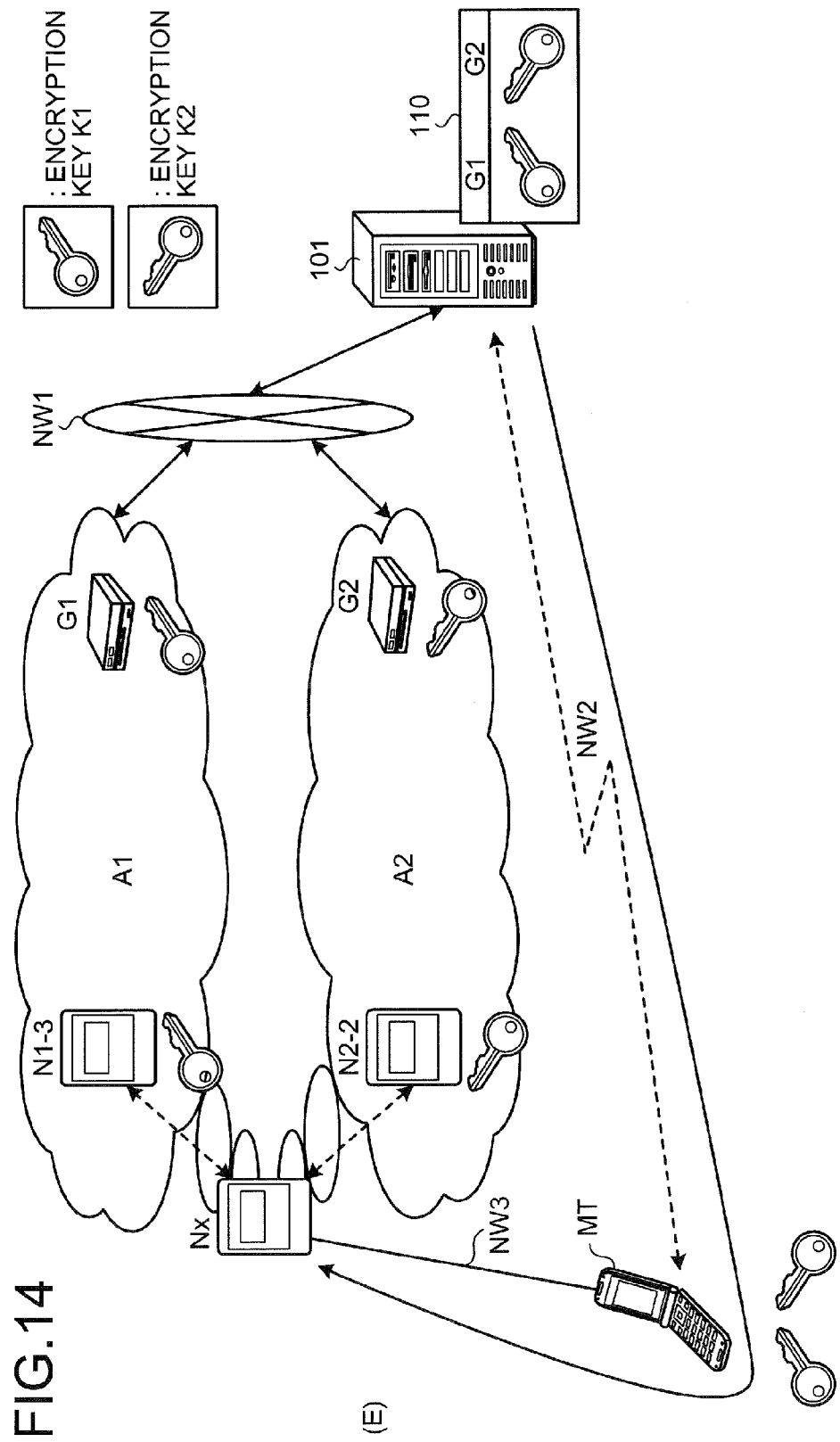

FIG. 14 depicts a state (E) subsequent to the state (D). In the state (E), the management server 101 identifies the gateways G1 and G2 from the encrypted packets SP1 and SP2 received at the state (D). Although various identifying methods exist, for example, if the addresses of the source gateways G1 and G2 are described in unencrypted headers of the encrypted packets SP1 and SP2, the headers can be analyzed to identify the addresses of the gateways G1 and G2. Therefore, the management server 101 extracts the encryption keys K1 and K2 stored and correlated with the addresses of the gateways G1 and G2 from the encryption key DB 110.

If the addresses of the gateways G1 and G2 cannot be identified from the headers of the encrypted packets SP1 and SP2, the decryption of the encrypted packets SP1 and SP2 is attempted using the encryption keys K1, K2, . . . in the encryption key DB 110. The management server 101 extracts the encryption keys K1 and K2 of successful decryption, from the encryption key DB 110. In any case, the management server 101 transmits the encryption keys K1 and K2 extracted from the encryption key DB 110, via the network NW2, the mobile terminal MT, and the network NW3 to the new node Nx.

Figure 15:
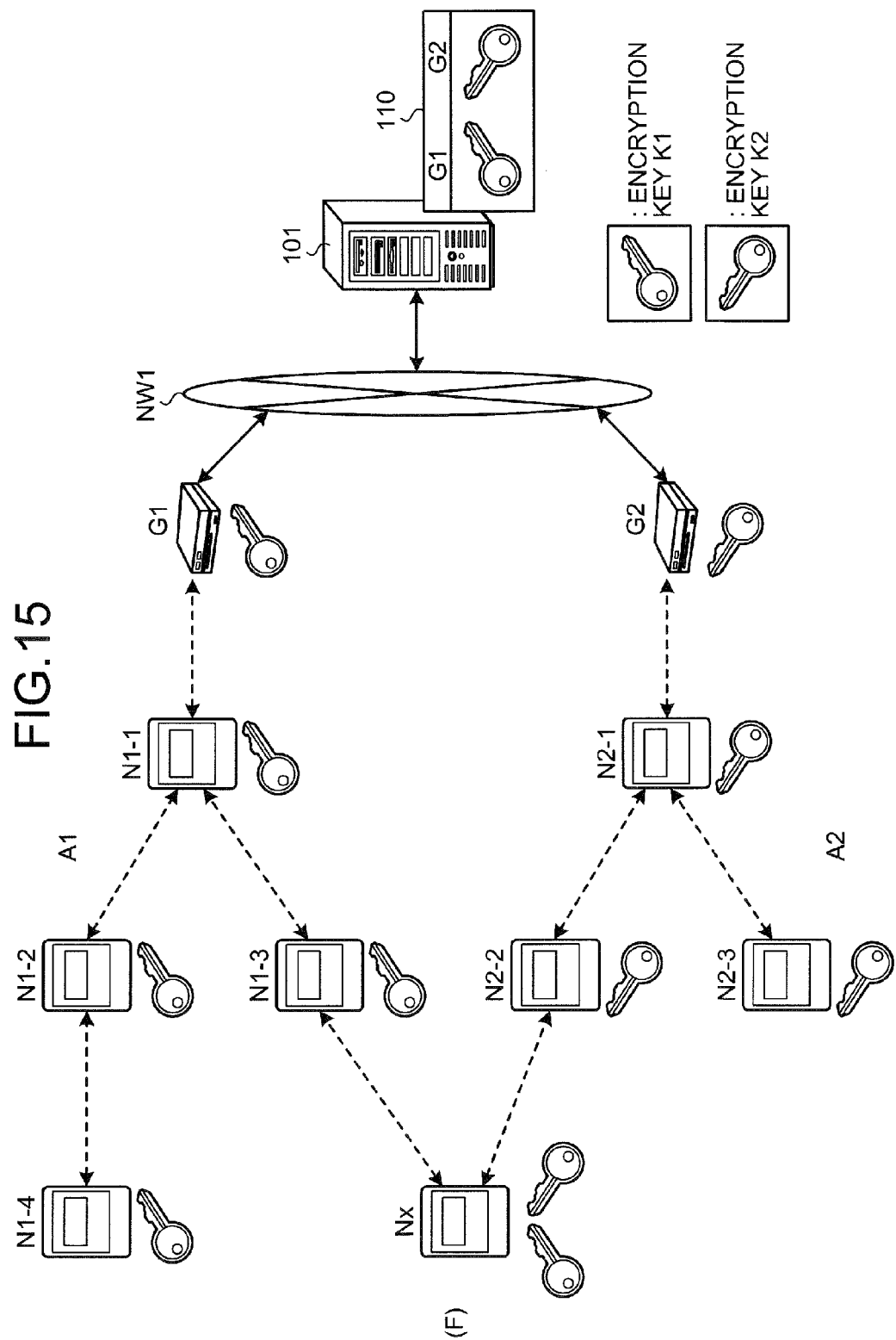

FIG. 15 depicts a state (F) subsequent to the state (E). In the state (F), the new node Nx receives and sets, as keys for encryption and decryption, the encryption keys K1 and K2 transmitted from the management server 101. Therefore, subsequently, the new node Nx can decrypt the encrypted packet SP1 from the node N1-3 using the encryption key K1. The new node Nx can decrypt the encrypted packet SP2 from the node N2-2 using the encryption key K2. From the new node Nx, the encrypted packet SP1 encrypted using the encryption key K1 is transmitted to the node N1-3 and the encrypted packet SP2 encrypted using the encryption key K2 is transmitted to the node N2-2.

Although the encrypted packet SP1 from the new node Nx is intercepted by the node N2-2, the node N2-2 does not retain the encryption key K1 and therefore, cannot decrypt and does not further transfer the encrypted packet SP1. Similarly, although the encrypted packet SP2 from the new node Nx is intercepted by the node N1-3, the node N1-3 does not retain the encryption key K2 and therefore, cannot decrypt and does not further transfer the encrypted packet SP2. Thus, while the security and the robustness are maintained, increases in the amount of communication in each of the ad-hoc networks A1 and A2 can be suppressed.

In the following description, a "node N" refers to a node transmitting/receiving a packet through multi-hop communication in any ad-hoc network Ai among the ad-hoc networks A1 to An of the network system 100. "Node, etc." refers to the gateways G1 to Gn and the node N of the network system 100.

Figure 16:
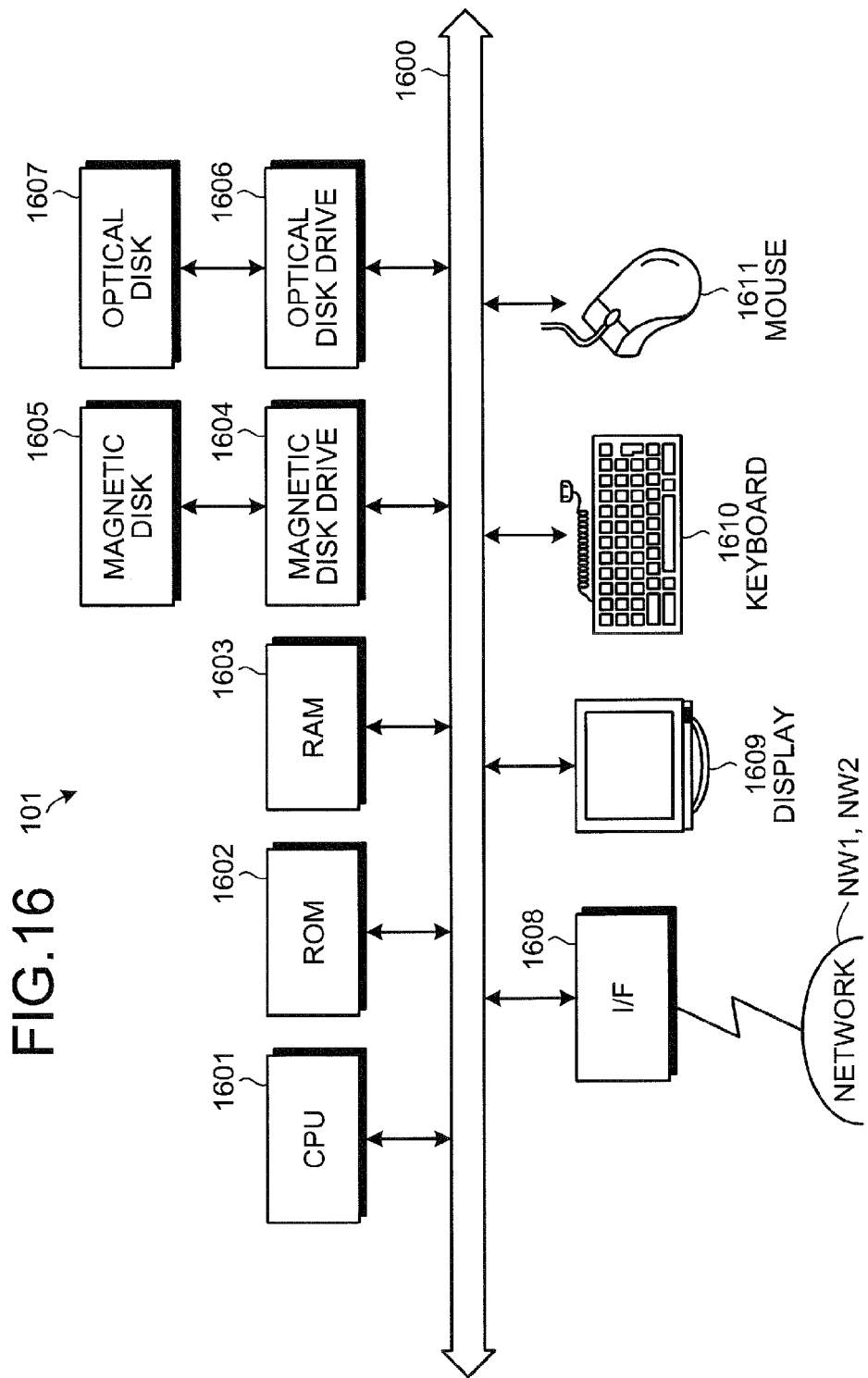
FIG. 16 is a block diagram of a hardware configuration example of a management server according to the first embodiment.

FIG. 16 is a block diagram of a hardware configuration example of the management server 101 according to the first embodiment. In FIG. 16, the management server 101 includes a central processing unit (CPU) 1601, a read-only memory (ROM) 1602, a random access memory (RAM) 1603, a magnetic disk drive 1604, a magnetic disk 1605, an optical disk drive 1606, an optical disk 1607, an interface (I/F) 1608, a display 1609, a keyboard 1610, and a mouse 1611, respectively connected through a bus 1600.

The CPU 1601 is responsible for overall control of the management server 101. The ROM 1602 stores programs such as a boot program. The RAM 1603 is used as a work area of the CPU 1601. The magnetic disk drive 1604 controls the reading and writing of data with respect to the magnetic disk 1605, under the control of the CPU 1601. The magnetic disk 1605 stores data written thereto under the control of the magnetic disk drive 1604.

The optical disk drive 1606 controls the reading and writing of data with respect to the optical disk 1607, under the control of the CPU 1601. The optical disk 1607 stores data written thereto under the control of the optical disk drive 1606, the data being read out by a computer.

The I/F 1608 is connected through a communication line to the networks NW1 and NW2 and is connected through the networks NW1 and NW2 to other apparatuses (such as the gateway Gi and the mobile terminal MT). The I/F 1608 is responsible for interfacing the networks NW1 and NW2 with the management server 101 and controls the input and output of data with respect to an external device. For example, a modem or a LAN adapter is employable as the I/F 1608.

The display 1609 displays a cursor, icons, or tool boxes as well as data such as documents, images, and functional information. For example, a CRT, a TFT liquid crystal display, a plasma display, etc. are employable as the display 1609.

The keyboard 1610 includes keys for entering characters, numeric characters, various instructions, etc. to input data. A touch-panel type input pad, a numeric keypad, etc. may be used instead. The mouse 1611 moves a cursor, selects an area, or moves and resizes a window, etc. A trackball or joystick may be used, as long as similar functions for a pointing device are equipped. The mobile terminal MT can be implemented by the same hardware configuration as the management server 101 depicted in FIG. 16.

Figure 17:
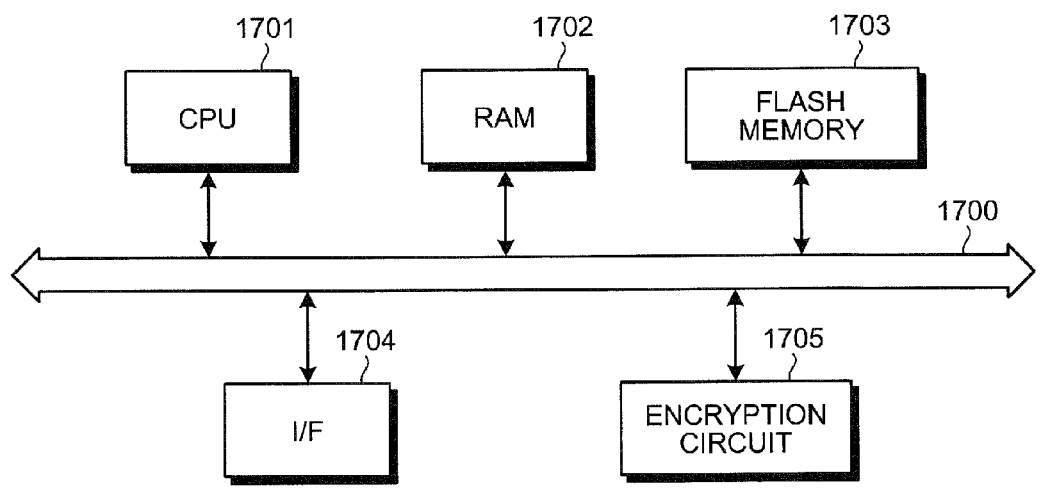
FIG. 17 is a block diagram of a hardware configuration example of a node, etc. according to the first embodiment.

FIG. 17 is a block diagram of a hardware configuration example of the node, etc. according to the first embodiment. In FIG. 17, the node, etc. include a CPU 1701, a RAM 1702, a flash memory 1703, an I/F 1704, and an encryption circuit 1705, respectively connected through a bus 1700.

The CPU 1701 is responsible for overall control of the node, etc. The RAM 1702 is used as a work area of the CPU 1701. The flash memory 1703 stores programs and key information of an encryption key etc. The I/F 1704 transmits and receives packets through the multi-hop communication. The I/F 1704 of the gateway Gi is connected through a communication line to the network NW1 and is connected via the network NW1 to the management server 101.

The encryption circuit 1705 is a circuit that encrypts data using an encryption key if the data is to be encrypted. If the encryption is executed by software, the need for the encryption circuit 1705 is eliminated by storing a program corresponding to the encryption circuit 1705 into the flash memory 1703.

Figure 18:
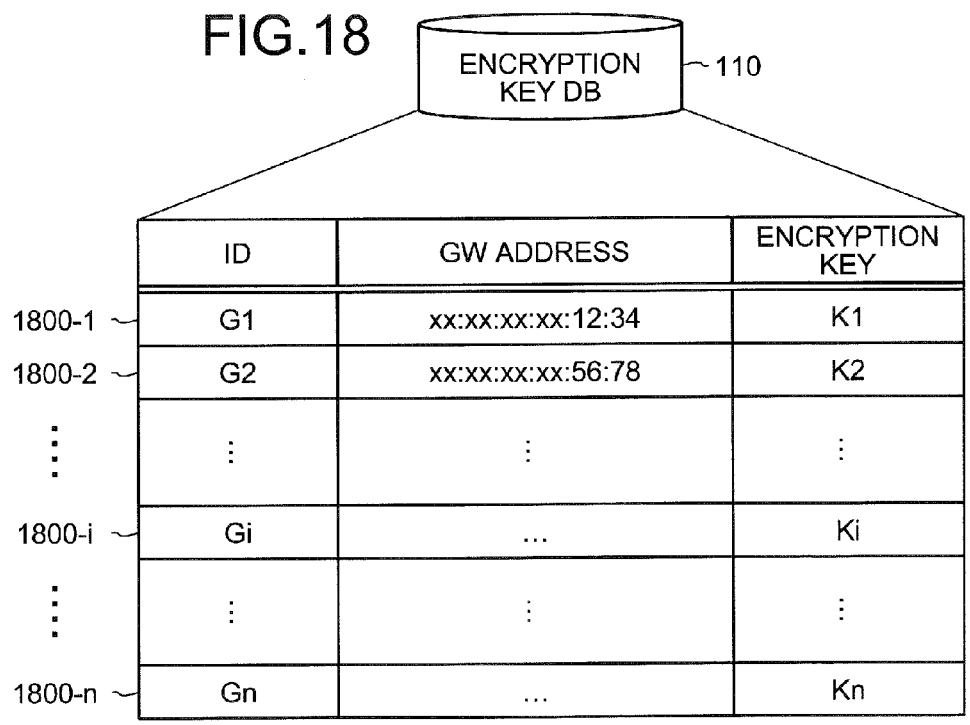
FIG. 18 is an explanatory view of an example of storage contents of an encryption key DB.

FIG. 18 is an explanatory view of an example of storage contents of the encryption key DB 110. In FIG. 18, the encryption key DB 110 has fields of IDs, GW addresses, and encryption keys and sets information in each field to store key information 1800-1 to 1800-n of the respective gateways G1 to Gn as records.

The ID is an identifier of the gateway Gi used for explanation in this description. The GW address is an address of the gateway Gi. For the GW address, for example, a Media Access Control (MAC) address or an Internet protocol (IP) address of the gateway Gi can be used. The encryption key is an encryption key Ki specific to each gateway Gi and is binary data of about 128 to 256 bits, for example.

Taking the key information 1800-1 as an example, the GW address of the gateway G1 is "xx:xx:xx:xx:12:34" and the encryption key is the "encryption key K1". The encryption key DB 110 is implemented by a storage device such as the ROM 1602, the RAM 1603, the magnetic disk 1605, and the optical disk 1607 of the management server 101 depicted in FIG. 16, for example.

The storage contents of the encryption key DB 110 may be updated when the management server 101 receives the encryption key Ki specific to the gateway Gi from the gateway Gi as described in the sequence of FIG. 8. The storage contents of the encryption key DB 110 may be updated through operation input by a user using the keyboard 1610 and the mouse 1611 depicted in FIG. 16.

Figure 19:
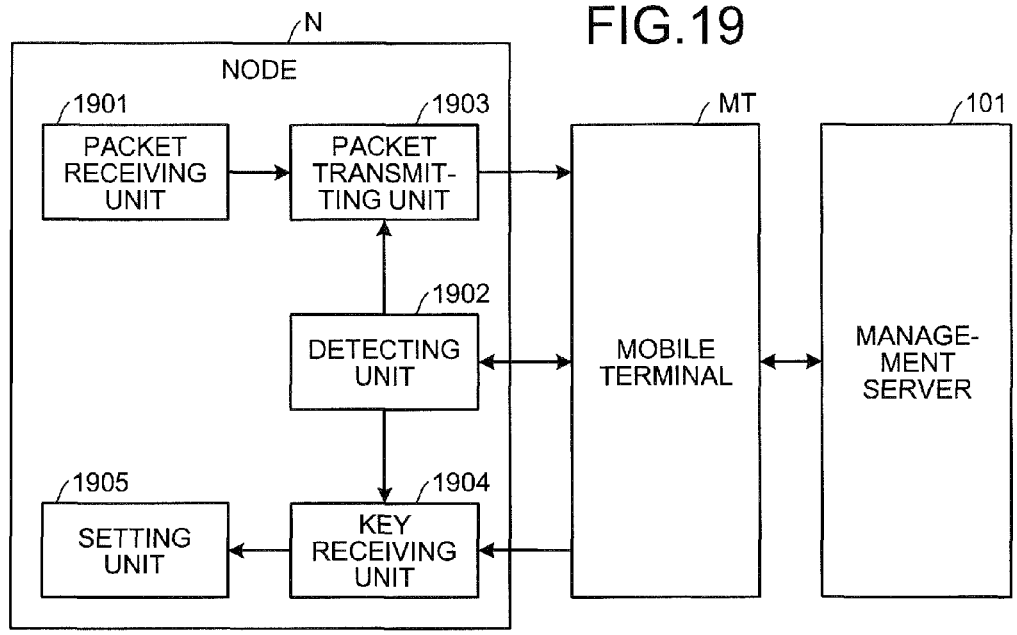
FIG. 19 is a block diagram of a functional configuration example of a node according to the first embodiment.

FIG. 19 is a block diagram of a functional configuration example of the node N according to the first embodiment. In FIG. 19, the node N includes a packet receiving unit 1901, a detecting unit 1902, a packet transmitting unit 1903, a key receiving unit 1904, and a setting unit 1905. For example, functions of the functional units (the packet receiving unit 1901 to the setting unit 1905) are implemented by the CPU 1701 executing programs stored in a storage device such as the RAM 1702 and the flash memory 1703 depicted in FIG. 17 or by the I/F 1704. Process results of the functional units (the packet receiving unit 1901 to the setting unit 1905) are stored in a storage device such as the RAM 1702 and the flash memory 1703 unless otherwise specified.

The packet receiving unit 1901 receives the encrypted packet SPi broadcasted from the gateway Gi in the ad-hoc network Ai. The encrypted packet SPi is a packet encrypted by using the encryption key Ki specific to the gateway Gi. This encrypted packet SPi is a packet broadcasted from the gateway Gi for synchronization among nodes, etc. in the ad-hoc network Ai, for example.

For example, the packet receiving unit 1901 receives the encrypted packet SPi through multi-hop communication from another node N in the ad-hoc network Ai. However, if the gateway Gi exists within the communication range of the node N, the packet receiving unit 1901 may receive the encrypted packet SPi directly from the gateway Gi. A data structure of the encrypted packet SPi will be described.

Figure 20:
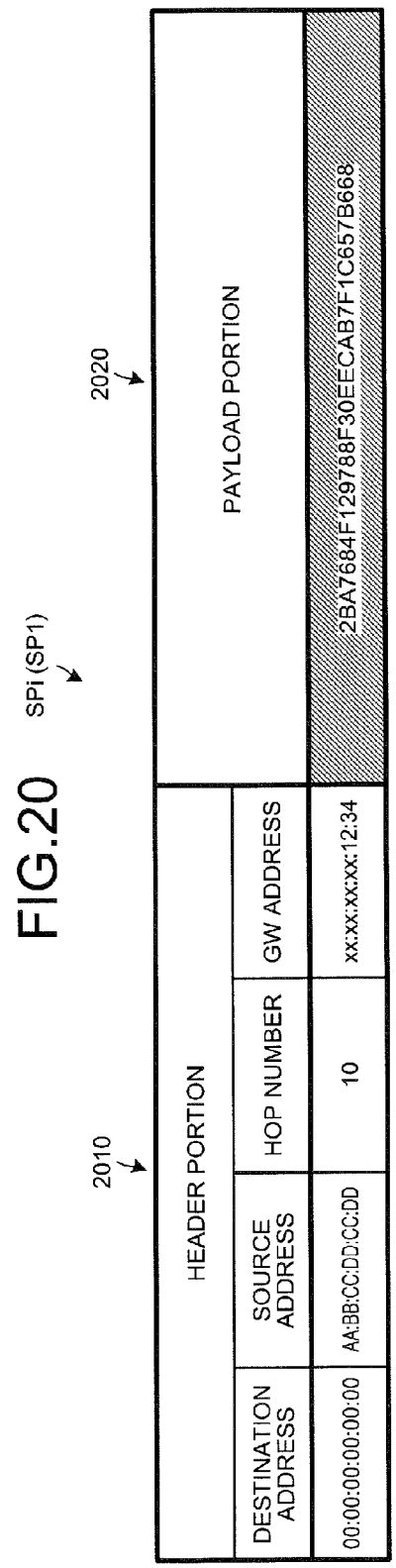
FIG. 20 is an explanatory view (part 1) of an example of a data structure of an encrypted packet according to the first embodiment.

FIG. 20 is an explanatory view (part 1) of an example of a data structure of an encrypted packet according to the first embodiment. In FIG. 20, an encrypted packet SP1 includes a header portion 2010 and a payload portion 2020. A destination address, a source address, a hop number, and a GW address are described in the header portion 2010. An encrypted data body is described in the payload portion 2020 (a hatched portion in FIG. 20).

The destination address is an address of a transmission destination. If the encrypted packet SPi is a broadcast packet from the gateway Gi, a MAC address "00:00:00:00:00:00" for broadcast is described as the destination address. The source address is an address of a transmission source. In this example, a MAC address of a node N (excluding the new node Nx) in the ad-hoc network Ai is described.

The hop number is the remaining number of transfers indicative of how many times the encrypted packet SPi will be transferred. The maximum value of the hop number of the encrypted packet SPi broadcasted from the gateway Gi is set in advance. The hop number is decremented at the time of transfer of the encrypted packet SPi and an encrypted packet SPi having the hop number of "0" is rejected. In this example, the hop number "10" of the encrypted packet SPi is described.

The GW address is an address of the gateway Gi. In this example, the MAC address "xx:xx:xx:xx:12:34" of the gateway G1 is described. Although the MAC addresses are used as examples of the destination address, the source address, and the GW address in this description, addresses such as IP addresses may also be used.

Returning to the description of FIG. 19, the detecting unit 1902 detects connection with the mobile terminal MT that is communicable with the management server 101. For example, the operator OP connects the mobile terminal MT with the new node Nx by using a USB cable and, as a result, the detecting unit 1902 detects the connection via the USB cable with the mobile terminal MT.

If the connection with the mobile terminal MT is detected, the packet transmitting unit 1903 transmits the received encrypted packet SPi via the mobile terminal MT to the management server 101. For example, the packet transmitting unit 1903 transmits the encrypted packet SPi via the network NW3 such as a USB cable to the mobile terminal MT. As a result, the mobile terminal MT transmits the encrypted packet SPi from the node N, via the network NW2, to the management server 101.

The key receiving unit 1904 receives from the management server 101, via the mobile terminal MT, the encryption key Ki specific to the gateway Gi for decrypting the transmitted encrypted packet SPi. This encryption key Ki is, for example, a common key capable of encrypting a packet and decrypting the encrypted packet SPi encrypted by using the encryption key Ki.

The setting unit 1905 sets the received encryption key Ki specific to each of the gateways Gi as a key for decrypting a packet. For example, the setting unit 1905 writes each encryption key Ki into a given storage area. The address of the given storage area is an address specified when a packet is encrypted or when the encrypted packet SPi is decrypted. As a result, the node N can subsequently encrypt a packet to be transmitted and decrypt the encrypted packet SPi for each encryption key Ki and the secure communication can be performed between the nodes in the ad-hoc network Ai.

Figure 21:
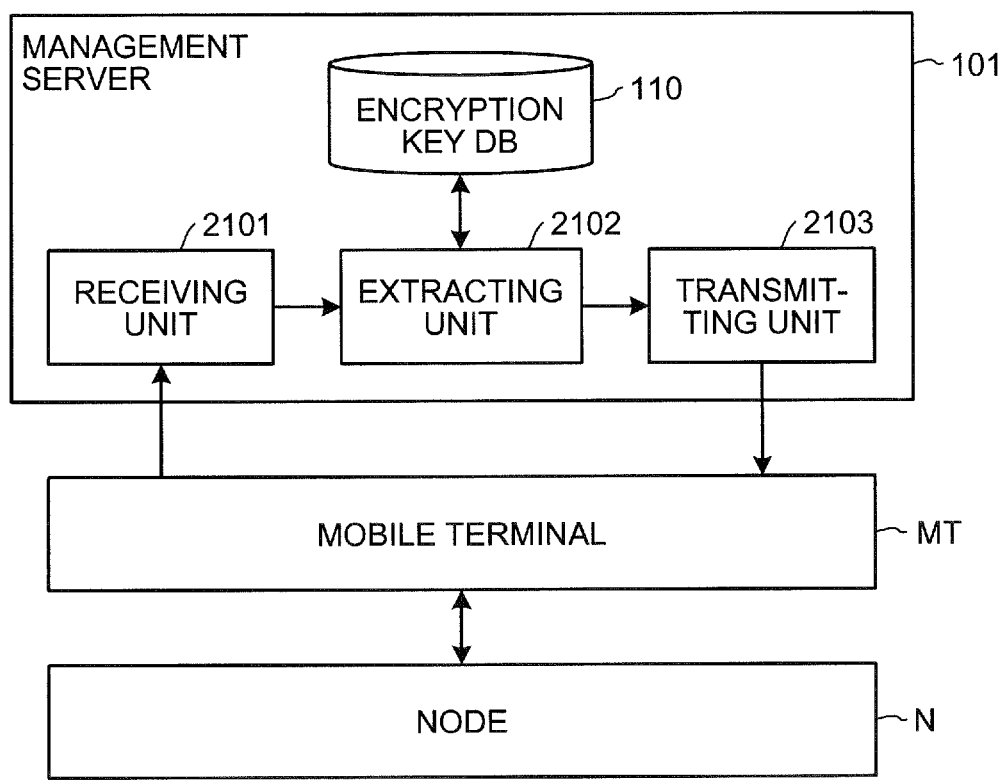
FIG. 21 is a block diagram of a functional configuration of the management server according to the first embodiment.

FIG. 21 is a block diagram of a functional configuration of the management server 101 according to the first embodiment. In FIG. 21, the management server 101 includes a receiving unit 2101, an extracting unit 2102, and a transmitting unit 2103. For example, functions of the functional units (the receiving unit 2101 to the transmitting unit 2103) are implemented by the CPU 1601 executing programs stored in a storage device such as the ROM 1602, the RAM 1603, the magnetic disk 1605, and the optical disk 1607 depicted in FIG. 16 or by the I/F 1608. Process results of the functional units (the receiving unit 2101 to the transmitting unit 2103) are stored in a storage device such as the RAM 1603, the magnetic disk 1605, and the optical disk 1607, for example.

The receiving unit 2101 receives the encrypted packet SPi from the node N, via the mobile terminal MT. For example, the receiving unit 2101 receives from the mobile terminal MT via the network NW2, the encrypted packet SPi that is from the node N.

The extracting unit 2102 extracts from the encryption key DB 110, the encryption key Ki for decrypting the received encrypted packet SPi. For example, the extracting unit 2102 extracts from the encryption key DB 110, the encryption key Ki stored and correlated with the address of the gateway Gi included in the encrypted packet SPi.

It is assumed that the receiving unit 2101 receives the encrypted packet SP1. In this case, for example, the extracting unit 2102 extracts from the encryption key DB 110, the encryption key Ki stored and correlated with the GW address "xx:xx:xx:xx:12:34" included in the encrypted packet SP1.

The transmitting unit 2103 transmits the extracted encryption key Ki via the mobile terminal MT to the node N. For example, the transmitting unit 2103 transmits the extracted encryption key K1 via the network NW2 to the mobile terminal MT. As a result, the mobile terminal MT transmits the encryption key K1 from the management server 101, via the network NW3 to the node N.

If a GW address is included in the header portion 2010 as in the case of the encrypted packet SP1 depicted in FIG. 20, the encryption key Ki can be extracted from the encryption key DB 110 by using the GW address as a clue, as described above. On the other hand, a GW address may be included in the payload portion 2020.

FIG. 22 is an explanatory view (part 2) of an example of a data structure of the encrypted packet according to the first embodiment. In FIG. 22, the encrypted packet SPi includes a header portion 2210 and a payload portion 2220. A destination address, a source address, and a hop number are described in the header portion 2210. An encrypted GW address and a data body are described in the payload portion 2220 (a hatched portion in FIG. 22).

In this case, the encryption key Ki cannot be extracted from the encryption key DB 110 by using the GW address as a clue. Therefore, the extracting unit 2102 executes a decryption process of the encrypted packet SPi by using the encryption key Ki for each of the encryption keys Ki registered in the encryption key DB 110. The extracting unit 2102 extracts the encryption key Ki of successful decryption of the encrypted packet SPi.

Whether the decryption is successful can be determined based on a format of a decrypted packet acquired by decrypting the encrypted packet SPi. For example, if the decrypted packet acquired by decrypting the encrypted packet SPi is data in a format prescribed in advance, the extracting unit 2102 determines that the decryption of the encrypted packet SPi is successful. Therefore, if the GW address is not included in the header portion 2210 of the encrypted packet SPi, the proper encryption key Ki to be set in the new node Nx can be extracted from the encryption key DB 110.

Although it is assumed that the encryption key Ki specific to the gateway Gi is already registered in the encryption key DB 110 when the management server 101 receives the encrypted packet SPi in the description, this is not a limitation. For example, after receiving the encrypted packet SPi, the management server 101 may make an inquiry to the gateway Gi to acquire the encryption key Ki specific to the gateway Gi. As a result, the management server 101 no longer needs to preliminarily retain the encryption keys K1 to Kn specific to all the gateways G1 to Gn in the network system 100.

One example of a communication mode between the management server 101 and the mobile terminal MT will be described. First, the server authentication of the management server 101 will be described from the viewpoint of the mobile terminal MT. For example, first, the mobile terminal MT uses a predetermined IP address to connect to the management server 101.

The mobile terminal MT receives an SSL server certificate from the management server 101. The received SSL server certificate is correlated with the IP address of the management server 101 and stored into a storage device such as the RAM 1702 and the flash memory 1703 of the mobile terminal MT.

FIG. 23 is an explanatory view of an example of authentication information of the management server 101. In FIG. 23, authentication information 2300 of the management server 101 has an IP address and an SSL server certificate. The IP address is the IP address of the management server 101. The X.509 certificate is the SSL server certificate (public key certificate) of the management server 101.

The mobile terminal MT decrypts the SSL server certificate by using a public key preliminarily built into the mobile terminal MT to perform the server authentication. The public key is a key issued by a third-party certifier, for example. If the SSL server certificate can correctly be decrypted by using this public key, it is found that the SSL server certificate is a proper certificate certified by the third-party certifier and therefore, the identity of the management server 101 is considered to be certified.

The user authentication of the mobile terminal MT will be described from the viewpoint of the management server 101. A case of performing the user authentication of the mobile terminal MT by using authentication information of the mobile terminal MT will be taken as an example in this description. The authentication information is stored in a storage device such as the ROM 1602, the RAM 1603, the magnetic disk 1605, and the optical disk 1607 of the management server 101, for example.

FIG. 24 is an explanatory view of an example of the authentication information of the mobile terminal MT. In FIG. 24, authentication information 2400 of the mobile terminal MT has a user ID and a password. The user ID is the identifier of the mobile terminal MT. The password is data for authenticating a user using the mobile terminal MT.

For example, first, the mobile terminal MT transmits a pair of a user ID and a password to the management server 101. The user ID and the password may be registered in advance in the flash memory 1803 of the mobile terminal MT or may be received through operation input by a user using an input device (not depicted) of the mobile terminal MT.

Subsequently, the management server 101 determines whether the pair of the user ID and the password from the mobile terminal MT matches a pair of the user ID and the password of the authentication information 2400. If the pair matches the user ID and the password of the authentication information 2400, the identity of the user of the mobile terminal MT is considered to be certified.

After the authentication, for example, the mobile terminal MT encrypts a packet by using the public key included in the SSL server certificate of the management server 101 to communicate with the management server 101. As a result, secure communication can be performed between the management server 101 and the mobile terminal MT. Although the secure communication using SSL is described, other secure communications or dedicated line communications may be used.

FIG. 25 is a flowchart of an example of a key setting process procedure of the node N according to the first embodiment. In the flowchart of FIG. 25, first, the node N determines whether the packet receiving unit 1901 has received an encrypted packet SPi broadcasted from the gateway Gi in the ad-hoc network Ai (step S2501).

Receipt of an encrypted packet SPi is awaited (step S2501: NO), and when an encrypted packet SPi has been received (step S2501: YES), the node N determines whether the detecting unit 1902 has detected a connection with the mobile terminal MT communicable with the management server 101 (step S2502).

Detection of a connection with the mobile terminal MT is awaited (step S2502: NO), and when a connection has been detected (step S2502: YES), the node N causes the packet transmitting unit 1903 to transmit the received encrypted packet SPi via the mobile terminal MT to the management server 101 (step S2503).

The node N then determines whether the key receiving unit 1904 has received the encryption key Ki specific to the gateway Gi for decrypting the transmitted encrypted packet SPi, via the mobile terminal MT from the management server 101 (step S2504).

Receipt of the encryption key Ki is awaited (step S2504: NO), and when the encryption key Ki has been received (step S2504: YES), the node N causes the setting unit 805 to set the received encryption key Ki specific to the gateway Gi as a key for packet encryption (step S2505) and terminates the series of the operations according to this flowchart.

As a result, the node N can acquire from the management server 101 and set the encryption key Ki specific to the gateway Gi for decrypting the encrypted packet SPi for each encrypted packet SPi.

FIG. 26 is a flowchart of an example of the key providing process procedure of the management server 101. In the flowchart of FIG. 26, first, the management server 101 determines whether the receiving unit 2101 has received an encrypted packet SPi via the mobile terminal MT from the node N (step S2601).

Receipt of an encrypted packet SPi is awaited (step S2601: NO), and when an encrypted packet SPi has been received (step S2601: YES), the management server 101 causes the extracting unit 2102 to execute a key extraction process of extracting the encryption key Ki from the encryption key DB 110 (step S2602). The management server 101 causes the transmitting unit 2103 to transmit the extracted encryption key Ki via the mobile terminal MT to the node N (step S2603) and terminates the series of the operations according to this flowchart.

As a result, the management server 101 can provide to the node N the encryption key Ki specific to the gateway Gi in the ad-hoc network Ai to which the node N belongs.

A specific process procedure of the key extraction process (part 1) at step S2602 depicted in FIG. 26 will be described. The key extraction process (part 1) of the following description is a process performed when the GW address included in the encrypted packet SPi is not encrypted.

Figure 27:
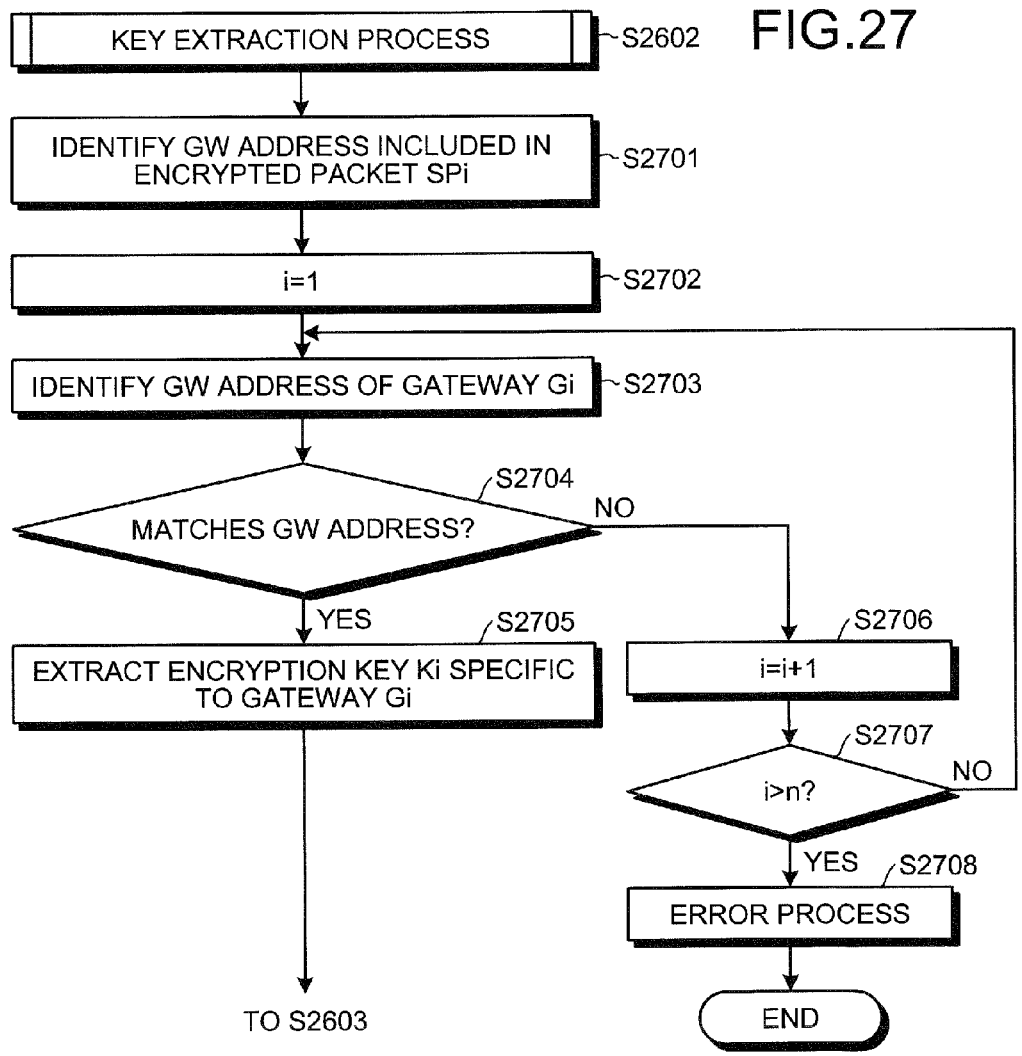
FIG. 27 is a flowchart of an example of a specific process procedure of a key extraction process (part 1) at step S2602 according to the first embodiment.

FIG. 27 is a flowchart of an example of a specific process procedure of the key extraction process (part 1) at step S2602 according to the first embodiment. In the flowchart of FIG. 27, first, the management server 101 causes the extracting unit 2102 to identify the GW address included in the encrypted packet SPi received at step S2601 depicted in FIG. 26 (step S2701).

The management server 101 causes the extracting unit 2102 to initialize "i" of the gateway Gi to "i=1" (step S2702). The management server 101 then causes the extracting unit 2102 to refer to the encryption key DB 110 to identify the GW address of the gateway Gi (step S2703). The management server 101 causes the extracting unit 2102 to determine whether the GW address identified at step S2701 matches the GW address identified at step S2703 (step S2704).

If the GW addresses match (step S2704: YES), the management server 101 causes the extracting unit 2102 to extract from the encryption key DB 110, the encryption key Ki specific to the gateway Gi (step S2705) and goes to step S2603 depicted in FIG. 26. On the other hand, if the GW addresses do not match (step S2704: NO), the management server 101 causes the extracting unit 2102 to increment "i" of the gateway Gi (step S2706) and determine whether "i" is greater than "n" (step S2707).

If "i" is equal to or less than "n" (step S2707: NO), the procedure returns to step S2703. On the other hand, if "i" is greater than "n" (step S2707: YES), the management server 101 causes the extracting unit 2102 to execute an error process (step S2708) and terminates the series of the processes of the management server 101.

As a result, the encryption key Ki for decrypting the received encrypted packet SPi can be extracted from the encryption key DB 110. In a specific example of the error process of step S2708, for example, the extracting unit 2102 may transmit, via the mobile terminal MT to the node N, an error message indicating that the encryption key Ki for decrypting the encrypted packet SPi cannot be extracted.

The error process at step S2708 is executed when the encrypted packet SPi has been tampered with or when a portion of the encrypted packet SPi is missing, for example. This error process can prompt retransmission of the encrypted packet SPi by the node N.

A specific process procedure of the key extraction process (part 2) at step S2602 depicted in FIG. 26 will be described. The key extraction process (part 2) of the following description is a process when the GW address included in the encrypted packet SPi is encrypted.

Figure 28:
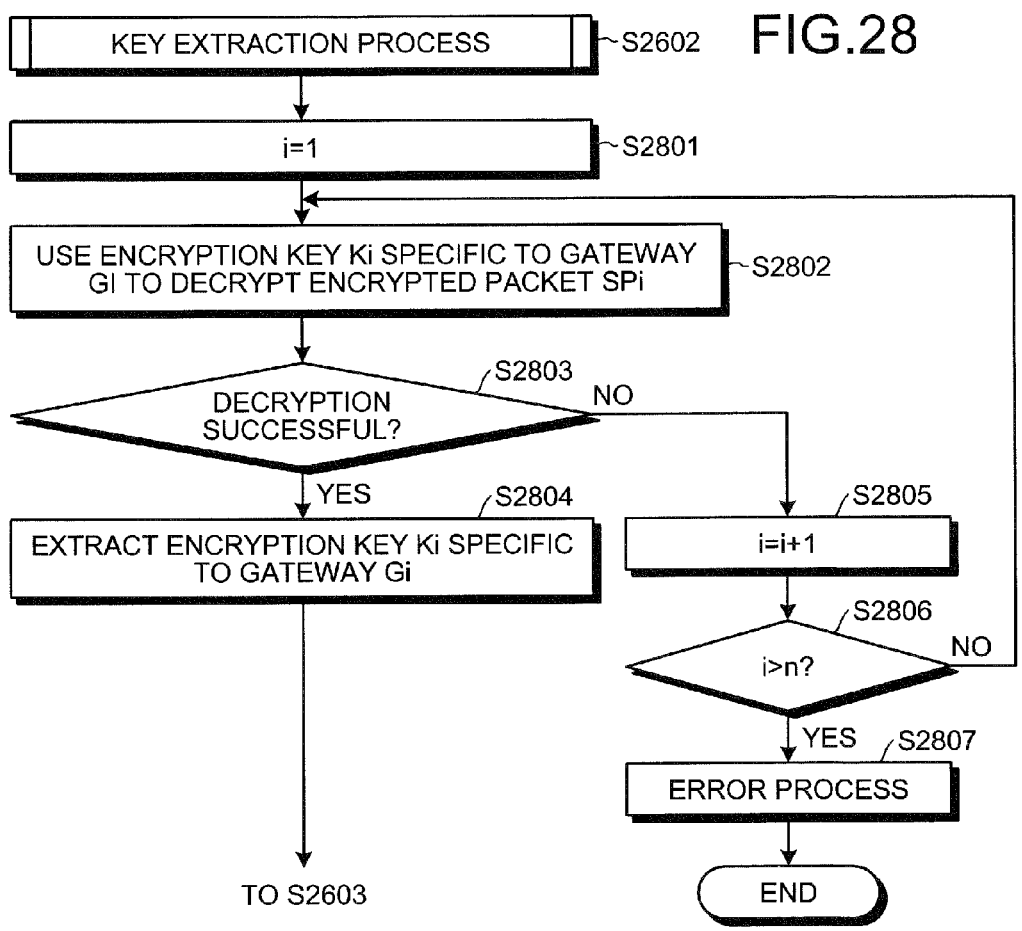
FIG. 28 is a flowchart of an example of a specific process procedure of the key extraction process (part 2) at step S2602 according to the first embodiment.

FIG. 28 is a flowchart of an example of a specific process procedure of the key extraction process (part 2) at step S2602 according to the first embodiment. In the flowchart of FIG. 28, first, the management server 101 causes the extracting unit 2102 to initialize "i" of the gateway Gi to "i=1" (step S2801). The management server 101 causes the extracting unit 2102 to use the encryption key Ki specific to the gateway Gi in the encryption key DB 110 to decrypt the encrypted packet SPi received at step S2601 depicted in FIG. 26 (step S2802).

The management server 101 then causes the extracting unit 2102 to determine whether the decryption of the encrypted packet SPi is successful (step S2803). If the decryption of the encrypted packet SPi is successful (step S2803: YES), the management server 101 causes the extracting unit 2102 to extract from the encryption key DB 110, the encryption key Ki specific to the gateway Gi (step S2804) and goes to step S2603 depicted in FIG. 26.

On the other hand, if decryption of the encrypted packet SPi has failed (step S2803: NO), the management server 101 causes the extracting unit 2102 to increment "i" of the gateway Gi (step S2805) and determine whether "i" is greater than "n" (step S2806).

If "i" is equal to or less than "n" (step S2806: NO), the procedure returns to step S2802. On the other hand, if "i" is greater than "n" (step S2806: YES), the management server 101 causes the extracting unit 2102 to execute an error process (step S2807) and terminates the series of the operations of the management server 101.

As a result, even if the GW address is not included in the header portion 2210 of the encrypted packet SPi, the encryption key Ki for decrypting the received encrypted packet SPi can be extracted from the encryption key DB 110.

A communication process after the encryption key setting of the new node Nx and a communication process of another node N other than the new node Nx will be described. The new node Nx is a node N in which multiple encryption keys are set and another node N is a node in which a single encryption key is set.

Figure 29:
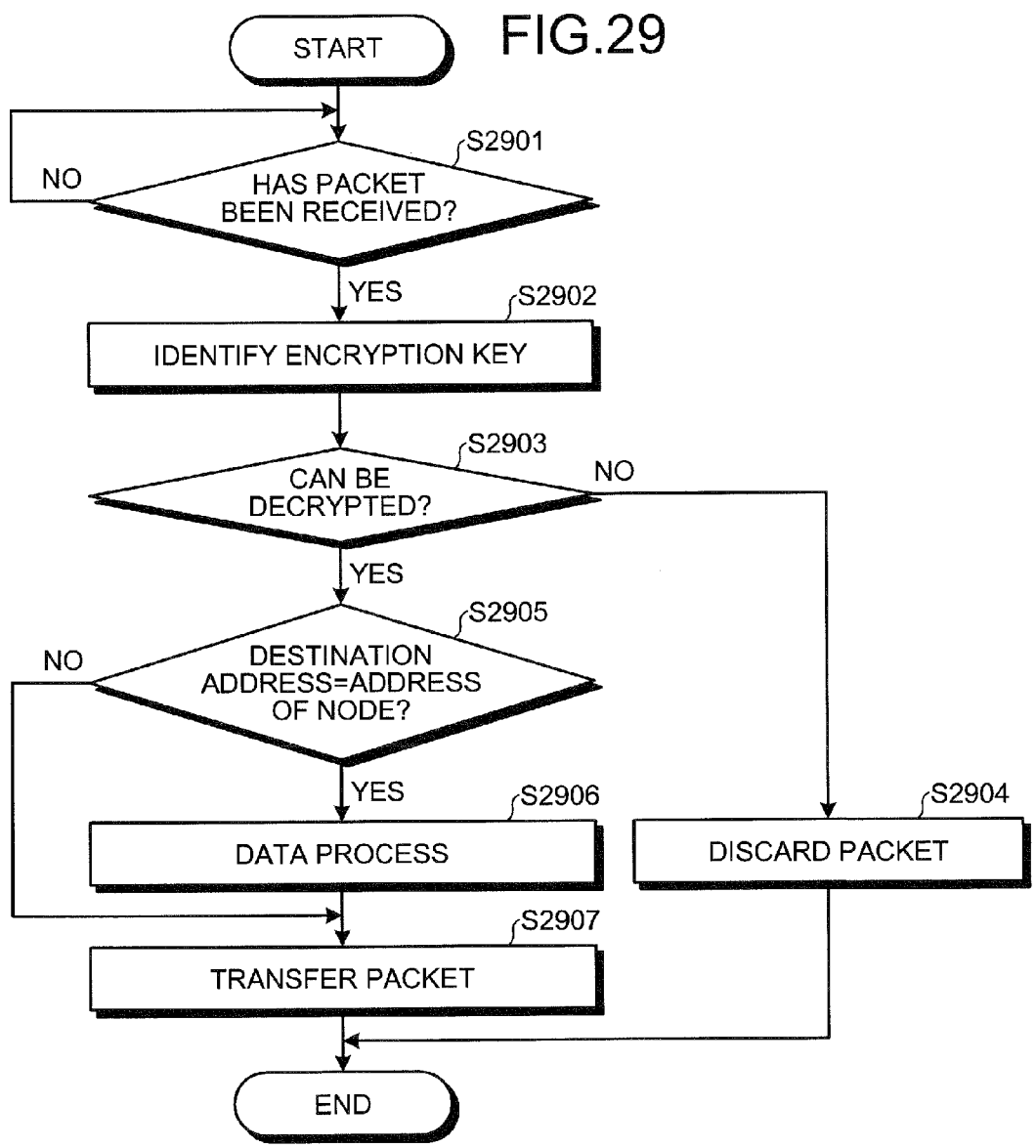
FIG. 29 is a flowchart of a communication process procedure after encryption key setting of the new node according to the first embodiment.

FIG. 29 is a flowchart of a communication process procedure after the encryption key setting of the new node Nx according to the first embodiment. First, the new node Nx awaits the receipt of a packet (step S2901: NO), and when a packet has been received (step S2901: YES), the new node Nx identifies the encryption key decrypting the received packet (step S2902).

For example, the new node Nx identifies which encryption key should be used, based on the gateway to which the node sending the received packet belongs. In the example of FIG. 15, if the packet is from the node N1-3, the encryption key K1 is identified and if the packet is from the node N2-2, the encryption key K2 is identified. Alternatively, the encryption keys may sequentially be selected to attempt the decryption of the received packet and the encryption key of successful decryption may be identified.

The new node Nx determines whether the received packet can be decrypted using the identified encryption key (step S2903). If the packet cannot be decrypted (step S2903: NO), this means that the received packet is intercepted and therefore, the received packet is discarded (step S2904) and the communication process is terminated.

On the other hand, if the packet can be decrypted (step S2903: YES), the new node Nx determines whether the destination address of the received packet is the address of the node (the new node Nx) (or address for broadcast) (step S2905). If the destination address is the address of the node (the new node Nx) (or address for broadcast) (step S2905: YES), a data process based on the decrypted data is executed (step S2906), and the received packet is transferred to a transfer destination (step S2907). The communication process is then terminated.

On the other hand, if the destination address is not the address of the node (the new node Nx) (or address for broadcast) (step S2905: NO), the new node Nx transfers the received packet to a transfer destination (step S2907). If a routing table acquired through a broadcast packet from the gateway Gi is retained, the transfer destination is a node specified by the routing table. If no routing table exists, the transfer destination corresponds to all the nodes within the communication range.

Figure 30:
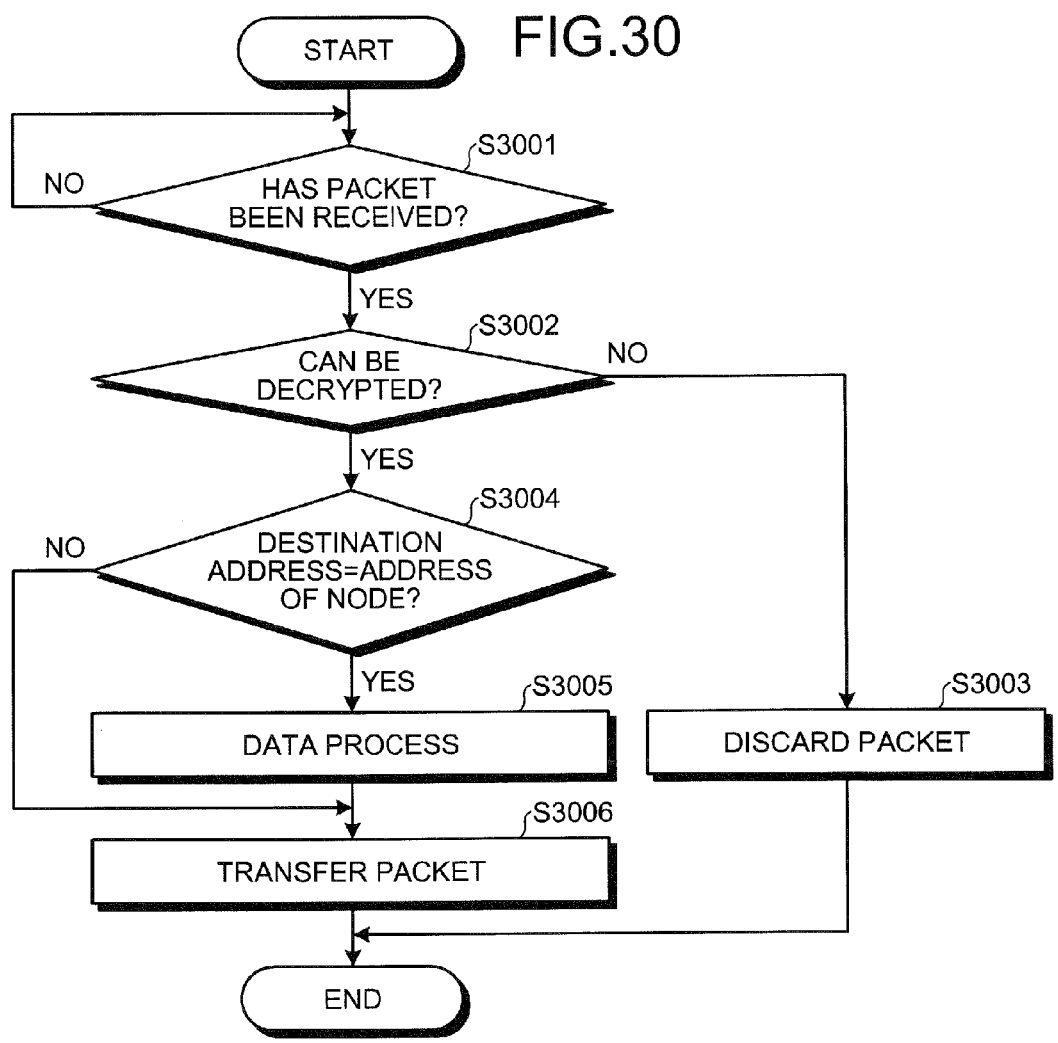
FIG. 30 is a flowchart of a communication process procedure after the encryption key setting of another node according to the first embodiment.

FIG. 30 is a flowchart of a communication process procedure after the encryption key setting of another node N (existing node other than the new node Nx) according to the first embodiment. First, receipt of a packet is awaited (step S3001: YES), when a packet has been received (step S3001: YES), the other node N determines whether the received packet can be decrypted using the encryption key Ki (step S3002). If multiple encryption keys Ki are present, each of the encryption keys Ki is attempted until the packet can be decrypted. If the packet cannot be decrypted by any of the encryptions key Ki (step S3002: NO), this means that the received packet is intercepted and therefore, the other node N discards the received packet (step S3003) and the communication process is terminated.

On the other hand, if the packet can be decrypted (step S3002: YES), the other node N determines whether the destination address of the received packet is the address of the node (the other node N) (or address for broadcast) (step S3004). If the destination address is the address of the node (the other node N) (or address for broadcast) (step S3004: YES), the other node N executes a data process based on the decrypted data (step S3005) and transfers the received packet to a transfer destination (step S3006). If multiple encryption keys Ki are present, the decrypted data is encrypted by each of the encryption keys Ki and transferred to the transfer destination. The communication process is then terminated.

On the other hand, if the destination address is not the address of the node (the other node N) (or address for broadcast) (step S3004: NO), the other node N transfers the received packet to a transfer destination (step S3006). The transfer destination is a node prescribed by a routing table acquired through a broadcast packet from the gateway Gi. If no routing table exists, the transfer destination corresponds to all the nodes within the communication range.

If a packet is transmitted from the new node Nx, the packet is encrypted for each encryption key to transmit an encrypted packet group. In this case, since the other node N can decrypt the packets only with the encryption key Ki thereof, the encrypted packet SPi encrypted with the encryption key Ki is transmitted only to the gateway Gi, and an encrypted packet SPj encrypted with an encryption key Kj ($j \neq i$) is transmitted only to a gateway Gj. If the encrypted packet SPj is received by the node N in the ad-hoc network Ai, the encrypted packet SPj is discarded as described at step S3003 of FIG. 30.

As described above, according to the first embodiment, the node N in the ad-hoc network Ai can transmit via the mobile terminal MT to the management server 101, the encrypted packet SPi broadcasted from the gateway Gi. As a result, the node N can receive and set the encryption key Ki specific to the gateway Gi for decrypting the encrypted packet SPi, via the mobile terminal MT from the management server 101.

In this way, by using, as a clue, the encrypted packet SPi from the gateway Gi that can be received even if the encryption key Ki for secure communication is not set, the node N can make a key request to the management server 101 via the mobile terminal MT, to acquire the encryption key Ki to be set. As a result, in such a case when the node N is initially introduced, the operator OP does not have to perform an operation such as thoroughly confirming communication states between geographically narrowed-down candidate gateways and the node N, and the efficiency can be increased in the setting operation of the encryption key Ki for the node N. Since it is not necessary to record the encryption keys of the candidate gateways in the mobile terminal MT, etc. for the confirming operation, the risk of information leakage can be reduced when the mobile terminal MT is transported.

According to the first embodiment, since specific encryption keys are set in respective ad-hoc networks, the nodes in the ad-hoc network Ai retain the same encryption key Ki. On the other hand, in a node (the new node Nx) communicable with multiple ad-hoc networks, the encryption keys of the respective ad-hoc networks are set. Therefore, even when communication cannot be performed through an ad-hoc network due to communication failure, data can be transmitted through another ad-hoc network to the management server 101.

Thus, while maintaining security, the node with multiple encryption keys set can autonomously select a communicable gateway and prevent drops in robustness. Since multiple encryption keys are set, if one key is leaked, no data is leaked from an ad-hoc network communicable through an encryption key that is not leaked. Therefore, as compared to an ad-hoc network in which only one encryption key can be set for each gateway, the key leakage risk can be reduced.

All the encryption keys of respective ad-hoc networks are set only in a node (the new node Nx) within the communication ranges of the multiple ad-hoc networks, and other nodes N have only one encryption key Ki set specific to the gateway Gi to which the node N belongs. Therefore, since only one encryption key Ki is necessary for the processes (encryption, decryption) in the nodes N in the ad-hoc network Ai and only the encrypted packets SPi encrypted with the one encryption key Ki are transmitted, increases in the amount of communication can be suppressed.

A second embodiment will be described. Although an example of setting the multiple encryption keys Ki in the new node Nx is described in the first embodiment, the multiple encryption keys set in the new node Nx are separately set as main and sub-keys in the second embodiment as depicted in the fifth example of FIG. 5. For example, the encryption and decryption are normally performed with the main key and, if the decryption cannot be achieved with the main key, a sub-key is used. Subsequently, a new node is set to be subordinate to the newly set node Nx. If a new node is present that is subordinate to the node Nx, the node Nx is referred to as a "boundary node".

Constituent elements identical to those in the first embodiment are denoted by the same reference numerals used in the first embodiment and will not be described. The description other than the main/sub determination of encryption keys is common with the first embodiment and therefore will not be given.

FIGS. 31 to 36 are explanatory views of an example of introduction of a new node subordinate to a node at a boundary between (within communication ranges of) multiple ad-hoc networks of the downstream type according to the second embodiment.

Figure 31:
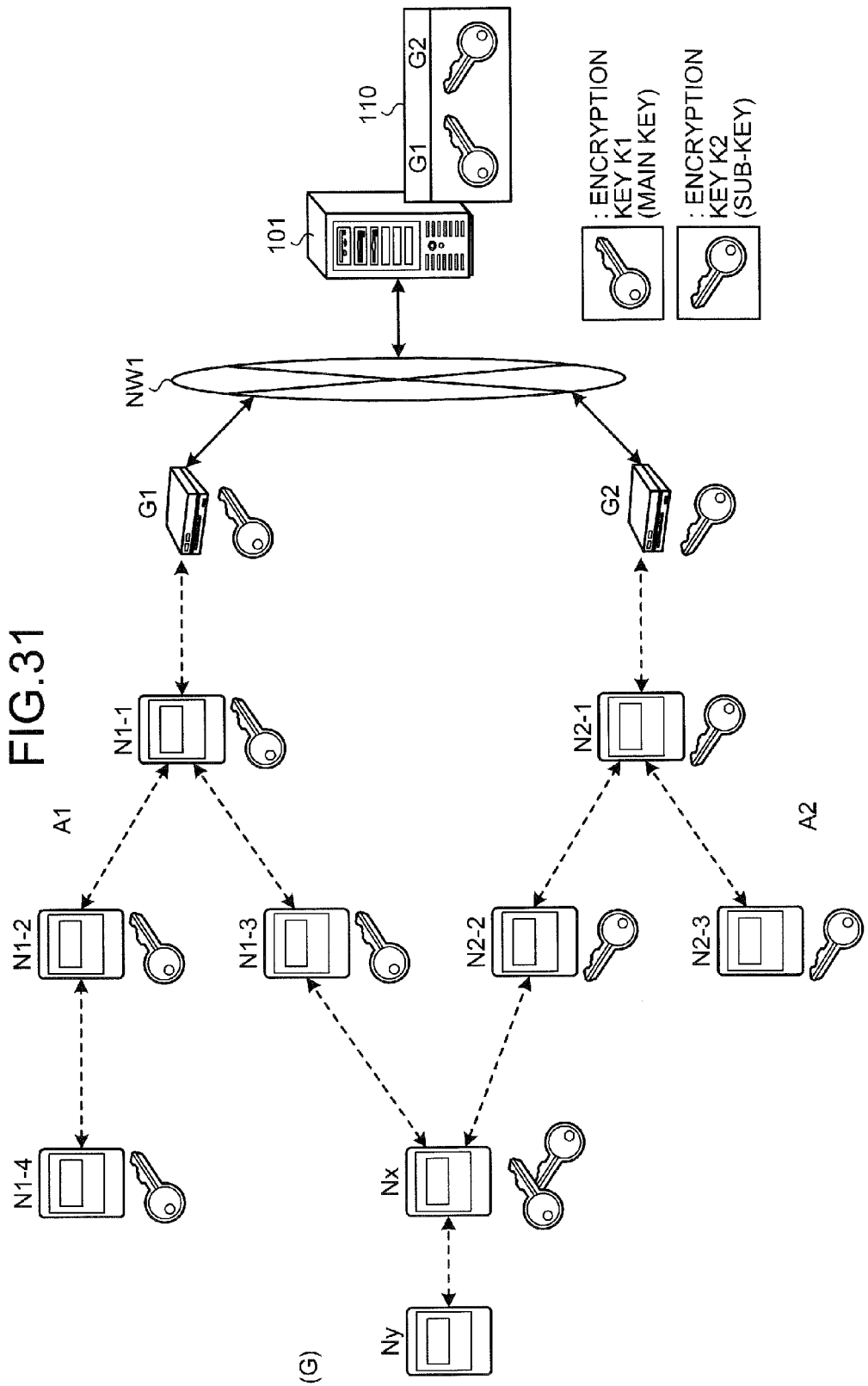
FIGS. 31, 32, 33, 34, 35, and 36 are explanatory views of an example of introduction of a new node subordinate to a node at a boundary between (within communication ranges of) multiple ad-hoc networks of the downstream type according to a second embodiment.

In a state (G) depicted in FIG. 31, the encryption keys K1 and K2 are set in the newly set boundary node Nx and the encryption key K1 and the encryption key K2 are defined as a main key and a sub-key, respectively. The main/sub determination of the encryption keys K1 and K2 may be performed by the boundary node Nx or may be performed by the management server. This point will be described later. A new node Ny is a new node subordinate to the boundary node Nx.

Figure 32:
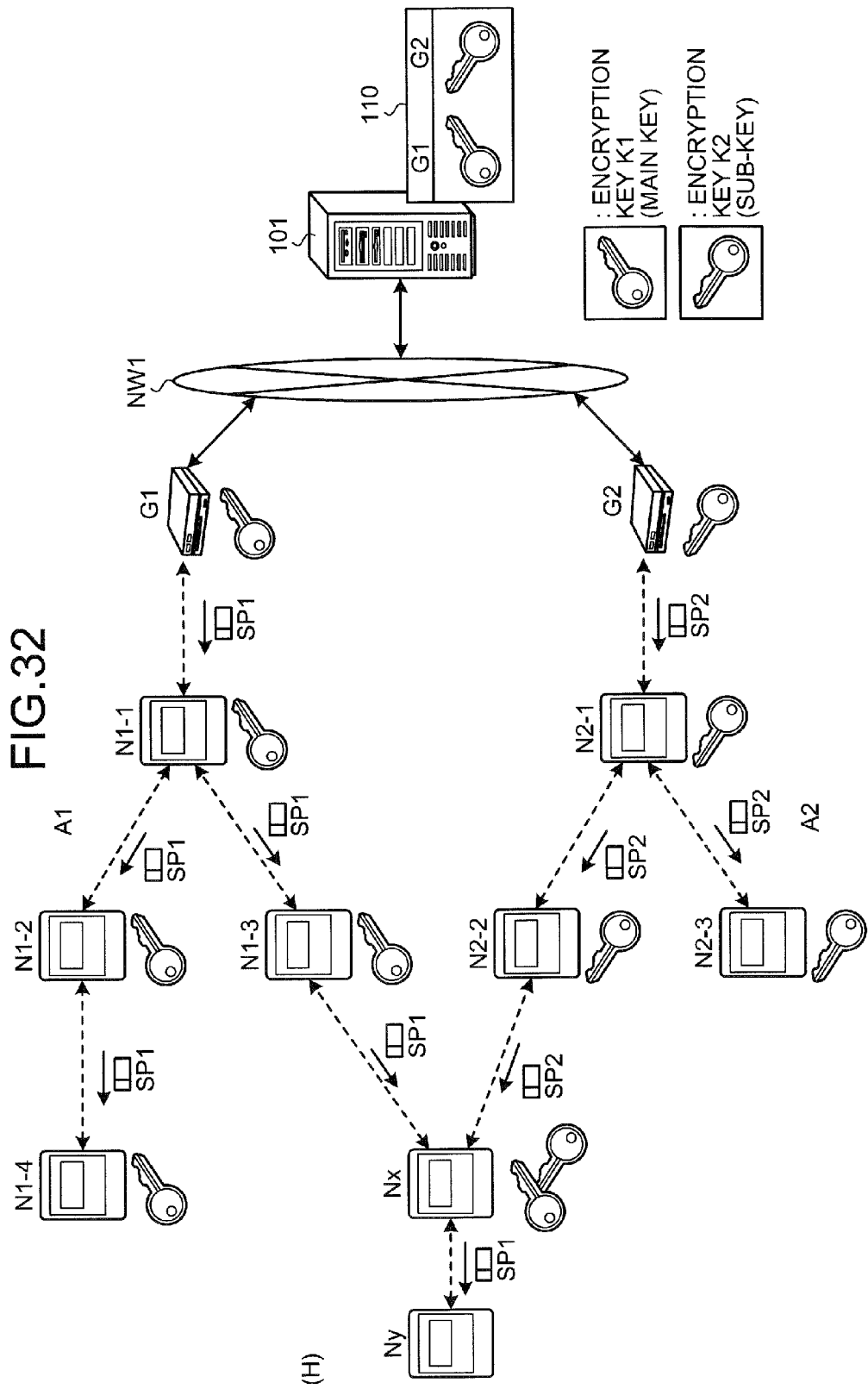

FIG. 32 depicts a state (H) subsequent to the state (G). In the state (H), the gateway G1 broadcasts on the ad-hoc network A1, an encrypted packet SP1 encrypted using the encryption key K1. Similarly, the gateway G2 broadcasts on the ad-hoc network A2, an encrypted packet SP2 encrypted using the encryption key K2. The node Nx is within the communication range of the node N1-3 and therefore, receives (intercepts) the encrypted packet SP1 that is received by the node N1-3 and from the node N1-1.

On the other hand, the node Nx is within the communication range of the node N2-2 and therefore, intercepts the encrypted packet SP2 that is received by the node N2-2 and from the node N2-1. Since the encryption key K1 and the encryption key K2 are set as the main key and the sub-key, respectively, the node Nx can decrypt the encrypted packet SP1 using the main key but cannot decrypt the encrypted packet SP2 using the main key. However, the encrypted packet SP2 can be decrypted using the sub-key (encryption key K2), although the broadcast is not transferred and the encrypted packet SP2 is discarded by the node Nx (or is encrypted again using the encryption key K1 and broadcasted). Since the encrypted packet SP2 is discarded by the node Nx, the new node Ny intercepts only the encrypted packet SP1 among the encrypted packets SP1 and SP2.

Figure 33:
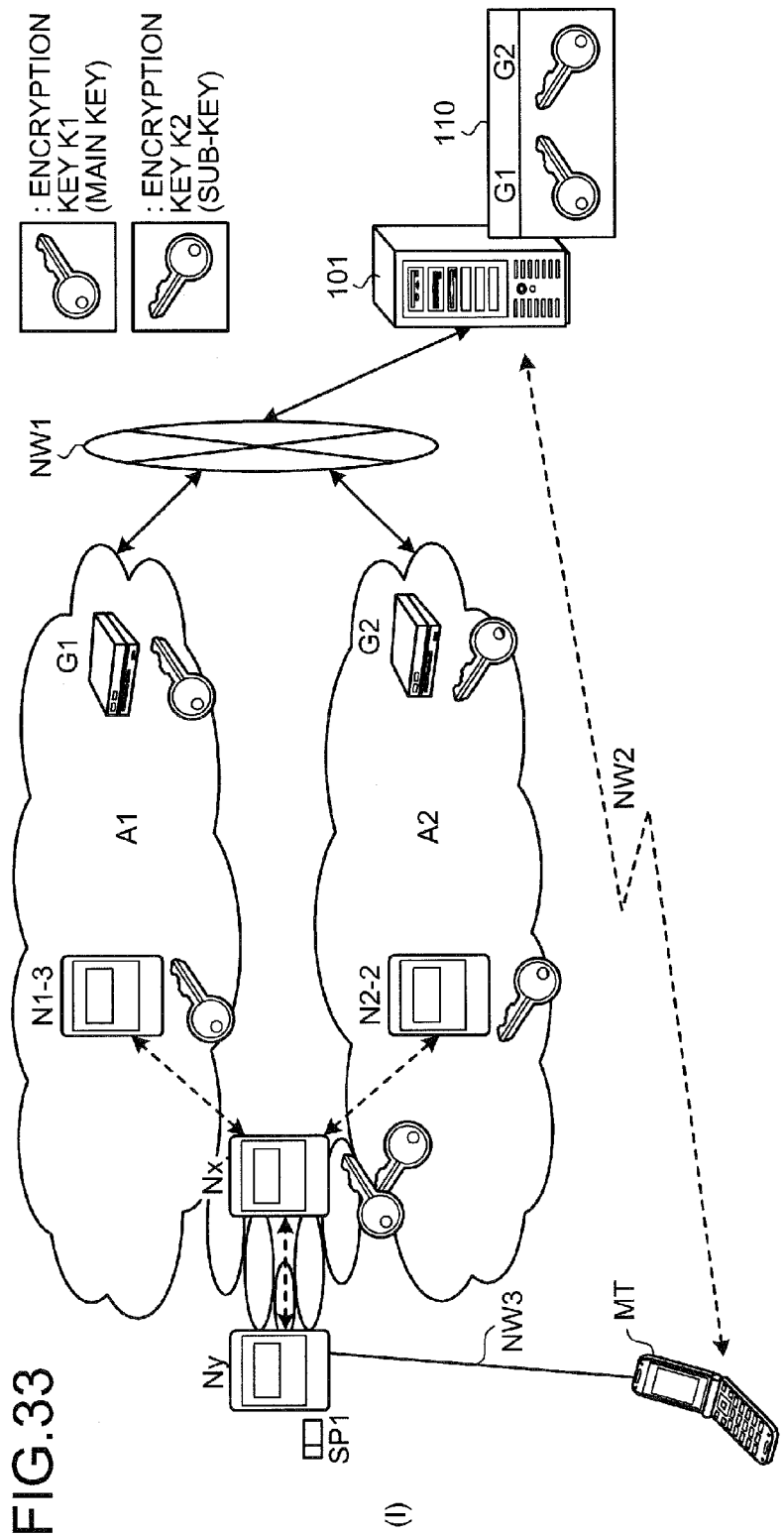

FIG. 33 depicts a state (I) subsequent to the state (H). The state (I) depicts a state in which the mobile terminal MT connectable via the secure network NW2 to the management server 101 is connected to the new node Ny.

Figure 34:
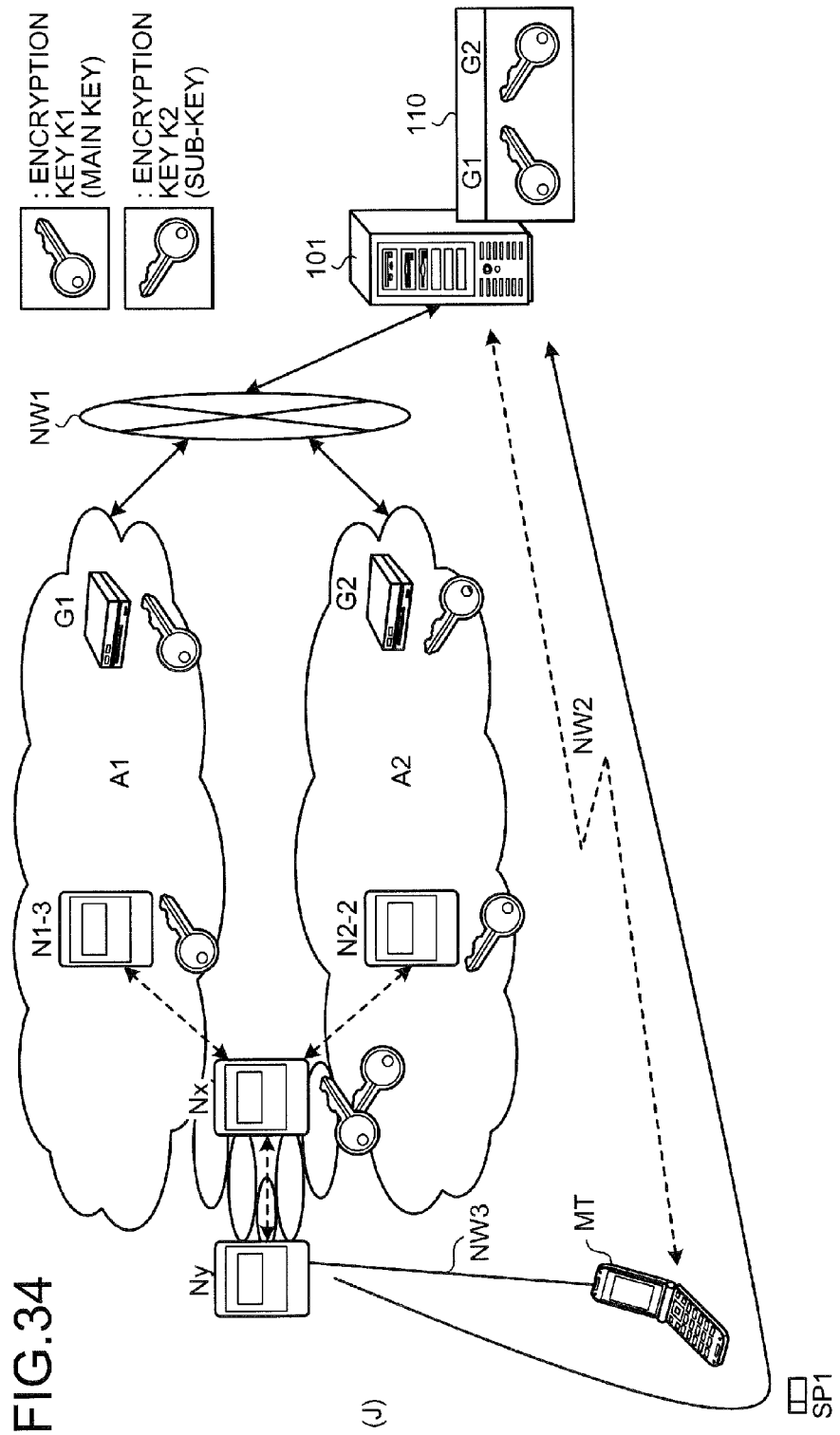

FIG. 34 depicts a state (J) subsequent to the state (I). In the state (J), from the state of (I), the new node Ny transmits the intercepted encrypted packet SP1 via the network NW3 to the mobile terminal MT, and the mobile terminal MT transmits via the network NW2 to the management server 101, the encrypted packet SP1 that is received from the new node Ny.

Figure 35:
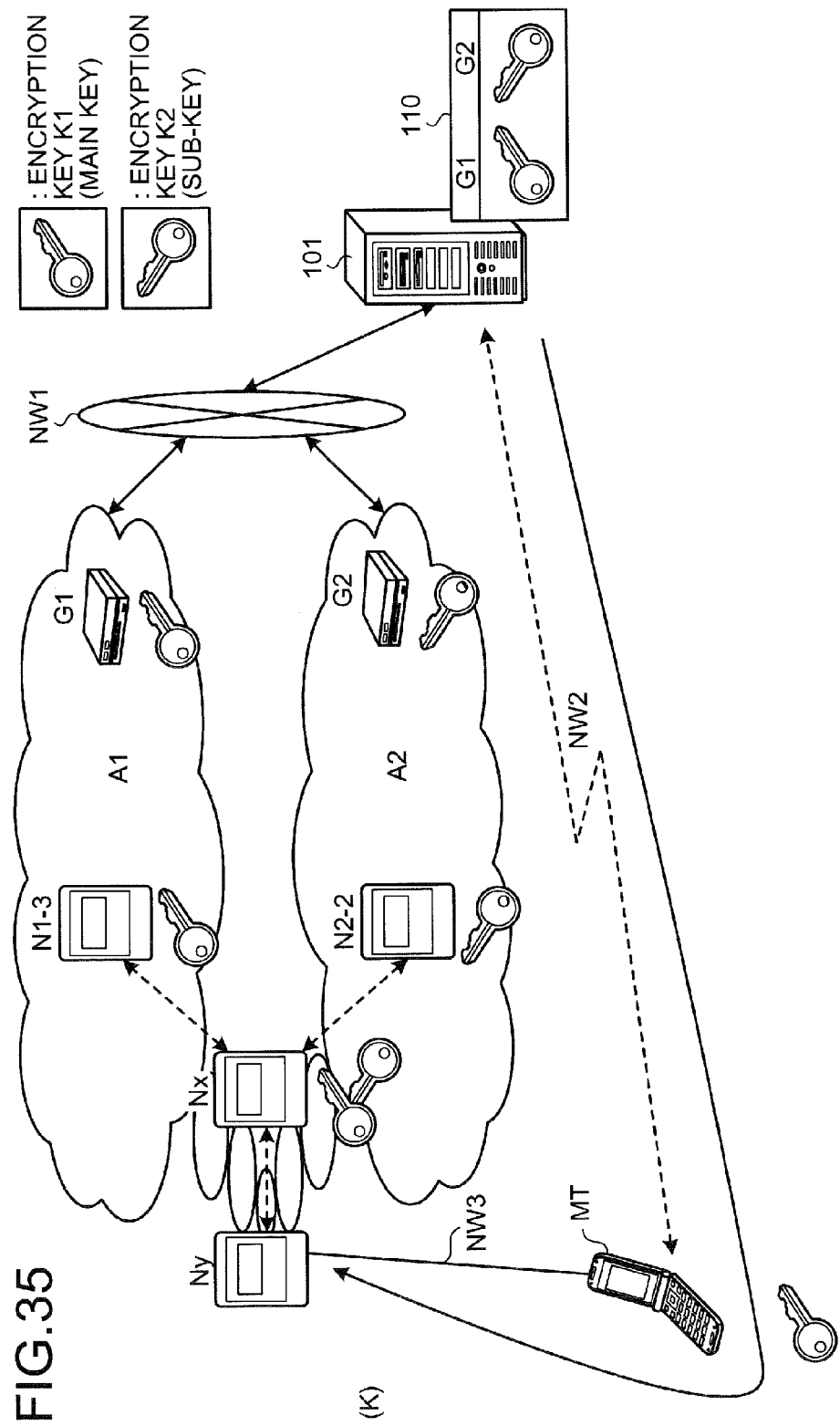

FIG. 35 depicts a state (K) subsequent to the state (J). In the state (K), the management server 101 identifies the gateway G1 from the encrypted packet SP1 received at the state (J). Although various identifying methods exist, for example, if the address of the source gateway G1 is described in an unencrypted header of the encrypted packet SP1, the header can be analyzed to identify the address of the gateway G1. As a result, the management server 101 extracts the encryption key K1 stored and correlated with the address of the gateway G1 from the encryption key DB 110.

If the address of the gateway G1 cannot be identified from the header of the encrypted packet SP1, the decryption of the encrypted packet SP1 is attempted using the encryption keys K1, K2, ... in the encryption key DB 110. The management server 101 extracts from the encryption key DB 110, the encryption key K1 of successful decryption. In any case, the management server 101 transmits the encryption key K1 extracted from the encryption key DB 110, via the network NW2, the mobile terminal MT, and the network NW3 to the new node Ny.

Figure 36:
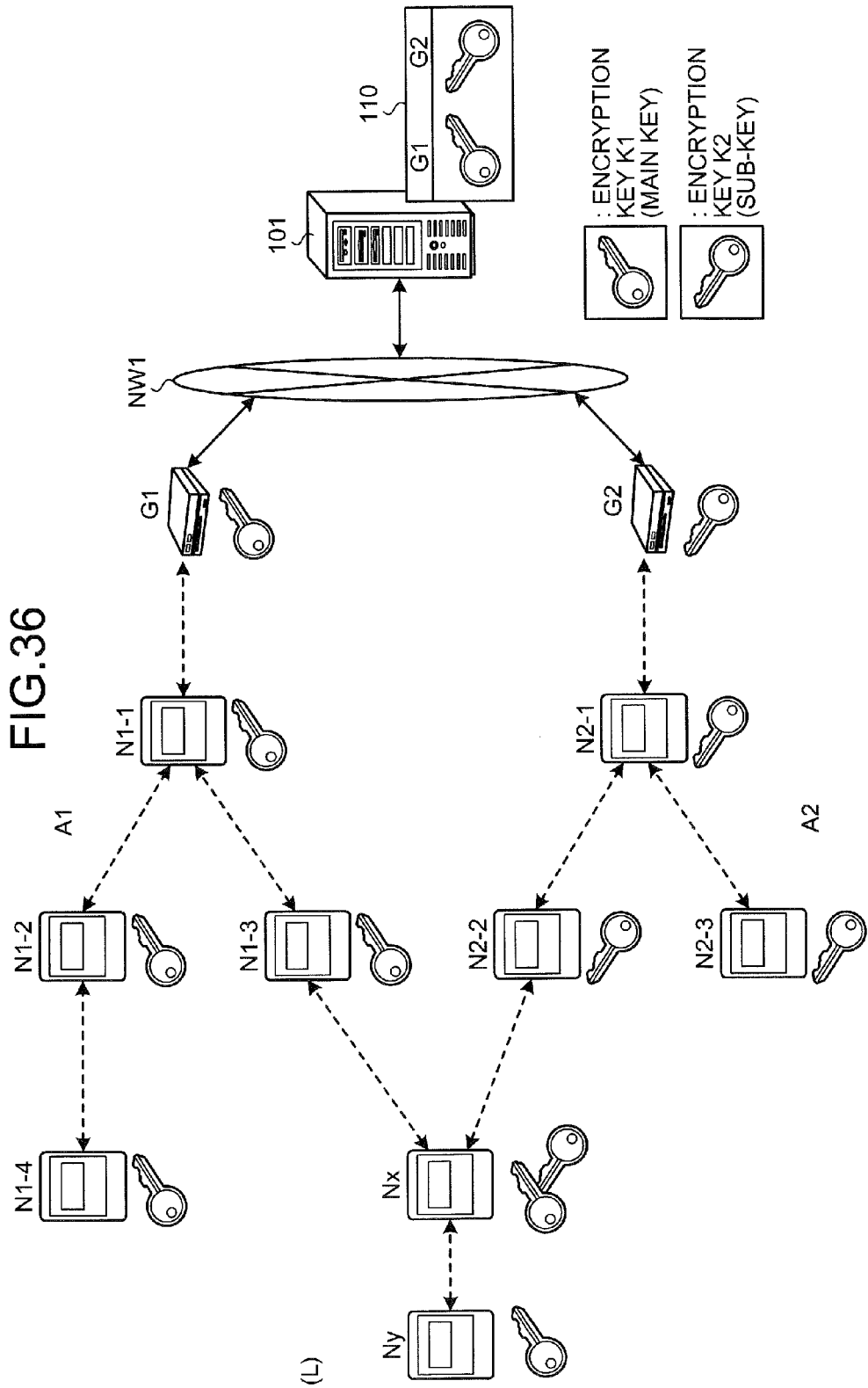

FIG. 36 depicts a state (L) subsequent to the state (K). In the state (L), the new node Ny receives and sets as a key for encryption and decryption, the encryption key K1 transmitted from the management server 101. Therefore, subsequently, the new node Ny can decrypt the encrypted packet SP1 from the node Nx using the encryption key K1. From the new node Ny, the encrypted packet SP1 encrypted using the encryption key K1 is transmitted to the node Nx.

As described above, by separating the main key and the sub-key, only the encryption key K1 acting as the main key may be allocated to the node Ny set to be subordinate to the node Nx and the allocation of the encryption key K2 acting as the sub-key is not necessary. As a result, the number of keys in the node Ny and subsequent nodes subordinate to the new node Nx can be one and, while the security and the robustness are maintained, an increase in the amount of communication can be suppressed in each of the ad-hoc networks A1 and A2. The second embodiment will hereinafter be described in detail.

Figure 37:
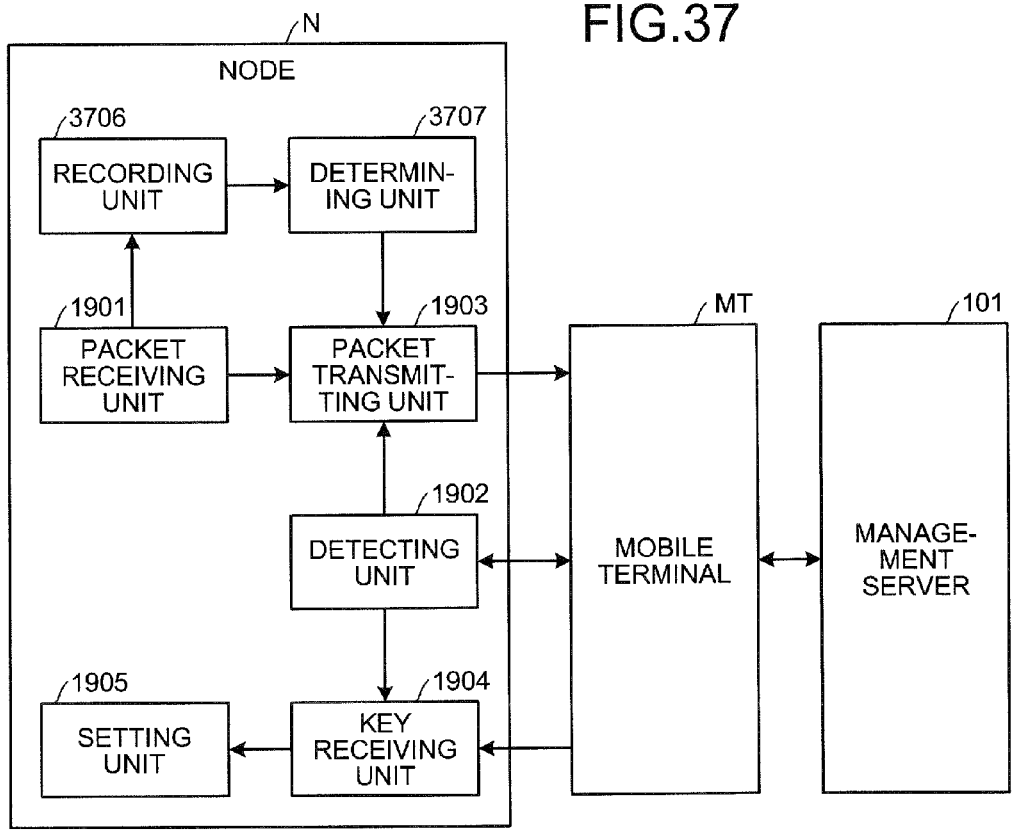
FIG. 37 is a block diagram of a functional configuration example of the node according to the second embodiment.

FIG. 37 is a block diagram of a functional configuration example of the node N according to the second embodiment. In FIG. 37, the node N includes the functional units 1901 to 1905 depicted in FIG. 19 as well as a recording unit 3706 and a determining unit 3707. For example, functions of the recording unit 3706 and the determining unit 3707 are implemented by the CPU 1701 executing programs stored in a storage device such as the RAM 1702 and the flash memory 1703 depicted in FIG. 17 or by the I/F 1704.

The recording unit 3706 records information concerning a received encrypted packet SPi. For example, the recording unit 3706 records into a packet information table, the hop number and the GW address included in the header portion 2010 of the encrypted packet SPi depicted in FIG. 20. The packet information table will be described.

Figure 38:
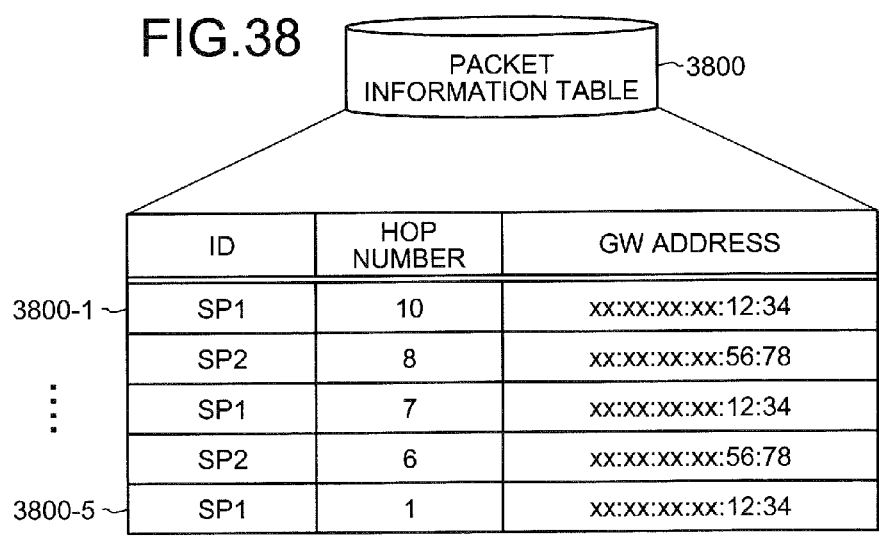
FIG. 38 is an explanatory view of an example of storage contents of a packet information table according to the second embodiment.

FIG. 38 is an explanatory view of an example of storage contents of a packet information table according to the second embodiment. A packet information table 3800 is implemented by a storage device such as the RAM 1702 and the flash memory 1703, for example. In FIG. 38, the packet information table 3800 has fields of IDs, hop numbers, and GW addresses and sets information in each field to store packet information 3800-1 to 3800-5 as records.

The IDs are identifiers of the encrypted packets SPi used for explanation in this description. The hop number is the remaining number of transfers indicative of how many times the encrypted packet SPi will be transferred. The GW addresses are addresses of the gateways Gi. The packet information of the encrypted packets SPi is stored to the packet information table 3800, in the order of reception of the encrypted packets SPi.

Returning to the description of FIG. 37, if multiple encrypted packets SPi are received, the determining unit 3707 determines the priority of the encrypted packets SPi based on the recorded information concerning the encrypted packets SPi. The priority is information identifying which encryption key Ki specific to the gateway Gi in the ad-hoc network Ai should be set as the main key. A higher value of the priority may indicate higher priority or a lower value may indicate higher priority. In this description, as an example, a higher value of the priority indicates higher priority.

The packet transmitting unit 1903 transmits the encrypted packet SPi via the mobile terminal MT to the management server 101 and also transmits the priority. An example of determining the encrypted packet SPi to be transmitted will hereinafter be described.

For example, it is assumed that when the installation location of the node N is within the communication ranges of the ad-hoc networks A1 and A2, the packet receiving unit 1901 receives encrypted packets SP1 and SP2 from different gateways G1 and G2.

In this case, for example, the determining unit 3707 refers to the packet information table 3800 to assign to the encrypted packets SPi, the priority according to the sequence of arrival. For example, in FIG. 38, the highest priority is assigned in the sequence from the encrypted packet SP1 corresponding to the oldest packet information 3800-1. As a result, the encryption key K1 capable of decrypting the encrypted packet SP1 first received by the node N is determined as the main key in the management server 101.

For example, the determining unit 3707 may refer to the packet information table 3800 to assign to the encrypted packets SPi, the priority based on the hop number. For example, the priority is assigned sequentially from the smallest hop number. For example, in FIG. 38, the priority is assigned in ascending order from the encrypted packet SP1 corresponding to the packet information 3800-1 having the largest hop number "10". As a result, the encryption key K1 capable of decrypting the encrypted packet SPi associated with the smallest number of transfers can be determined as the main key in the management server 101.

When the number of transfers of the encrypted packet SPi is smaller, the gateway Gi is likely to be located at a geographically closer position. Therefore, by assigning the highest priority to the encrypted packet SPi associated with the smallest number of transfers, the encryption key Ki specific to the closer gateway Gi can consequently be determined as the main key and the communication efficiency with the gateway Gi can be improved.

For example, the determining unit 3707 may refer to the packet information table 3800 to determine the priority of the encrypted packets SPi, based on an average value of the hop number of each gateway Gi. For example, first, the determining unit 3707 refers to the packet information table 3800 to calculate an average value of the hop number for each GW address.

In the example of FIG. 38, the average value of the hop number of the GW address "xx:xx:xx:xx:12:34" is "6=(10+7+1)/3". The average value of the hop number of the GW address "xx:xx:xx:xx:56:78" is "7=(8+6)/2". In this case, for example, the determining unit 3707 sets the priority of the encrypted packet SP2 broadcasted from the gateway G2 of the GW address "xx:xx:xx:xx:56:78" having the largest average value to be the greatest. As a result, the encryption key Ki capable of decrypting the encrypted packet SPi associated with the statistically smallest number of transfers can be determined as the main key in the management server 101.

Figure 39:
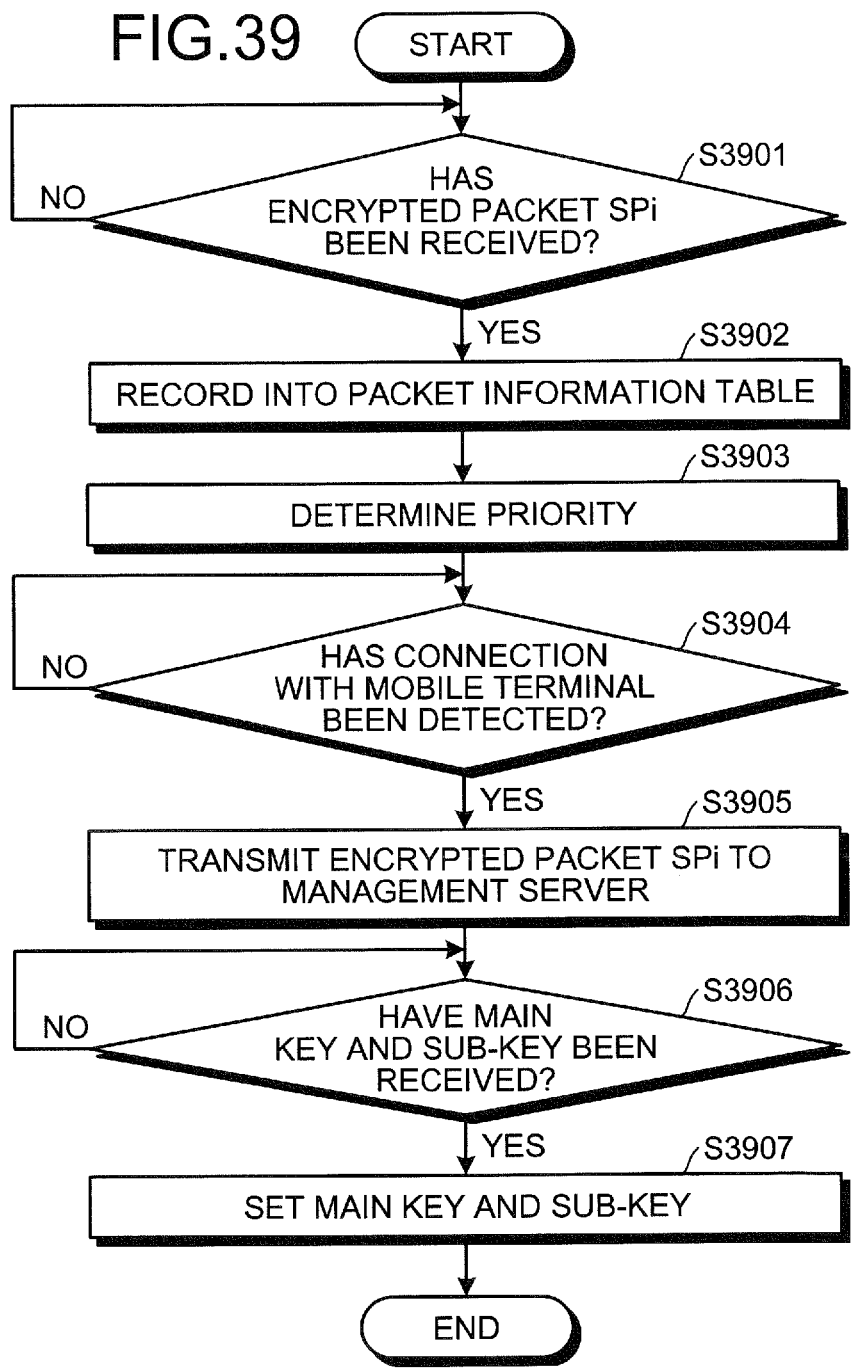
FIG. 39 is a flowchart of an example of the key setting process procedure of the node according to the second embodiment.

FIG. 39 is a flowchart of an example of a key setting process procedure of the node N according to the second embodiment. In the flowchart of FIG. 39, first, the node N determines whether the packet receiving unit 1901 receives within a predetermined period, an encrypted packet SPi broadcasted from the gateway Gi in the ad-hoc network Ai (step S3901).

Receipt of an encrypted packet SPi is awaited (step S3901: NO), and when an encrypted packet SPi has been received (step S3901: YES), the node N records the packet information into the packet information table 3800 for each of the received encrypted packets SPi (step S3902). The node N causes the determining unit 3707 to determine the priority of each of the encrypted packets SPi received within the predetermined period (step S3903). The node N then determines whether the detecting unit 1902 detects connection with the mobile terminal MT communicable with the management server 101 (step S3904).

Detection of a connection with the mobile terminal MT is awaited (step S3904: NO), and when a connection with the mobile terminal MT has been detected (step S3904: YES), the node N causes the packet transmitting unit 1903 to transmit the received multiple encrypted packets SPi and the respective priorities via the mobile terminal MT to the management server 101 (step S3905).

The node N then determines whether the key receiving unit 1904 has received all the keys (the main key and the sub-key) via the mobile terminal MT from the management server 101 (step S3906). In the case of the new node Nx, the main key and the sub-key are received from the management server 101; however, in the case of normal nodes N other than the new node Nx, only the main key is received.

Receipt of the all the keys is awaited (the main key and the sub-key) (step S3906: NO), and when all the keys have been received (step S3906: YES), the node N causes the setting unit 1905 to set the received main key as a key for packet encryption and the sub-key as a key used if the main key cannot be utilized (step S3907). The series of the operations according to this flowchart is then terminated. As a result, the node N can set the multiple encryption keys Ki classified as the main key and the sub-key. As described above, in the case of a normal node N other than the new node Nx, only the main key is set without a setting of the sub-key.

Figure 40:
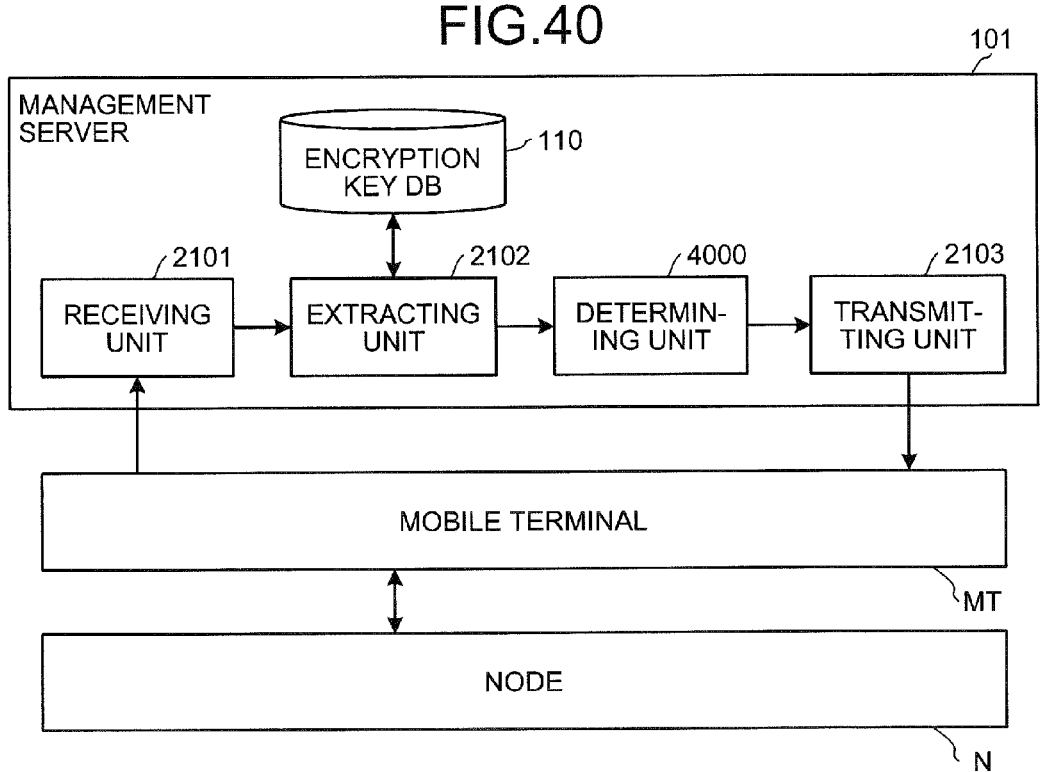
FIG. 40 is a block diagram of a functional configuration of the management server according to the second embodiment.

FIG. 40 is a block diagram of a functional configuration of the management server 101 according to the second embodiment. In FIG. 40, the management server 101 includes the receiving unit 2101, the extracting unit 2102, and the transmitting unit 2103 as well as a determining unit 4000. For example, the function of the determining unit 4000 is implemented by the CPU 1601 executing programs stored in a storage device such as the ROM 1602, the RAM 1603, the magnetic disk 1605, and the optical disk 1607 depicted in FIG. 16 or by the I/F 1608. The process results of the determining unit 4000 are stored in a storage device such as the RAM 1603, the magnetic disk 1605, and the optical disk 1607, for example.

The determining unit 4000 determines based on the order of arrival of the multiple encrypted packets SPi, main and sub-keys from among the multiple encryption keys Ki extracted by the extracting unit 2102. For example, the determining unit 4000 determines the main and sub-keys according to the priority corresponding to the order of arrival transmitted from the node N.

The determining unit 4000 may determine based on the number of transfers of the multiple encrypted packets SPi in the respective ad-hoc networks Ai, the main and sub-keys from among the multiple encryption keys Ki extracted by the extracting unit 2102. For example, the determining unit 4000 determines the main and sub-keys according to the priority corresponding to the hop number transmitted from the node N.

The determining unit 4000 determines the main and sub-keys regardless of the type of the priority as follows. For example, it is assumed that encrypted packets SP1 to SP3 and priorities thereof are transmitted. If the priority of the encrypted packet SP1 is the highest among the encrypted packets SP1 to SP3, an encryption key K1 capable of decrypting the encrypted packet SP1 is determined as the main key. The determining unit 4000 determines encryption keys K2 and K3 capable of decrypting the remaining encrypted packets SP2 and SP3, respectively, as the sub-keys. At least one sub-key is needed.

If the node N does not include the recording unit 3706 and the determining unit 3707, the determining unit 4000 may determine the main and sub-keys based on the order of arrival of the encrypted packets SPi at the management server 101. For example, it is assumed that the encrypted packets SP1 to SP3 are transmitted. If the encrypted packets SP1, SP2, and SP3 arrive first, second, and, third, respectively, among the encrypted packets SP1 to SP3, the encryption key K1 capable of decrypting the encrypted packet SP1 is determined as the main key and the encryption keys K2 and K3 capable of decrypting the encrypted packets SP2 and SP3 are determined as the sub-keys. As a result, the encryption key K1 capable of decrypting the encrypted packet SP1 received first by the node N is determined as the main key in the management server 101. At least one sub-key is needed.

Similarly, the main and sub-keys may be determined based on the hop numbers of the respective encrypted packets SPi. For example, it is assumed that the encrypted packets SP1 to SP3 are transmitted. It is assumed that the maximum hop number is "10". If the hop numbers of the encrypted packets SP1, SP2, and SP3 are "7", "5", and "3", respectively, among the encrypted packets SP1 to SP3, the encryption key K1 capable of decrypting the encrypted packet SP1 is determined as the main key and the encryption keys K2 and K3 capable of decrypting the encrypted packets SP2 and SP3 are determined as the sub-keys. As a result, the encryption key K1 capable of decrypting the encrypted packet SP1 associated with the smallest number of transfers can be determined as the main key in the management server 101. At least one sub-key is needed.

In this case, the recording unit 3706 and the determining unit 3707 are not necessary in the node N and therefore, the key setting process can be accelerated.

In the management server 101, if the determining unit 4000 determines the main and sub-keys, the transmitting unit 2103 transmits the main and sub-keys via the mobile terminal MT to the node N. As a result, the main and sub-keys are set in the node N.

Figure 41:
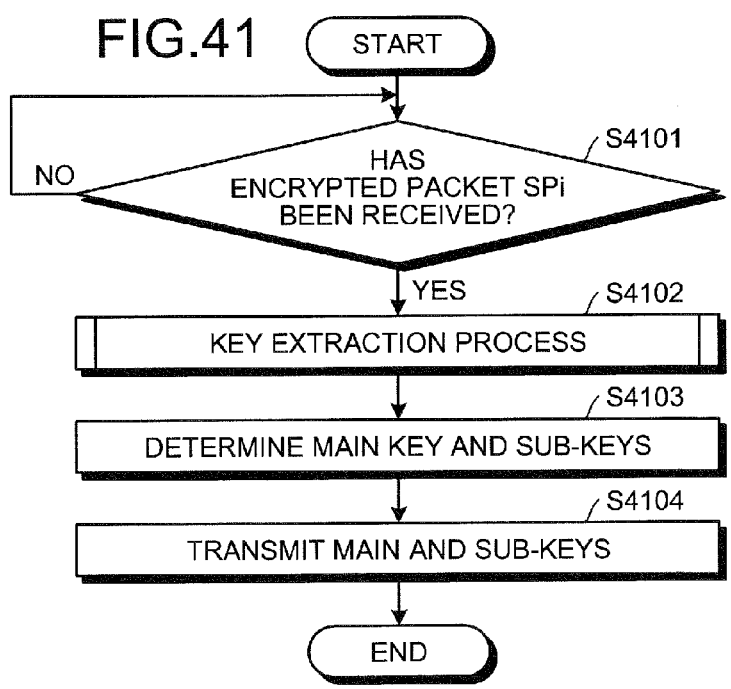
FIG. 41 is a flowchart of an example of the key providing process procedure of the management server according to the second embodiment.

FIG. 41 is a flowchart of an example of a key providing process procedure of the management server 101 according to the second embodiment. In the flowchart of FIG. 41, first, the management server 101 determines whether the receiving unit 2101 has received an encrypted packet SPi via the mobile terminal MT, from the node N (step S4101). If the priority is used for determination, it is determined whether the priority is also received.

Receipt of an encrypted packet SPi is awaited (step S4101: NO), and when an encrypted packet SPi has been received (step S4101: YES), the management server 101 causes the extracting unit 2102 to execute a key extraction process of extracting an encryption key Ki from the encryption key DB 110 (step S4102). In the key extraction process (step S4102), either process depicted in FIG. 27 or 28 is executed.

The management server 101 executes the main/sub determination described above for each of the extracted encryption keys Ki (step S4103). The management server 101 then causes the transmitting unit 2103 to transmit the main and sub-keys via the mobile terminal MT to the node N (step S4104) and terminates the series of the operations according to this flowchart.

As a result, the management server 101 can classify as a main key and a sub-key, the encryption keys Ki specific to the gateways Gi in the ad-hoc networks Ai to which the node N belongs, so as to provide the keys to the node N.

Figure 42:
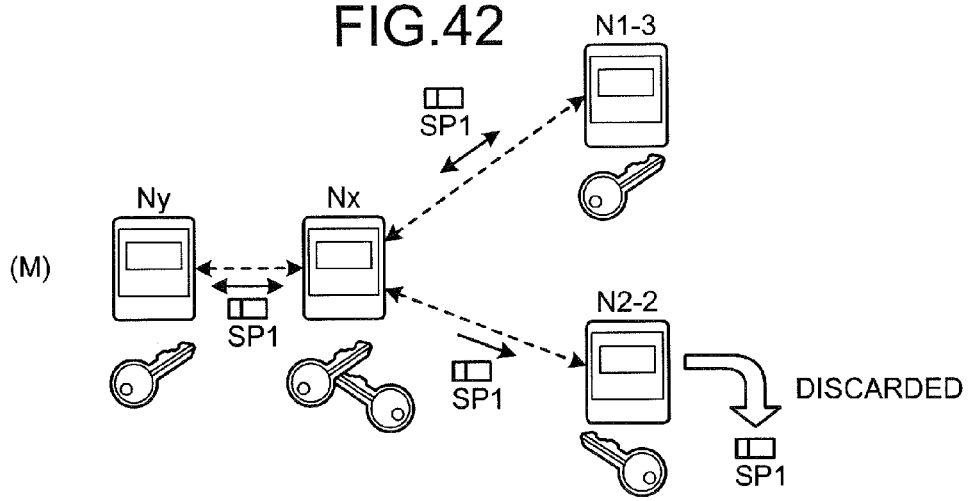
FIGS. 42 and 43 are explanatory views of communication examples of the new node introduced in the downstream type according to the second embodiment.
Figure 43:
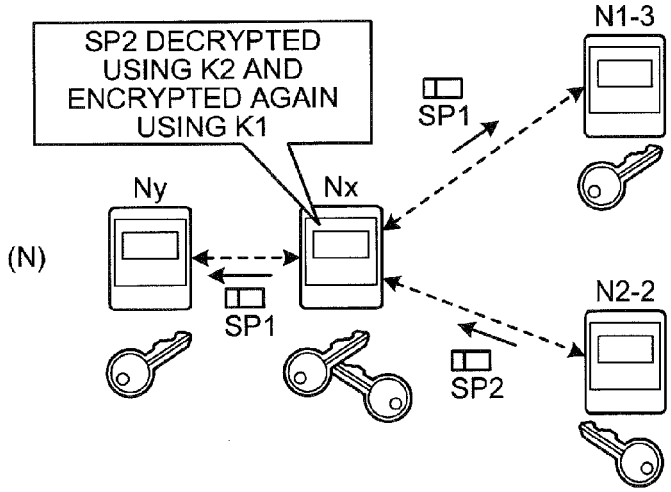

FIGS. 42 and 43 are explanatory views of communication examples of the new node Ny introduced in the downstream type according to the second embodiment.

A state (M) depicted in FIG. 42 represents a first communication example after the state (L) depicted in FIG. 36. As an example, the encryption key K1 is assumed to be the main key and the encryption key K2 is assumed to be the sub-key. The new node Ny and the node Nx can transmit and receive the encrypted packet SP1 encrypted using the encryption key K1 acting as the main key. The node Nx and the node N1-3 can transmit and receive the encrypted packet SP1 encrypted using the encryption key K1 acting as the main key.

The node N2-2 alone has the encryption key K2 and therefore, can intercept the encrypted packet SP1 from the node Nx although the packet cannot be decrypted. Therefore, the node N2-2 discards the encrypted packet SP1 from the node Nx.

A state (N) depicted in FIG. 43 represents a second communication example after the state (L) depicted in FIG. 36. If the node N2-2 transmits the encrypted packet SP2 encrypted with the encryption key K2 to the node Nx, the node Nx cannot decrypt the received encrypted packet SP2 using the main key (encryption key K1). In this case, the node Nx attempts the decryption using the sub-key (encryption key K2).

The node Nx can decrypt the encrypted packet SP2 using the encryption key K2 and therefore, encrypts the decrypted data again with the main key (encryption key K1). The node Nx transmits the encrypted packet SP1 encrypted again to the new node Ny and the node N1-3.

As described above, even when a packet cannot be decrypted using the main key, if the packet can be decrypted using the sub-key, the node Nx can encrypt the decrypted data using the main key and transfer the packet. Therefore, if the number of keys is one in the subordinate node Ny and subsequent nodes of the boundary node Nx, increases in the amount communication in each of the ad-hoc networks A1 and A2 can be suppressed while the security and the robustness are maintained.

A communication process of the boundary node Nx located at the boundary of multiple ad-hoc networks will be described.

Figure 44:
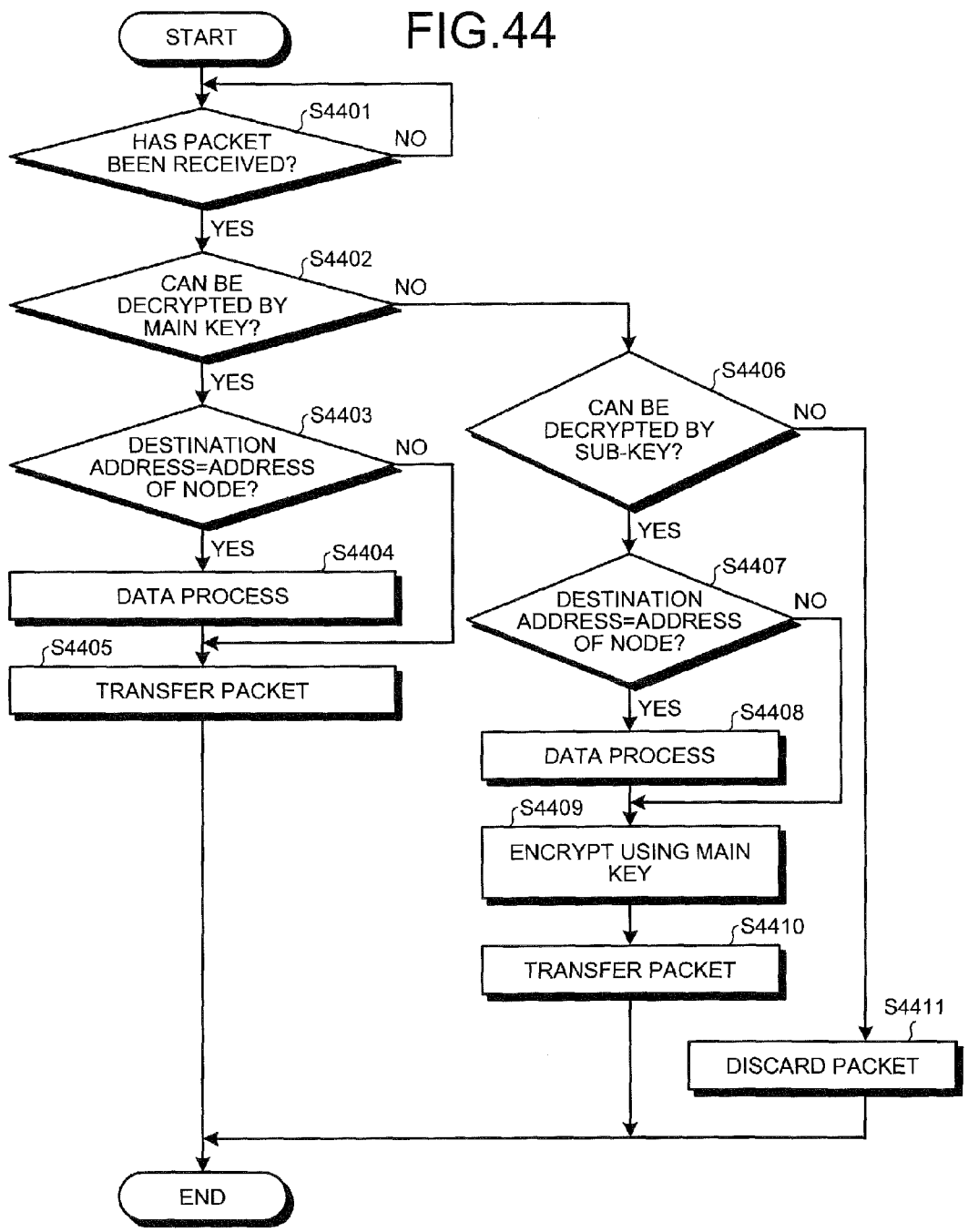
FIG. 44 is a flowchart of a communication process procedure of a boundary node according to the second embodiment.

FIG. 44 is a flowchart of a communication process procedure of the boundary node Nx according to the second embodiment. First, the boundary node Nx awaits receipt of a packet (step S4401: NO), and when a packet has been received (step S4401: YES), the boundary node Nx determines whether the packet can be decrypted using the main key (step S4402).

If the packet can be decrypted (step S4402: YES), the boundary node Nx determines whether the destination address of the received packet is the address of the node (the boundary node Nx) (or address for broadcast) (step S4403). If the destination address is the address of the node (the boundary node Nx) (or address for broadcast) (step S4403: YES), the boundary node Nx executes a data process based on the decrypted data (step S4404) and transfers the received packet to a transfer destination (step S4405).

If a routing table acquired through a broadcast packet from the gateway Gi is retained, the transfer destination is a node specified by the routing table. If no routing table exists, the transfer destination corresponds to all the nodes within the communication range. Subsequently, the communication process is terminated.

On the other hand, if the destination address is not the address of the node (the boundary node Nx) (or address for broadcast) at step S4403 (step S4403: NO), the boundary node Nx transfers the received packet to a transfer destination (step S4405). The transfer destination is a node specified by the routing table acquired through a broadcast packet from the gateway Gi.

If the packet cannot be decrypted using the main key at step S4402 (step S4402: NO), the boundary node Nx determines whether the packet can be decrypted by a sub-key (step S4406).

If the packet can be decrypted (step S4406: YES), the boundary node Nx determines whether the destination address of the received packet is the address of the node (the boundary node Nx) (or address for broadcast) (step S4407). If the destination address is the address of the node (the boundary node Nx) (or address for broadcast) (step S4407: YES), the boundary node Nx executes a data process based on the decrypted data (step S4408). The boundary node Nx encrypts the decrypted data with the main key (step S4409) and transfers the packet encrypted with the main key to a transfer destination (S4410). The communication process is then terminated.

On the other hand, if the destination address is not the address of the node (the boundary node Nx) (or address for broadcast) at step S4407 (step S4407: NO), the boundary node Nx encrypts the decrypted data using the main key (step S4409) and transfers to a transfer destination, the packet encrypted using the main key (S4410). Subsequently, the communication process is terminated.

If the packet cannot be decrypted using a sub-key at step S4406 (step S4406: NO), this means that the received packet is intercepted and therefore, the boundary node Nx discards the received packet (step S4411) and terminates the communication process.

Therefore, as is the case with the first embodiment, the key setting method, the node, the server, and the network system according to the second embodiment can reduce the workload of the operator and shorten work hours required for the encryption key setting operation for nodes in ad-hoc networks.

Since the multiple encryption keys set in the boundary node Nx are classified into and used as main and sub-keys, the main key (e.g., the encryption key K1) alone can be assigned to the new node Ny set to be subordinate to the node Nx, without a need for assigning a sub-key (e.g., the encryption key K2). Therefore, since the number of keys can be set to one in the subordinate node Ny and subsequent nodes of the new node Nx, increases in the amount of communication in each of the ad-hoc networks Ai can be suppressed while the security and the robustness are maintained.

A third embodiment will be described. The third embodiment is a process of setting multiple encryption keys in a new node (the node Nc in FIG. 4) according to the so-called upstream type for the fourth example depicted in FIG. 4. The description will hereinafter be made with reference to FIGS. 45 to 68. Constituent elements identical to those depicted in the first and second embodiments are denoted by the same reference numerals used in the first and second embodiments, and will not be described.

Figure 45:
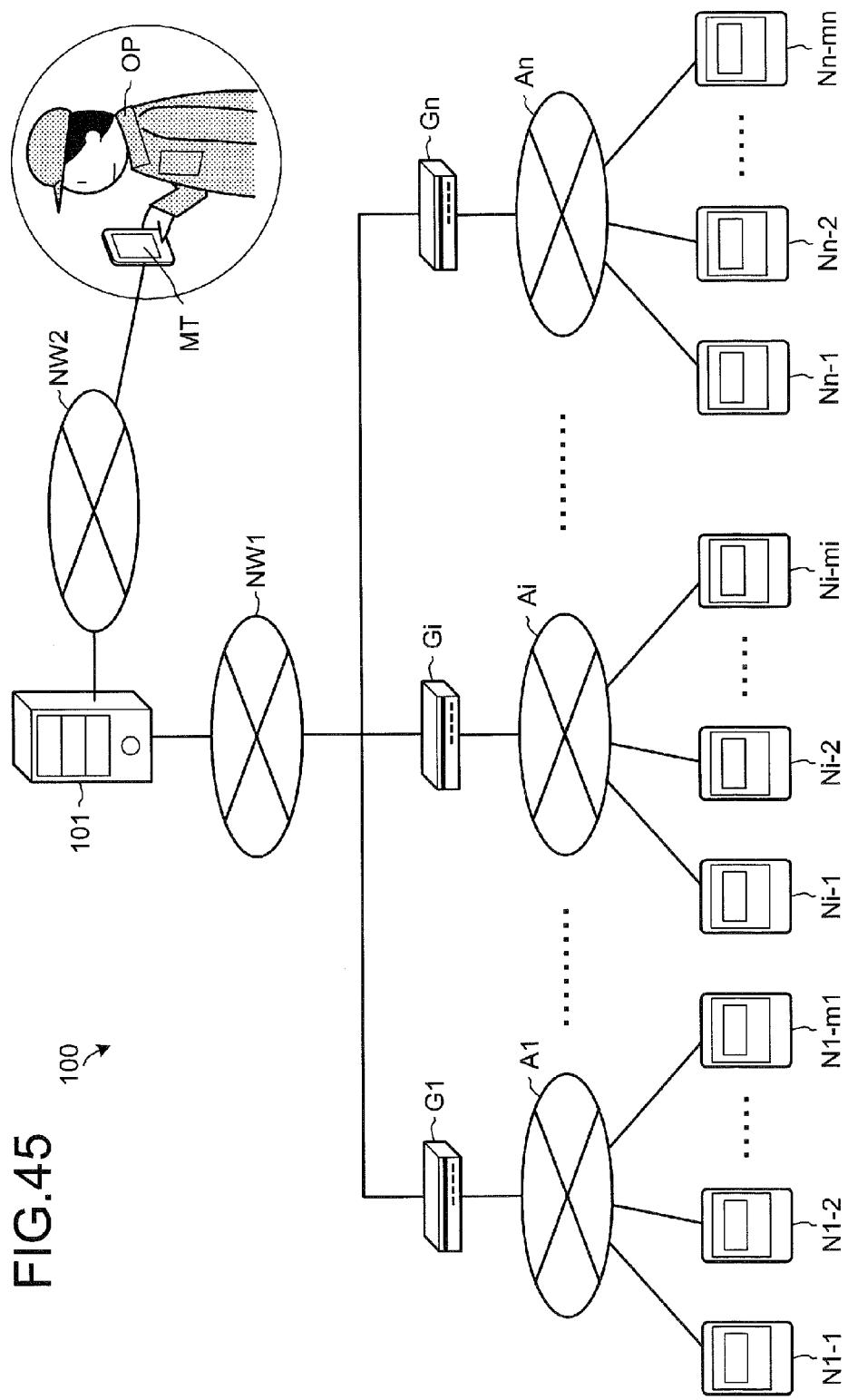
FIG. 45 is an explanatory view of one example of a network system according to a third embodiment.

FIG. 45 is an explanatory view of one example of the network system 100 according to the third embodiment. In the network system 100 depicted in FIG. 45, the management server 101 may omit the encryption key DB 110. In the upstream type, each time a new node makes a request, the corresponding gateway Gi uploads the encryption key Ki specific to the gateway Gi to the management server 101. The management server 101 supplies the encryption key Ki to the new node via the mobile terminal MT connected to the new node.

A setting example of the encryption key Ki at the time of introduction of a new node into the network system 100 depicted in FIG. 45 will be described. Although multiple encryption keys are set in the new node in the third embodiment, an example of setting one encryption key will first be described and an example of setting multiple keys (FIGS. 48 to 52) will subsequently be described. Even in the example of setting multiple keys (FIGS. 48 to 52), setting of each key is the same as the following setting depicted in FIGS. 46 and 47. The communication mode between the management server 101 and the mobile terminal MT is the same as the first and second embodiments (see FIGS. 23 and 24) and therefore will not be described.

Figure 46:
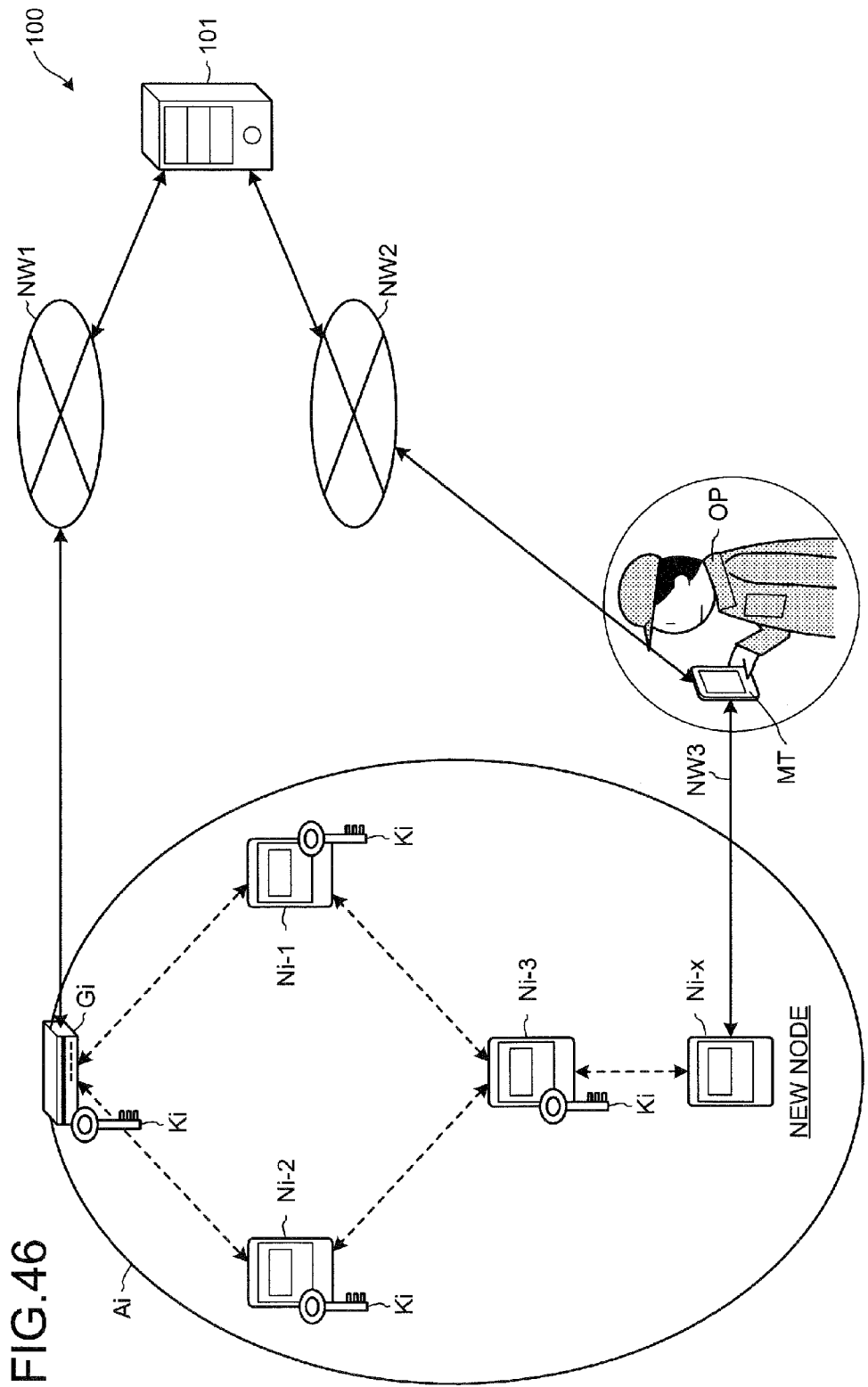
FIG. 46 is an explanatory view of an example of introduction of a new node into the network system according to the third embodiment.

FIG. 46 is an explanatory view of an example of introduction of a new node into the network system 100 according to the third embodiment. In FIG. 46, the new node Ni-x is introduced into the ad-hoc network Ai of the network system 100. FIG. 46 depicts the nodes Ni-1 to Ni-3 as the representatives of the nodes Ni-1 to Ni-mi in the ad-hoc network Ai.

At the time of introduction of the new node Ni-x, an operator OP does not know to which ad-hoc network Ai the new node Ni-x belongs. Therefore, in the third embodiment, the mobile terminal MT used by the operator OP is utilized to upload an acquisition request for the encryption key Ki to be set in the new node Ni-x to the ad-hoc network Ai. In this case, the gateway Gi uploads the encryption key Ki specific to the gateway Gi to the management server 101. The new node Ni-x acquires the encryption key Ki uploaded to the management server 101, via the mobile terminal MT from the management server 101, to automatically set the encryption key Ki in the new node Ni-x. An operation example of the network system 100 at the time of introduction of the new node Ni-x will hereinafter be described.

Figure 47:
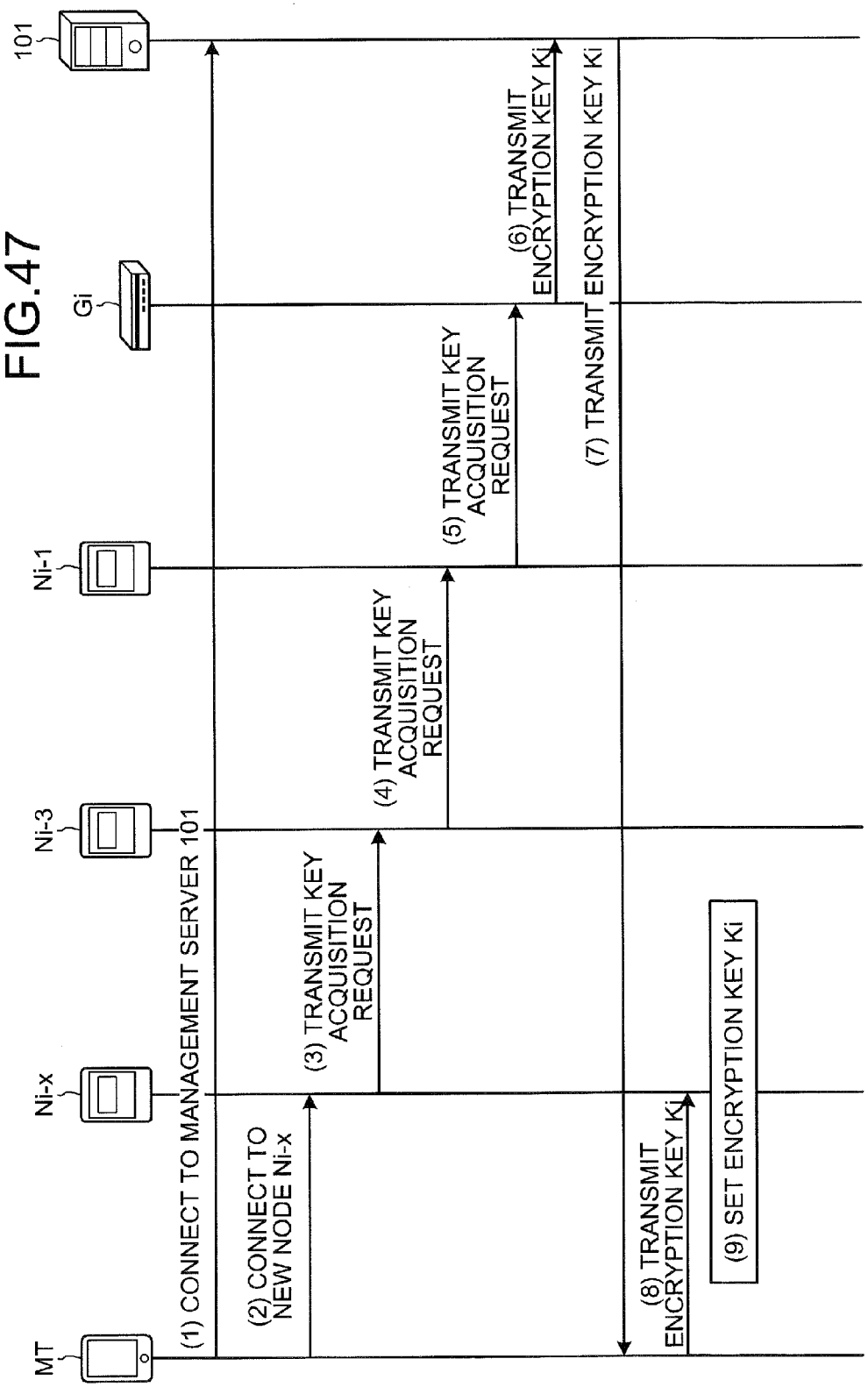
FIG. 47 is a sequence diagram of an operation example of the network system at the time of introduction of a new node according to the third embodiment.

FIG. 47 is a sequence diagram of an operation example of the network system 100 at the time of introduction of a new node according to the third embodiment. In the sequence of FIG. 47, (1) the mobile terminal MT connects to the management server 101, via the network NW2. In this case, the mobile terminal MT uses, for example, Secure Socket Layer (SSL) to perform secure communication with the management server 101. A communication mode for implementing the secure communication between the management server 101 and the mobile terminal MT is the same as FIGS. 23 and 24 and therefore will not be described.

(2) The mobile terminal MT connects to the new node Ni-x, via a wired or wireless network NW3. For example, the operator OP connects the mobile terminal MT and the new node Ni-x by using a USB cable to establish the network NW3 between the mobile terminal MT and the new node Ni-x.

(3) When detecting the connection with the mobile terminal MT, the new node Ni-x broadcasts on the ad-hoc network Ai, an acquisition request for a key for encrypting a packet transmitted/received through multi-hop communication within the ad-hoc network Ai. In this example, the key acquisition request is transmitted to the node Ni-3 present within the communication range of the new node Ni-x.

(4) The node Ni-3 transmits to the node Ni-1 within a communication range, the key acquisition request that is from the new node Ni-x. (5) The node Ni-1 transmits to the gateway Gi within a communication range, the key acquisition request that is from the node Ni-3. As a result, the key acquisition request from the new node Ni-x is transferred to the gateway Gi in the ad-hoc network Ai.

(6) Upon receiving the key acquisition request from the new node Ni-x, the gateway Gi transmits to the management server 101, the encryption key Ki specific to the gateway Gi. (7) The management server 101 transmits, via the network NW2 to the mobile terminal MT, the encryption key Ki that is specific to the gateway Gi and from the gateway Gi.

(8) The mobile terminal MT transmits, via the network NW3 to the new node Ni-x, the encryption key Ki that is specific to the gateway Gi and from the management server 101. (9) The new node Ni-x sets the encryption key Ki from the mobile terminal MT as a key for packet encryption.

The connection between the mobile terminal MT and the new node Ni-x is maintained until the setting of the encryption key Ki to the new node Ni-x is terminated. When the connection between the mobile terminal MT and the new node Ni-x is disconnected after the termination of the setting of the encryption key Ki, the encryption key Ki may automatically be deleted from the mobile terminal MT. This can reduce risk in the event the mobile terminal MT is compromised.

As described above, at the time of introduction of the new node Ni-x, a temporary communication channel can be established between the new node Ni-x and the management server 101 via the mobile terminal MT of the operator OP. The encryption key Ki transmitted from the gateway Gi to the management server 101 as a result of the transfer of the key acquisition request broadcasted from the new node Ni-x to the gateway Gi can be provided from the management server 101 via the mobile terminal MT to the new node Ni-x. As a result, the encryption key Ki to be set in the new node Ni-x can be easily acquired and the efficiency can be increased in the setting operation of the encryption key Ki used by the new node Ni-x.

FIGS. 48 to 52 are explanatory views of an example of introduction of a new node at a boundary between (within communication ranges of) multiple ad-hoc networks of the downstream type according to the third embodiment. In FIGS. 48 to 52, as is the case with FIGS. 10 to 15, by way of example, an example of introducing a new node Nx at the boundary between two ad-hoc neteworks A1 and A2 will be described.

Figure 48:
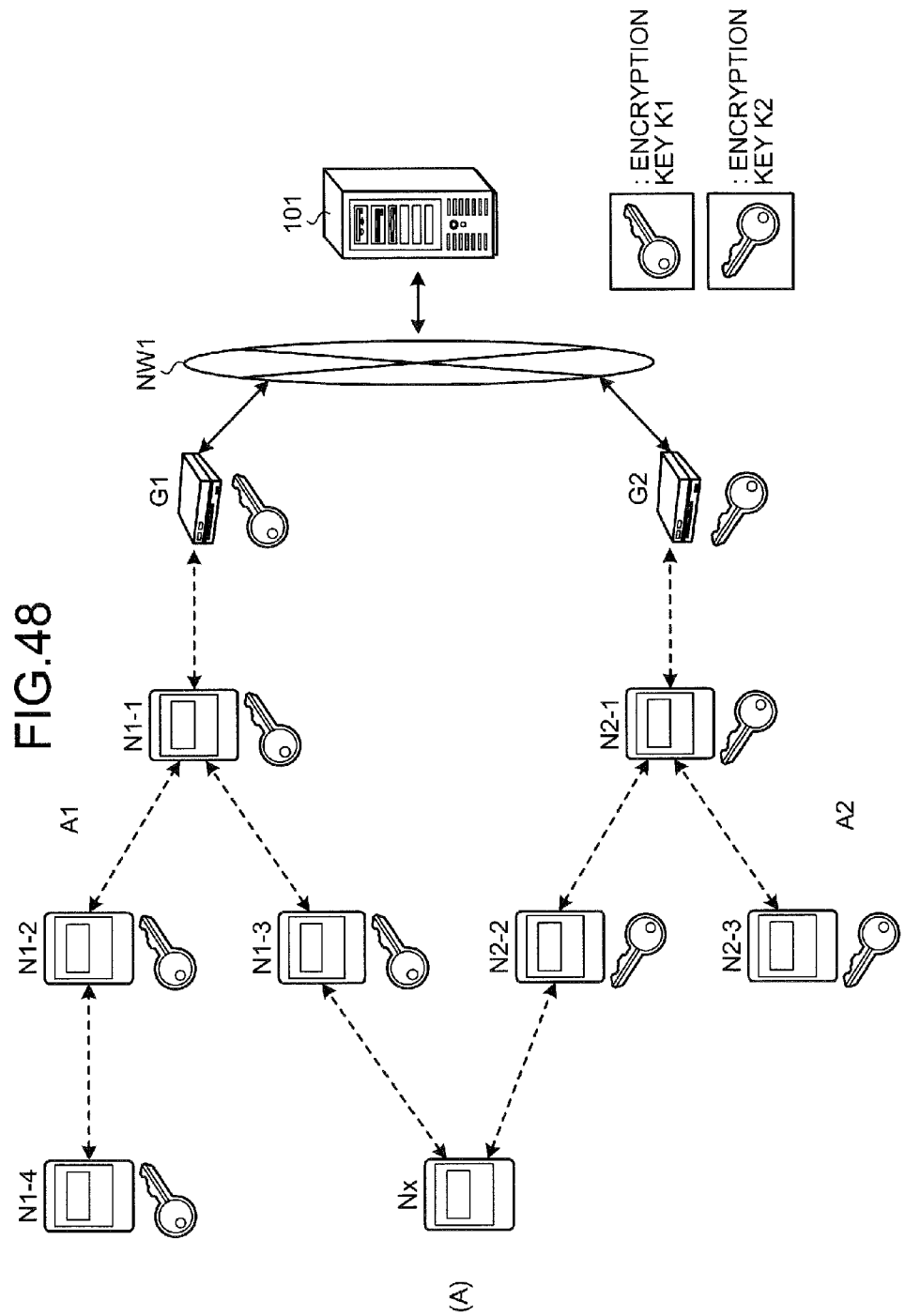

FIG. 48 depicts an initial state (A). It is assumed that nodes in the ad-hoc network A1 are nodes N1-1 to N1-4 and that nodes in the ad-hoc network A2 are nodes N2-1 to N2-3. A gateway G1 and the nodes N1-1 to N1-4 in the ad-hoc network A1 retain an encryption key K1 specific to the gateway G1. A gateway G2 and the nodes N2-1 to N2-3 in the ad-hoc network A2 retain an encryption key K2 specific to the gateway G2. The new node Nx is assumed to be disposed in the communication ranges of the node N1-3 and the node N2-2. The management server 101 does not include the encryption key DB 110.

Figure 49:
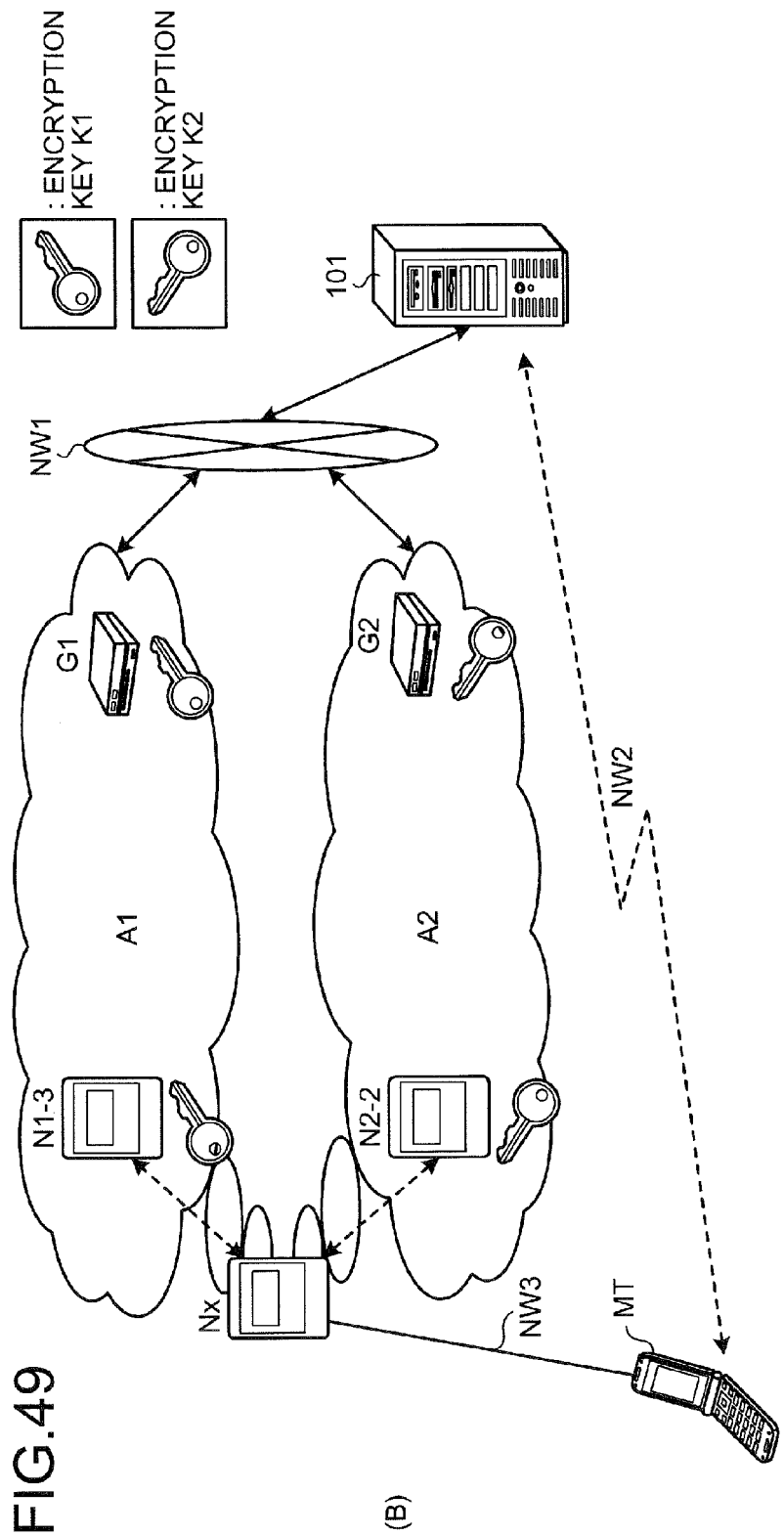

FIG. 49 depicts a state (B) subsequent to the initial state (A). The state (B) depicts a state in which the mobile terminal MT connectable via the secure network NW2 to the management server 101 is connected to the new node Nx.

Figure 50:
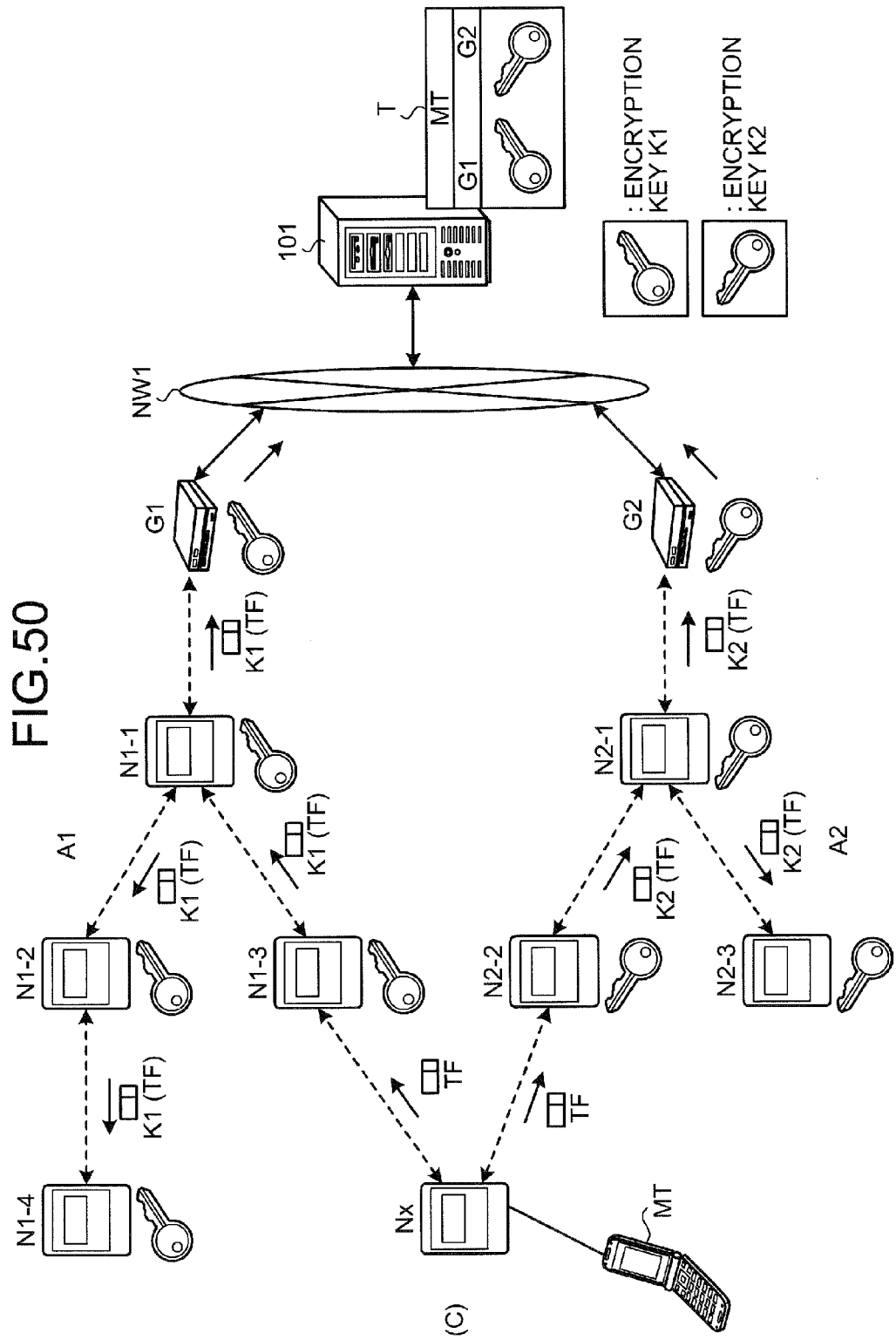

FIG. 50 depicts a state (C) subsequent to the state (B). In the state (C), from the state of (B), the new node Nx broadcasts a gateway search frame (hereinafter, "GW search frame") TF on the ad-hoc networks A1 and A2. The GW search frame TF is a packet for searching for a gateway and the gateway Gi that receives the GW search frame TF uploads the encryption key Ki specific to the gateway Gi to the management server 101.

If the node N1-3 within the communication range of the new node Nx receives a packet that cannot be decrypted using the encryption key K1, the node N1-3 discards the packet as an intercepted packet; however, if the GW search frame TF is received from the new node Nx, the node N1-3 encrypts the GW search frame TF using the encryption key K1. The node N1-3 broadcasts an encrypted GW search frame K1(TF) on the ad-hoc network A1. As a result, the encrypted GW search frame K1(TF) goes to all of the nodes N1-1 to N1-4 and the gateway G1.

Similarly, if the node N2-2 within the communication range of the new node Nx receives a packet that cannot be decrypted using the encryption key K2, the node N2-2 discards the packet as an intercepted packet; however, if the GW search frame TF is received from the new node Nx, the node N2-2 encrypts the GW search frame TF using the encryption key K2. The node N2-2 broadcasts an encrypted GW search frame K2(TF) on the ad-hoc network A2. As a result, the encrypted GW search frame K2(TF) goes to all of the nodes N2-1 to N2-3 and the gateway G2.

Upon receiving the encrypted GW search frame K1(TF), the gateway G1 decrypts the frame using the encryption key K1 and uploads the encryption key K1 to the management server 101 according to the instruction details of the GW search frame TF. Similarly, upon receiving the encrypted GW search frame K2(TF), the gateway G2 decrypts the frame using the encryption key K2 and uploads the encryption key K2 to the management server 101 according to the instruction details of the GW search frame. As a result, the management server 101 creates a table T correlating an identifier of the mobile terminal MT (e.g., "D1" described later) with the encryption keys K1 and K2 of the gateways G1 and G2.

Figure 51:
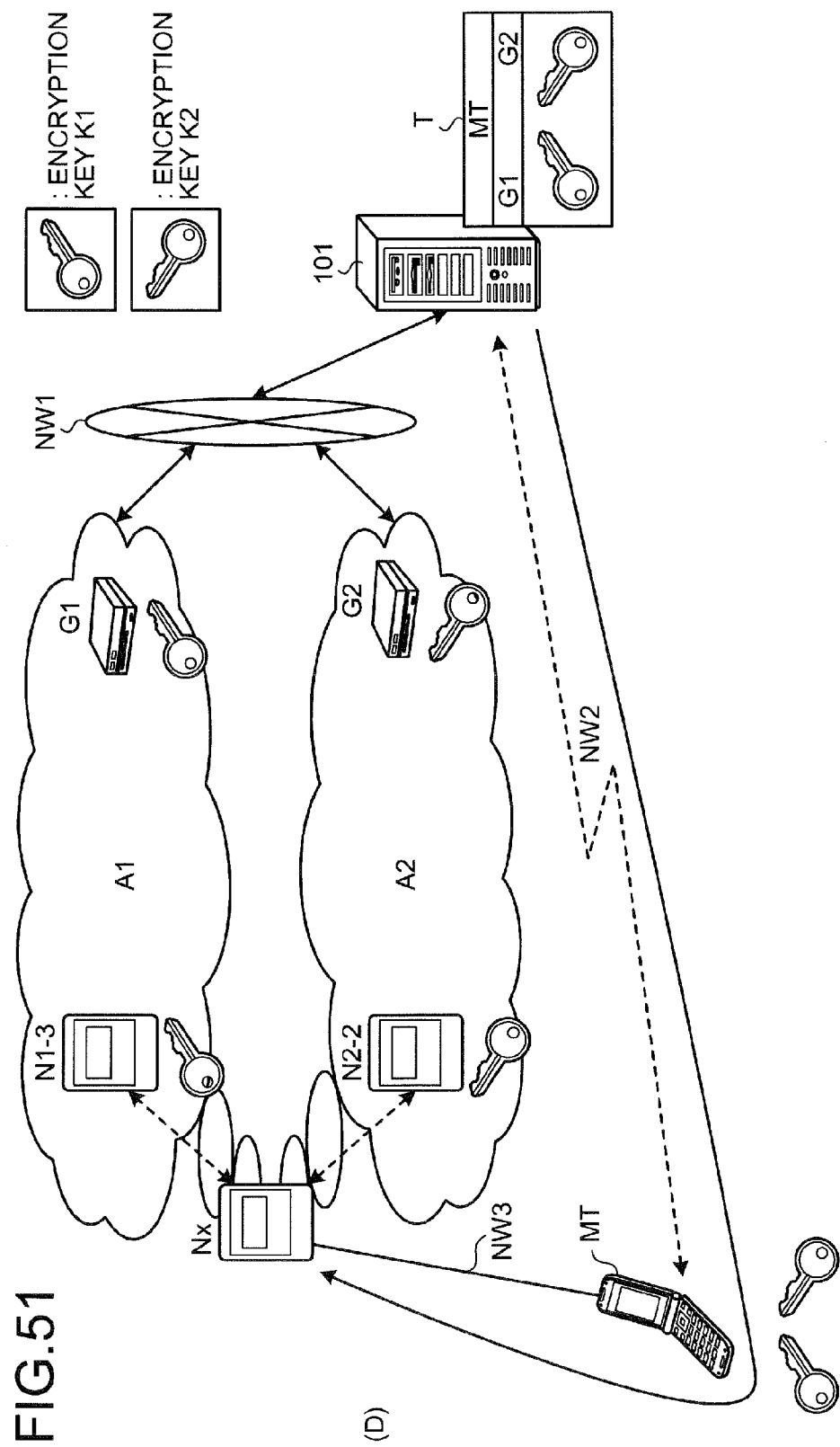

FIG. 51 depicts a state (D) subsequent to the state (C). In the state (D), the management server 101 transmits the encryption keys K1 and K2 received at the state (C), via the network NW2 to the mobile terminal MT correlated with the encryption keys K1 and K2 in the table T. The mobile terminal MT transmits via the network NW3 and to the new node Nx, the encryption keys K1 and K2 received from the management server 101.

FIG. 52 depicts a state (E) subsequent to the state (D). In the state (E), the new node Nx receives and sets the encryption keys K1 and K2 transmitted from the management server 101 as keys for encryption and decryption. Therefore, the new node Nx can subsequently decrypt the encrypted packet SP1 from the node N1-3 using the encryption key K1. The new node Nx can decrypt the encrypted packet SP2 from the node N2-2 using the encryption key K2. From the new node Nx, the encrypted packet SP1 encrypted using the encryption key K1 is transmitted to the node N1-3 and the encrypted packet SP2 encrypted using the encryption key K2 is transmitted to the node N2-2.

Although the encrypted packet SP1 from the new node Nx is intercepted by the node N2-2, the node N2-2 does not retain the encryption key K1 and therefore, cannot decrypt and does not further transfer the encrypted packet SP1. Similarly, although the encrypted packet SP2 from the new node Nx is intercepted by the node N1-3, the node N1-3 does not retain the encryption key K2 and therefore cannot decrypt and does not further transfer the encrypted packet SP2. Thus, while the security and the robustness are maintained, increases in the amount of communication in each of the ad-hoc networks A1 and A2 can be suppressed.

In the following description, a "node N" refers to a node transmitting/receiving a packet through the multi-hop communication in an ad-hoc network Ai among the ad-hoc networks A1 to An of the network system 100. "Node, etc." refer to the gateways G1 to Gn and the node N of the network system 100. Hardware configuration examples of the management server 101 and the node, etc. are the same as in the first and second embodiments and therefore will not be described.

FIG. 53 is a block diagram of a functional configuration example of a node according to the third embodiment. In FIG. 53, the node N includes a detecting unit 5301, a receiving unit 5302, a frame transmitting unit 5303, a key receiving unit 5304, a setting unit 5305, a frame receiving unit 5306, and an encryption/decryption processing unit 5307. For example, functions of the functional units (the detecting unit 5301 to the encryption/decryption processing unit 5307) are implemented by the CPU 1701 executing programs stored in a storage device such as the RAM 1702 and the flash memory 1703 depicted in FIG. 17 or by the I/F 1704. Process results of the functional units (the detecting unit 5301 to the encryption/decryption processing unit 5307) are stored in a storage device such as the RAM 1702 and the flash memory 1703 unless otherwise specified.

The detecting unit 5301 detects connection with the mobile terminal MT communicable with the management server 101. For example, the operator OP connects the mobile terminal MT to the node Nx by using a USB cable and, as a result, the detecting unit 5301 detects the connection via the USB cable to the mobile terminal MT.

The receiving unit 5302 receives from the mobile terminal MT to which connection has been detected by the detecting unit 5301, an instruction to transmit a key acquisition request. The key acquisition request is an acquisition request for the encryption key Ki for encrypting packets transmitted/received between nodes through the multi-hop communication in the ad-hoc network Ai.

The key acquisition request is, for example, the GW search frame TF for searching for a gateway Gi in the ad-hoc network Ai to which the node N belongs so as to have the encryption key Ki specific to the gateway Gi provided from the gateway Gi.

For example, the receiving unit 5302 receives from the mobile terminal MT via the network NW3 such as a USB cable, an instruction to transmit the GW search frame TF. A specific example of transmission instruction data for the GW search frame TF will be described.

Figure 54:
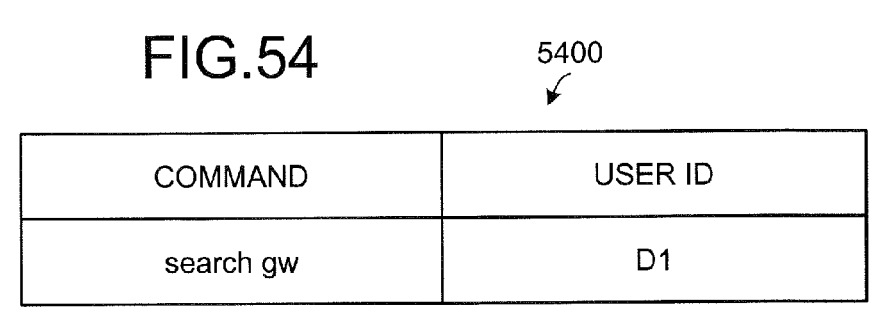

FIG. 54 is an explanatory view of a specific example of transmission instruction data for the GW search frame TF according to the third embodiment. In FIG. 54, transmission instruction data 5400 has a command and a user ID. The command indicates instruction details for the node N. In this example, "search gw" is described that represents an instruction to search for the gateway Gi in the ad-hoc network Ai to which the node N belongs. The user ID is an identifier of the mobile terminal MT. In this example, "D1" is described.

Returning to the description of FIG. 53, the frame transmitting unit 5303 broadcasts the GW search frame TF on the ad-hoc network Ai. The GW search frame TF is, for example, information including a type of frame, an identifier of the mobile terminal MT and an identifier of the node N and, is an unencrypted normal frame.

The identifier of the mobile terminal MT is identified from the transmission instruction data 5400 of the GW search frame TF received by the receiving unit 5302, for example. The identifier of the node N is preset and stored in a storage device such as the RAM 1702 and the flash memory 1703, for example. For example, the frame transmitting unit 5303 may broadcast the GW search frame TF on the ad-hoc network Ai if connection to the mobile terminal MT is detected.

The frame transmitting unit 5303 may broadcast the GW search frame TF to the ad-hoc network Ai, for example, if the transmission instruction data 5400 of the GW search frame TF is received from the mobile terminal MT. In other words, if connection to the mobile terminal MT is detected and the transmission instruction data 5400 of the GW search frame TF is received, the frame transmitting unit 5303 broadcasts the GW search frame TF on the ad-hoc network Ai.

This can prevent the broadcast of the GW search frame TF from the node N at the time of detection of the connection with the mobile terminal MT when the mobile terminal MT is utilized to perform a setting operation different from the key setting for the node N. A specific example of the GW search frame TF will be described.

Figure 55:
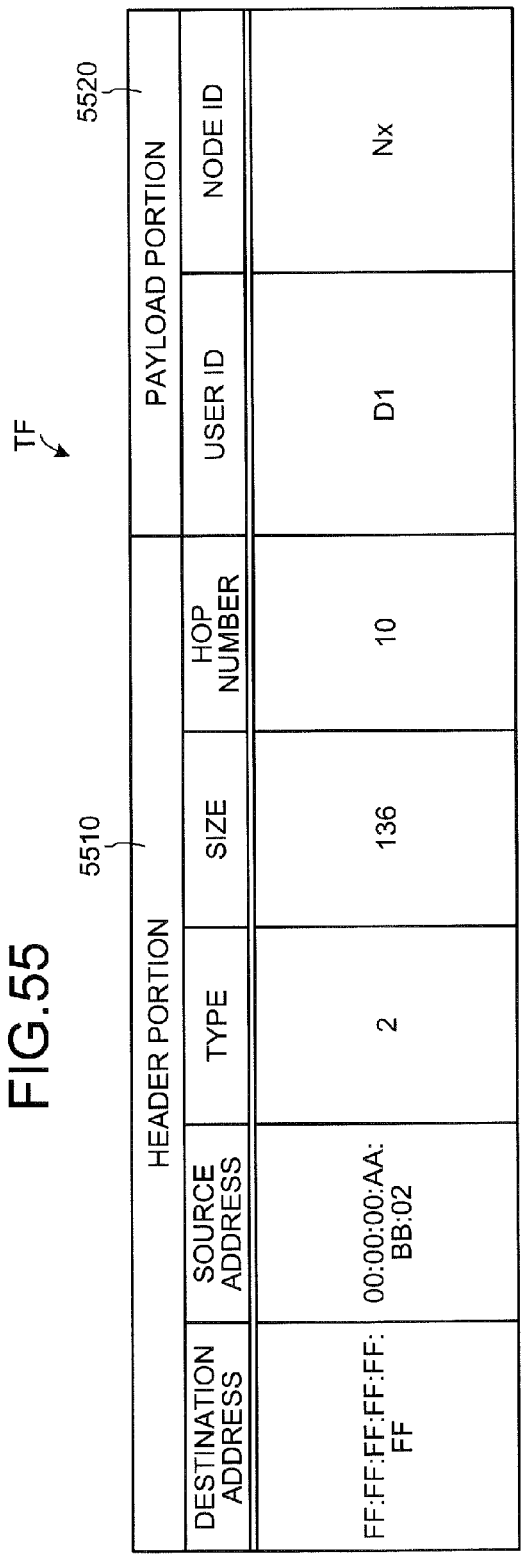
FIG. 55 is an explanatory view of an example of a data structure of the GW search frame according to the third embodiment.

FIG. 55 is an explanatory view of an example of a data structure of the GW search frame TF according to the third embodiment. In FIG. 55, the GW search frame TF includes a header portion 5510 and a payload portion 5520. A destination address, a source address, a type, a size, and a hop number are described in the header portion 5510. A user ID and a node ID are described in the payload portion 5520.

The destination address is an address of a transmission destination. In this example, a Media Access Control (MAC) address "FF:FF:FF:FF:FF:FF" for broadcast is described. The source address is an address of a transmission source. In this example, a MAC address of another node N different from the node N in the ad-hoc network A1 is described. The type is the type of the frame. In this example, "2" indicative of the GW search frame is described. The size is a data size (bytes) of the frame.

The hop number is the remaining number of transfers indicative of how many times the encrypted GW search frame Ki(TF) encrypted by the encryption key Ki will be transferred between nodes. The maximum value of the hop number of the GW search frame TF broadcasted from the node N is set in advance. The hop number is decremented at the time of transfer of the encrypted GW search frame Ki(TF) and an encrypted GW search frame Ki(TF) having the hop number of "0" is rejected. In this example, the hop number "10" of the GW search frame TF is described.

The user ID is an identifier of the mobile terminal MT connected to the node N. In this example, a user ID "D1" is described. The node ID is an identifier of the node N. In this example, a node ID "Nx" is described. Although the MAC addresses are used as examples of the destination address and the source address in this description, addresses such as Internet Protocol (IP) addresses may also be used.

Returning to the description of FIG. 53, the key receiving unit 5304 receives the encryption key Ki specific to the gateway Gi in the ad-hoc network Ai to which the node N belongs, via the mobile terminal MT from the management server 101. The encryption key Ki specific to the gateway Gi is a key transmitted from the gateway Gi to the management server 101 as a result of the transfer of the broadcasted encrypted GW search frame Ki(TF) to the gateway Gi.

The encryption key Ki is a key for encrypting packets transmitted/received between nodes in the ad-hoc network Ai and is binary data of about 128 to 256 bits, for example. This encryption key Ki is, for example, a common key capable of encrypting a packet and decrypting a packet encrypted by using the encryption key Ki.

For example, the GW search frame TF broadcasted from the node N is encrypted through the ad-hoc network Ai and the encrypted GW search frame Ki(TF) is transferred to the gateway Gi. As a result, the gateway Gi transmits the encryption key Ki specific to the gateway Gi via the network NW1 to the management server 101. The management server 101 transmits the encryption key Ki specific to the gateway Gi via the network NW2 to the mobile terminal MT. The key receiving unit 5304 receives via the network NW3 and from the mobile terminal MT, the encryption key Ki specific to the gateway Gi.

The setting unit 5305 sets the received encryption key Ki specific to the gateway Gi as a key for packet encryption. As a result, the node N can subsequently encrypt packets to be transmitted and decrypt encrypted packets and, secure communication can be performed between the nodes in the ad-hoc network Ai.

The frame receiving unit 5306 receives a GW search frame from another node different from the node thereof in the ad-hoc network Ai. Therefore, the frame receiving unit 5306 receives the GW search frame TF broadcasted from the new node Nx.

The encryption/decryption processing unit 5307, using the encryption key Ki retained by the node N, performs encryption/decryption of a frame received by the frame receiving unit 5306. For example, if a frame type of a received normal frame is "2" indicative of the GW search frame TF, the frame is encrypted using the encryption key Ki. The frame transmitting unit 5303 broadcasts the encrypted GW search frame TF. If a type of a received normal frame is not "2", the normal frame is discarded.

If the node N is an existing node other than the new node Nx, the frame receiving unit 5306 may receive the transferred encrypted GW search frame Ki(TF). In this case, the encryption/decryption processing unit 5307 decrypts the encrypted GW search frame Ki(TF) using the encryption key Ki into the GW search frame TF. If the decryption by the encryption/decryption processing unit 5307 is successful, the hop number of the header portion 5510 is decremented. The frame transmitting unit 5303 transfers the encrypted GW search frame Ki(TF).

If a routing table acquired through a broadcast packet from the gateway Gi is retained, the transfer destination is a node specified by the routing table. If no routing table exists, the transfer destination corresponds to all the nodes within the communication range.

Figures 56, 57:
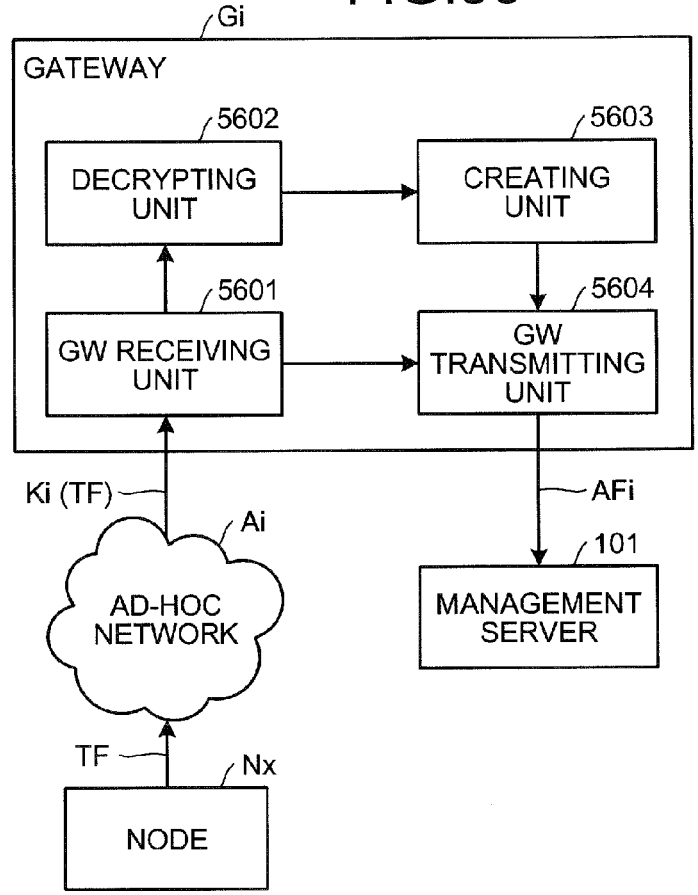
FIG. 56 is a block diagram of a functional configuration example of a gateway according to the third embodiment.
FIG. 57 is an explanatory diagram (part 1) of a specific example of a key notification frame according to the third embodiment.

FIG. 56 is a block diagram of a functional configuration example of the gateway Gi according to the third embodiment. In FIG. 56, the gateway Gi includes a GW receiving unit 5601, a decrypting unit 5602, a creating unit 5603, and a GW transmitting unit 5604. For example, functions of the functional units (the GW receiving unit 5601 to the GW transmitting unit 5604) are implemented by the CPU 1701 executing programs stored in a storage device such as the RAM 1702 and the flash memory 1703 depicted in FIG. 17 or by the I/F 1704. Process results of the functional units (the GW receiving unit 5601 to the GW transmitting unit 5604) are stored in a storage device such as the RAM 1702 and the flash memory 1703.

The GW receiving unit 5601 receives the encrypted GW search frame TF broadcasted from the node N via the ad-hoc network Ai. For example, the GW receiving unit 5601 receives the encrypted GW search frame Ki(TF) broadcasted from the new node Nx and encrypted in the ad-hoc network Ai.

The decrypting unit 5602 decrypts the encrypted GW search frame Ki(TF) received by the GW receiving unit 5601, using the encryption key Ki specific to the gateway Gi. As a result, the GW search frame TF is acquired.

If the encrypted GW search frame Ki(TF) is decrypted into the GW search frame TF by the decrypting unit 5602, the creating unit 5603 creates a key notification frame representative of a notification request for the encryption key Ki specific to the gateway Gi. The key notification frame is, for example, information including an identifier of the mobile terminal MT, an identifier of the node N, an identifier of the gateway Gi, and the encryption key Ki specific to the gateway Gi.

The identifier of the mobile terminal MT and the identifier of the node N are identified from the decrypted GW search frame TF. The encryption key Ki specific to the gateway Gi is stored to a storage device such as the RAM 1702 and the flash memory 1703, for example. For example, the creating unit 5603 creates the key notification frame representative of a notification request for the encryption key Ki specific to the gateway Gi, based on the decrypted GW search frame TF. A specific example of the key notification frame will be described.

FIG. 57 is an explanatory diagram (part 1) of a specific example of the key notification frame according to the third embodiment. In FIG. 57, a key notification frame AFi has information concerning a user ID, a node ID, a gateway ID, and an encryption key. The user ID is an identifier of the mobile terminal MT. This user ID is a code identified from the payload portion 5520 of the GW search frame TF depicted in FIG. 55. The node ID is an identifier of the node N. This node ID is a code identified from the payload portion 5520 of the GW search frame TF. The gateway ID is an identifier of the gateway Gi. The encryption key is the encryption key Ki specific to the gateway Gi.

If i=1, a key notification frame AF1 is a frame causing the transmission of the encryption key K1 specific to the gateway G1 via the mobile terminal MT (ID: D1) to the new node Nx. Similarly, if i=2, a key notification frame AF2 is a frame causing the transmission of the encryption key K2 specific to the gateway G2 via the mobile terminal MT (ID: D1) to the new node Nx. Therefore, if the new node Nx is disposed at the boundary between the ad-hoc networks A1 and A2, the new node Nx can acquire the encryption keys K1 and K2 by using the key notification frames AF1 and AF2.

Returning to the description of FIG. 56, the GW transmitting unit 5604 transmits the encryption key Ki specific to the gateway Gi via the network NW1 to the management server 101. For example, the GW transmitting unit 5604 may transmit the created key notification frame AFi to the management server 101. As a result, as compared to a case of simply transmitting only the encryption key Ki specific to the gateway Gi, the management server 101 can identify the mobile terminal MT and the node N to be provided with the encryption key Ki.

Although details will be described later, if the management server 101 is configured to retain the encryption keys K1 to Kn specific to the gateways G1 to Gn, the key notification frame AFi may omit the encryption key Ki specific to the gateway Gi. Therefore, the creating unit 5603 may create, for example, a key notification frame AFi that does not include the encryption key Ki specific to the gateway Gi.

Figures 58, 59:
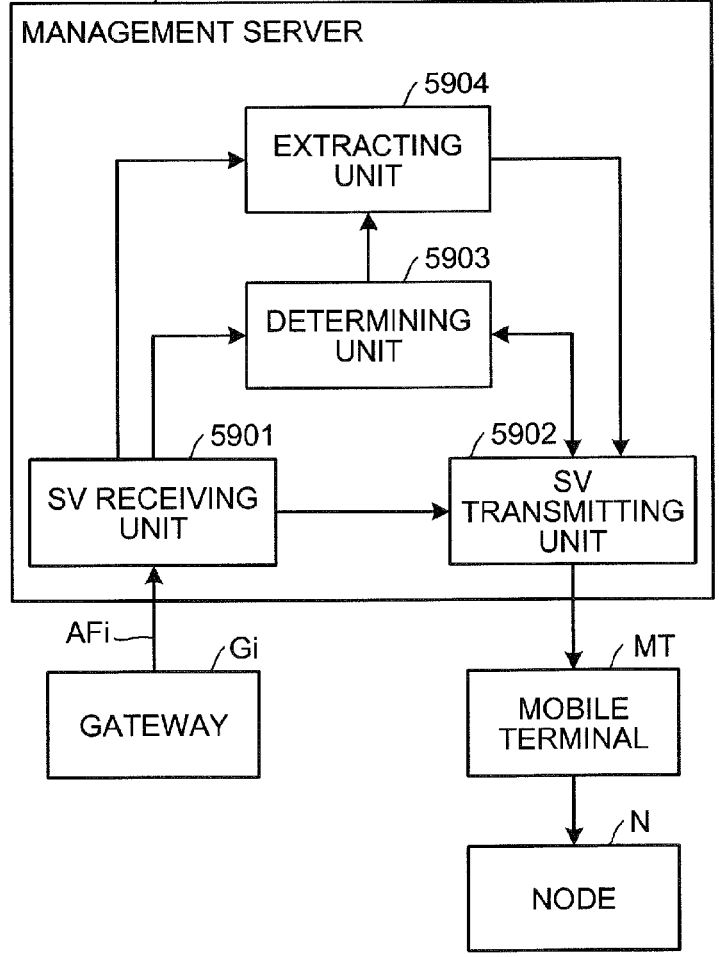
FIG. 58 is an explanatory diagram (part 2) of a specific example of the key notification frame according to the third embodiment.
FIG. 59 is a block diagram of a functional configuration of the management server according to the third embodiment.

FIG. 58 is an explanatory diagram (part 2) of a specific example of the key notification frame AFi according to the third embodiment. In FIG. 58, the key notification frame AFi has information concerning a user ID, a node ID, and a gateway ID. In other words, the key notification frame AFi is a frame acquired by deleting the encryption key K1 specific to the gateway G1 from the key notification frame AFi depicted in FIG. 57.

If the management server 101 is configured to retain the encryption keys K1 to Kn specific to the gateways G1 to Gn, the GW transmitting unit 5604 transmits to the management server 101, for example, a key notification frame AFi that does not include the encryption key K1 specific to the gateway G1.

Since the encrypted GW search frame Ki(TF) may be received by the gateway Gi through multiple paths, the creating unit 5603 creates the same key notification frame AFi each time. In such a case, the creating unit 5603 may create the key notification frame AFi to include the encryption key K1 as depicted in FIG. 57 for the first creation of the encrypted GW search frame Ki(TF) and may create the key notification frame AFi to not include the encryption key K1 as depicted in FIG. 58 from the second time. From the second time, configuration may be such that the key notification frame AFi is not created. As a result, overhead of communication between the gateway Gi and the management server 101 can be reduced.

FIG. 59 is a block diagram of a functional configuration of the management server 101 according to the third embodiment. In FIG. 59, the management server 101 includes an SV receiving unit 5901, an SV transmitting unit 5902, a determining unit 5903, and an extracting unit 5904. For example, functions of the functional units (the SV receiving unit 5901 to the extracting unit 5904) are implemented by the CPU 1601 executing programs stored in a storage device such as the ROM 1602, the RAM 1603, the magnetic disk 1605, and the optical disk 1607 depicted in FIG. 16 or by the I/F 1608. Process results of the functional units (the SV receiving unit 5901 to the extracting unit 5904) are stored to a storage device such as the RAM 1603, the magnetic disk 1605, and the optical disk 1607, for example.

The SV receiving unit 5901 receives via the network NW1 from the gateway Gi, the encryption key Ki specific to the gateway Gi. For example, the SV receiving unit 5901 receives the key notification frame AFi depicted in FIG. 57, via the network NW1. The key notification frame AFi is a notification request to the mobile terminal MT for the encryption key Ki specific to the gateway Gi.

The SV transmitting unit 5902 transmits the received encryption key Ki specific to the gateway Gi via the network NW2 to the mobile terminal MT. For example, the SV transmitting unit 5902 transmits the received key notification frame AFi via the network NW2 to the mobile terminal MT. As a result, the mobile terminal MT transmits the encryption key Ki included in the key notification frame AFi, via the network NW3 to the new node Nx.

The management server 101 may be connected via the network NW2 to multiple mobile terminals MT in a communicable manner. In this case, the SV transmitting unit 5902 can identify the source mobile terminal MT from a user ID included in the key notification frame AFi, for example. In the example of the key notification frame AFi, the SV transmitting unit 5902 transmits the key notification frame AFi to the mobile terminal MT of the user ID "D1".

Multiple paths reaching the gateway Gi may exist from the new node Nx. In this case, the GW search frame TF broadcasted from the new node Nx is encrypted and arrives at the gateway Gi along multiple paths. As a result, the gateway Gi receives the GW search frame TF broadcasted from the new node Nx multiple times.

In this case, each time the received encrypted GW search frame Ki(TF) is decrypted into the GW search frame TF, the gateway Gi creates and transmits the key notification frame AFi to the management server 101. Each time the key notification frame AFi is received, the management server 101 transmits the key notification frame AFi to the mobile terminal MT. As a result, the mobile terminal MT receives the same key notification frame AFi multiple times from the management server 101.

In this case, if the operator OP uses the same mobile terminal MT to sequentially set keys of multiple new nodes Nx, the wrong encryption key Ki may be set in a new node Nx. For example, it is assumed that keys are sequentially set in the node N1-x in the ad-hoc network A1 and the node N2-x in the ad-hoc network A2. In this case, after the setting of the encryption key K1 for the node N1-x has been completed and the operator OP connects the mobile terminal MT to the node N2-x, if a key notification frame including the encryption key K1 is received from the management server 101, the encryption key K1 is wrongly set in the node N2-x.

Therefore, by managing the nodes N to which the encryption keys Ki (key notification frames AFi) have been transmitted, the management server 101 can be prevented from redundantly transmitting the same key notification frame AFi to the mobile terminal MT. Description will be made of a specific example of a transmission completion list for managing the nodes N to which the key notification frames AFi have been transmitted.

Figure 60:
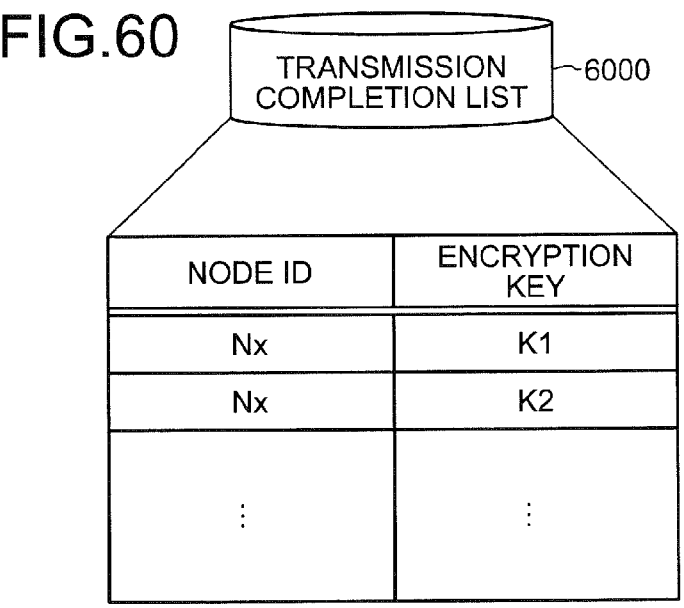
FIG. 60 is an explanatory view of a specific example of a transmission completion list according to the third embodiment.

FIG. 60 is an explanatory view of a specific example of the transmission completion list according to the third embodiment. In FIG. 60, a transmission completion list 6000 stores node IDs of the nodes N to which the encryption keys Ki have been transmitted and the transmitted encryption keys Ki in a correlated manner. The transmission completion list 6000 is implemented by a storage device such as the RAM 1603, the magnetic disk 1605, and the optical disk 1607, for example.

In the example of FIG. 60, the node ID "Nx" of the new node Nx in the ad-hoc networks A1 and A2 and the "encryption key K1" transmitted to the node Nx are stored in a correlated manner. The node ID "Nx" of the node Nx in the ad-hoc neteworks A1 and A2 and the "encryption key K2" transmitted to the node Nx are stored in a correlated manner.

Returning to the description of FIG. 59, the determining unit 5903 refers to the transmission completion list 6000 managing the nodes N to which the encryption keys Ki have been transmitted and thereby, determines whether the key notification frame AFi is to be transmitted to the mobile terminal MT. For example, the determining unit 5903 refers to the transmission completion list 6000 to determine whether the node ID included in the key notification frame AFi is already registered.

If the node ID included in the key notification frame AFi is already registered, the determining unit 5903 determines that the key notification frame AFi is not to be transmitted to the mobile terminal MT. In this case, the process of transmitting the key notification frame AFi is not executed by the SV transmitting unit 5902. For example, since a first record of the transmission completion list 6000 indicates that the encryption key K1 has been transmitted to the new node Nx, the key notification frame AF1 is not transmitted. Since a second record of the transmission completion list 6000 indicates that the encryption key K2 has been transmitted to the new node Nx, the key notification frame AF2 is not transmitted.

On the other hand, if the node ID included in the key notification frame AFi is not registered, the determining unit 5903 determines that the key notification frame AFi is to be transmitted to the mobile terminal MT. For example, in FIG. 60, if no second record exists in the transmission completion list 6000, it is determined that the key notification frame AF2 is to be transmitted.

The SV transmitting unit 5902 transmits the key notification frame AFi to the mobile terminal MT. If the key notification frame AFi is transmitted to the mobile terminal MT, for example, the node ID and the encryption key Ki included in the key notification frame AFi are registered into the transmission completion list 6000. In the example of the key notification frame AFi, the node ID "Nx" and the encryption key "K1" are registered in the transmission compression list 6000 in a correlated manner. This can prevent the same key notification frame AFi from being redundantly transmitted to the mobile terminal MT.

The determining unit 5903 may refer to the transmission completion list 6000 to determine whether the pair of the node ID and the encryption key Ki included in the key notification frame AFi is already registered. If the pair of the node ID and the encryption key Ki included in the key notification frame AFi is already registered, the determining unit 5903 determines that the key notification frame AFi is not to be transmitted to the mobile terminal MT.

On the other hand, if the pair of the node ID and the encryption key Ki included in the key notification frame AFi is not registered or, if either the node ID or the encryption key Ki is registered, the determining unit 5903 determines that the key notification frame AFi is to be transmitted to the mobile terminal MT. Therefore, even when the node ID included in the key notification frame AFi is registered, if the encryption key Ki is not registered, the determining unit 5903 determines that the key notification frame AFi is to be transmitted to the mobile terminal MT. As a result, for example, after the encryption key K1 is set in the node N in the ad-hoc network A1, if the node N is moved and used in another place belonging to the ad-hoc network A2, the new encryption key K2 to be set in the node N can be provided.

After the SV transmitting unit 5902 transmits the key notification frame AFi to the mobile terminal MT, if the connection with the mobile terminal MT is disconnected, the management server 101 may delete the key notification frame AFi received from the gateway Gi.

Although the key notification frame AFi including the encryption key Ki specific to each gateway Gi is transmitted from the gateway Gi to the management server 101 in the description, this is not a limitation. For example, the management server 101 may be configured to preliminarily retain the encryption keys K1 to Kn specific to the gateways G1 to Gn in the network system 100. A specific example of the encryption key DB 110 (database) retaining the encryption keys K1 to Kn specific to the gateways G1 to Gn will be described.

Figure 61:
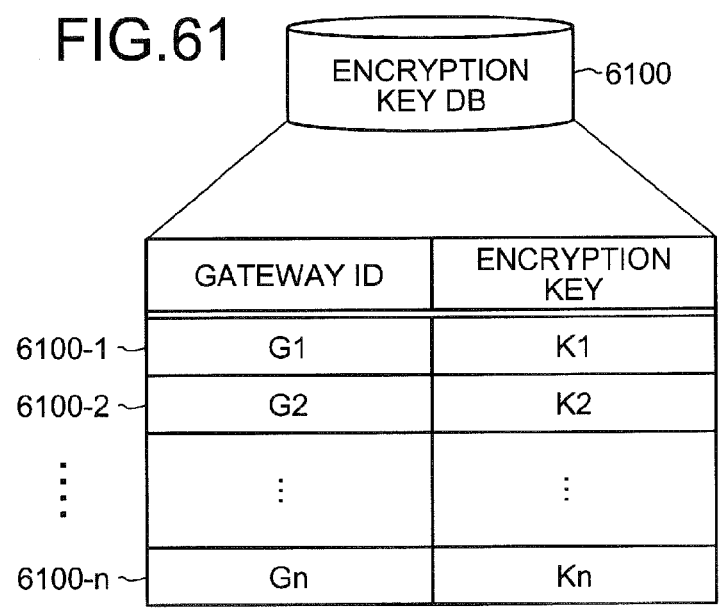
FIG. 61 is an explanatory view of an example of storage contents of the encryption key DB according to the third embodiment.

FIG. 61 is an explanatory view of an example of storage contents of the encryption key DB 110 according to the third embodiment. In FIG. 61, an encryption key DB 6100 has fields of gateway IDs and encryption keys and sets information in each field to store key information 6100-1 to 6100-n of the respective gateways G1 to Gn as records.

The gateway ID is an identifier of the gateway Gi. The encryption key is the encryption key Ki specific to the gateway Gi. Taking the key information 6100-1 as an example, the encryption key K1 specific to the gateway G1 is stored. The encryption key DB 6100 is implemented by a storage device such as the RAM 1603, the magnetic disk 1605, and the optical disk 1607, for example.

If the management server 101 retains the encryption keys K1 to Kn specific to the gateways G1 to Gn in this way, the SV receiving unit 5901 receives via the network NW1 and from the gateway Gi, a key notification frame AFi that does not include the encryption key Ki specific to the gateway Gi. For example, the SV receiving unit 5901 receives the key notification frame AFi depicted in FIG. 58 via the network NW1 from the gateway Gi.

If a key notification frame AFi that does not include the encryption key Ki specific to the gateway Gi is received, the extracting unit 5904 extracts the encryption key Ki specific to the gateway Gi from the encryption key DB 6100. For example, the extracting unit 5904 extracts from the encryption key DB 6100, the encryption key K1 stored and correlated with a gateway ID "G1" included in the received key notification frame AFi.

The SV transmitting unit 5902 transmits the extracted encryption key Ki specific to the gateway Gi via the network NW2 to the mobile terminal MT. By transmitting the key notification frame AFi that does not include the encryption key Ki from the gateway Gi, the amount of data can reduced at the time of communication between the gateway Gi and the management server 101 as compared to the case of transmitting the key notification frame AFi including the encryption key Ki.

The gateway Gi may be caused to transmit a key notification frame AFi that includes the encryption key Ki only at the time of the first transmission of the key notification frame to the management server 101 and may subsequently be caused to transmit a key notification frame AFi that does not include the encryption key Ki. In this case, the management server 101 may correlate and register into the encryption key DB 6100, the encryption key Ki included in the key notification frame AFi and a gateway ID, at the time of first reception of the key notification frame AFi. As a result, the management server 101 no longer needs to preliminarily retain the encryption keys K1 to Kn specific to the gateways G1 to Gn.

If the gateway Gi transmits the key notification frame AFi including the encryption key Ki to the management server 101, the process of extracting the encryption key Ki is not necessary and therefore, the management server 101 may omit the extracting unit 5904 and the encryption key DB 6100.

Figure 62:
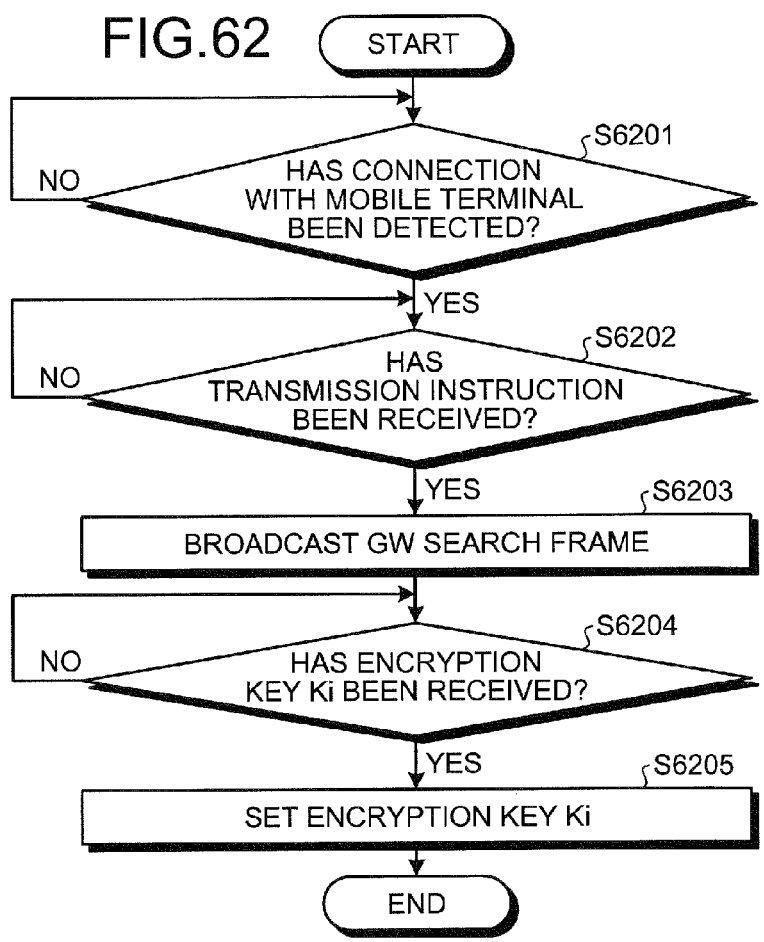
FIG. 62 is a flowchart of an example of the key setting process procedure of a new node according to the third embodiment.

FIG. 62 is a flowchart of an example of a key setting process procedure of the new node Nx by the N according to the third embodiment. In the flowchart of FIG. 62, first, the node N determines whether the detecting unit 5301 has detected connection with the mobile terminal MT communicable with the management server 101 (step S6201).

Detection of a connection with the mobile terminal MT is awaited (step S6201: NO), and when detected (step S6201: YES), the node N determines whether the receiving unit 5302 has received from the mobile terminal MT, an instruction for transmitting a GW search frame (step S6202).

Receipt of the transmission instruction data 5400 of the GW search frame TF is awaited (step S6202: NO), and when received (step S6202: YES), the node N causes the frame transmitting unit 5303 to broadcast the GW search frame TF on the ad-hoc network Ai (step S6203). The GW search frame TF is subsequently encrypted in the ad-hoc network Ai and arrives at the gateway Gi. The gateway Gi then transmits the key notification frame AFi to the management server 101.

The node N determines whether key receiving unit 5304 has received from the mobile terminal MT, the encryption key Ki specific to the gateway Gi in the ad-hoc network Ai to which the node N belongs (step S6204). For example, in the example depicted in FIG. 48, the new node Nx is disposed at the boundary between the ad-hoc networks A1 and A2. Therefore, the node N determines whether both the encryption key K1 specific to the gateway G1 and the encryption key K2 specific to the gateway G2 have been received. For example, in this case, the node N determines whether the key notification frames AF1 and AF2 have been received from the management server 101.

Receipt of the encryption key Ki specific to the gateway Gi is awaited (step S6204: NO), and when received (step S6204: YES), the node N causes the setting unit 5305 to set each of the received multiple encryption keys Ki as a key for encrypting packets (step S6205), and terminates the series of the operations according to this flowchart.

As a result, the node N can acquire and set each of the encryption keys Ki specific to the gateways Gi for encrypting packets transmitted/received between nodes in the ad-hoc networks Ai, from the management server 101 via communication channels (NW2, NW3) temporarily established by utilizing the mobile terminal MT. If the node N is a node already set in the ad-hoc network Ai, the communication process is the same as the communication process depicted in FIG. 25 and therefore, will not be described.

Figure 63:
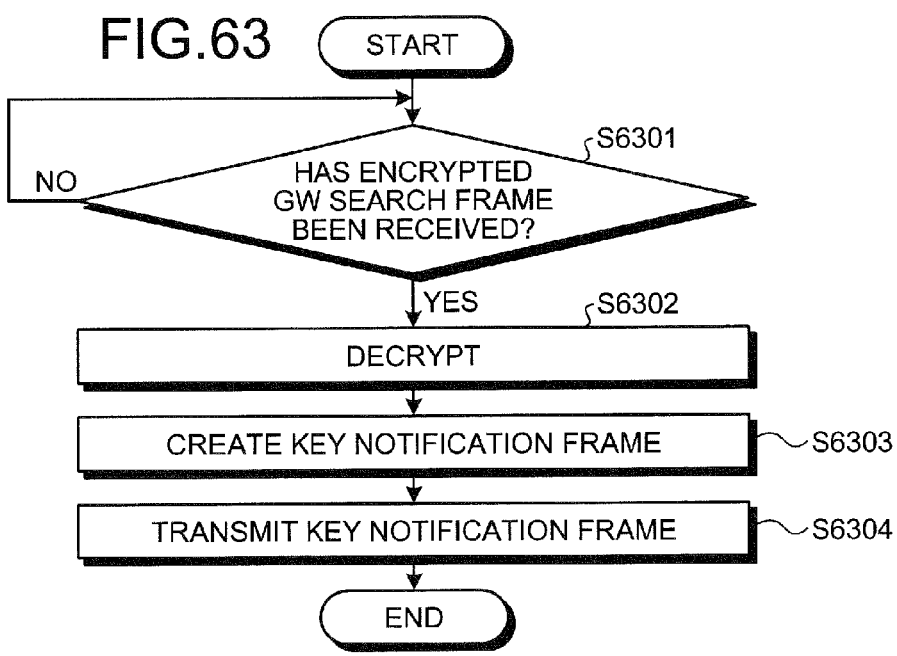
FIG. 63 is a flowchart of an example of a key notification process procedure of a gateway according to the third embodiment.

FIG. 63 is a flowchart of an example of a key notification process procedure of a gateway according to the third embodiment. In the flowchart of FIG. 63, first, it is determined whether the GW receiving unit 5601 has received the broadcasted encrypted GW search frame Ki(TF) from the ad-hoc network Ai (step S6301).

Receipt of an encrypted GW search frame Ki(TF) is awaited (step S6301: NO), and when received (step S6301: YES), the gateway Gi causes the decrypting unit 5602 to decrypt the encrypted GW search frame Ki(TF) into the GW search frame TF (step S6302). The gateway Gi causes the creating unit 5603 to create a key notification frame AFi representative of a notification request for the encryption key Ki specific to the gateway Gi (step S6303).

The gateway Gi causes the GW transmitting unit 5604 to transmit the created key notification frame AFi via the network NW1 to the management server 101 (step S6304) and terminates the series of the operations according to this flowchart.

As a result, the key notification frame AFi representative of a notification request for the encryption key Ki specific to the gateway Gi can be transmitted to the management server 101 according to the decrypted GW search frame TF.

A key providing process procedure of the management server 101 will be described. First, description will be made of the key providing process procedure when the management server 101 does not retain the encryption keys K1 to Kn specific to the gateways G1 to Gn. Therefore, the key providing process procedure in the following description is a process procedure when the key notification frame AFi transmitted from the gateway Gi to the management server 101 includes the encryption key Ki specific to the gateway Gi.

Figure 64:
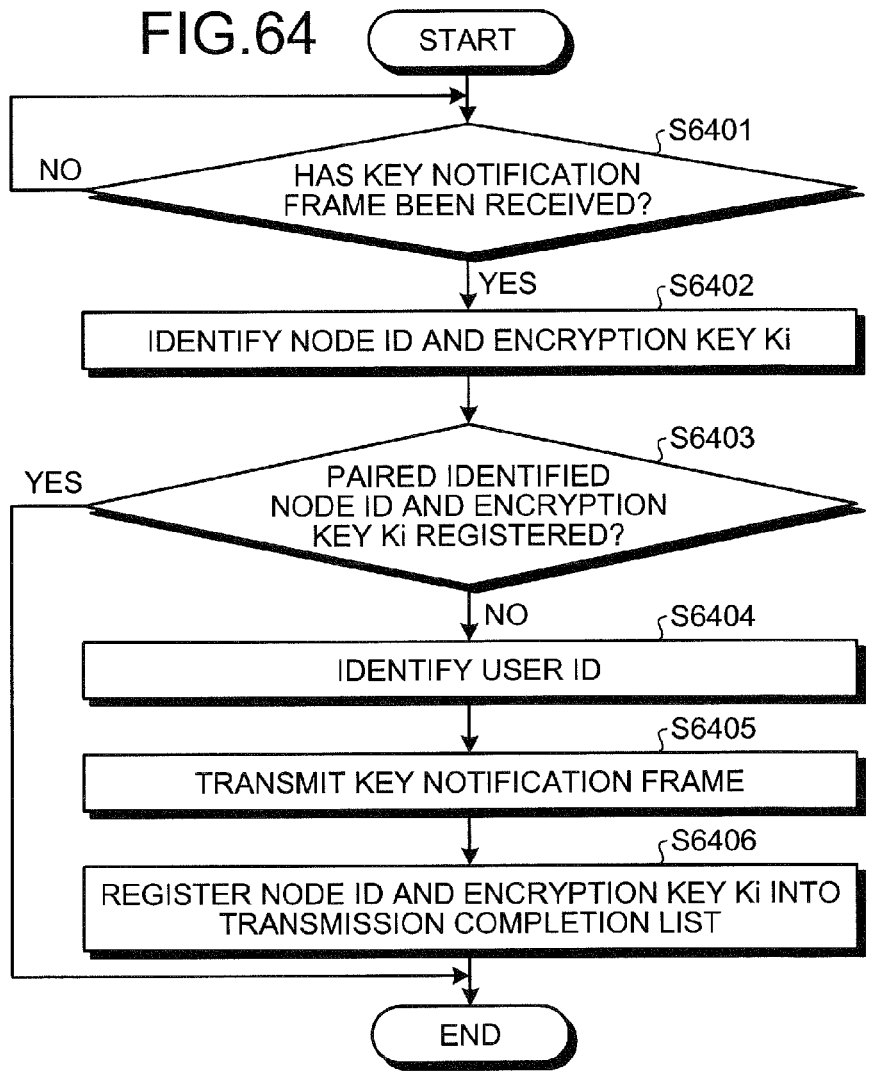
FIG. 64 is a flowchart (part 1) of an example of the key providing process procedure of the management server according to the third embodiment.

FIG. 64 is a flowchart (part 1) of an example of the key providing process procedure of the management server 101 according to the third embodiment. In the flowchart of FIG. 64, first, the management server 101 determines whether the SV receiving unit 5901 has received from the gateway Gi, a key notification frame AFi via the network NW1 (step S6401).

Receipt of a key notification frame AFi is awaited (step S6401: NO), and when received (step S6401: YES), the management server 101 causes the determining unit 5903 to identify a node ID and an encryption key Ki included in the received key notification frame AFi (step S6402). The management server 101 causes the determining unit 5903 to determine whether the pair of the identified node ID and the encryption key Ki is registered in the transmission completion list 6000 (step S6403).

If the pair of the node ID and the encryption key Ki is not registered in the transmission completion list 6000 (step S6403: NO), the management server 101 causes the SV transmitting unit 5902 to identify a user ID included in the received key notification frame AFi (step S6404). The management server 101 causes the SV transmitting unit 5902 to transmit the received key notification frame AFi via the network NW2 to the mobile terminal MT of the identified user ID (step S6405).

The management server 101 causes the determining unit 5903 to register the node ID and the encryption key Ki identified at step S6402 in a correlated manner into the transmission completion list 6000 (step S6406) and terminates the series of the operations according to this flowchart. On the other hand, if the pair of the node ID and the encryption key Ki is registered in the transmission completion list 6000 at step S6403 (step S6403: YES), the series of the operations according to this flowchart is terminated.

As a result, the management server 101 can provide the encryption key Ki specific to the gateway Gi in the ad-hoc network Ai to the new node Nx for each encryption key Ki via communication channels (NW2, NW3) temporarily established by utilizing the mobile terminal MT.

Description will be made of the key providing process procedure when the management server 101 retains the encryption keys K1 to Kn specific to the gateways G1 to Gn. Therefore, the key providing process procedure in the following description is a process procedure when the key notification frame AFi transmitted from the gateway Gi to the management server 101 does not include the encryption key Ki specific to the gateway Gi.

Figure 65:
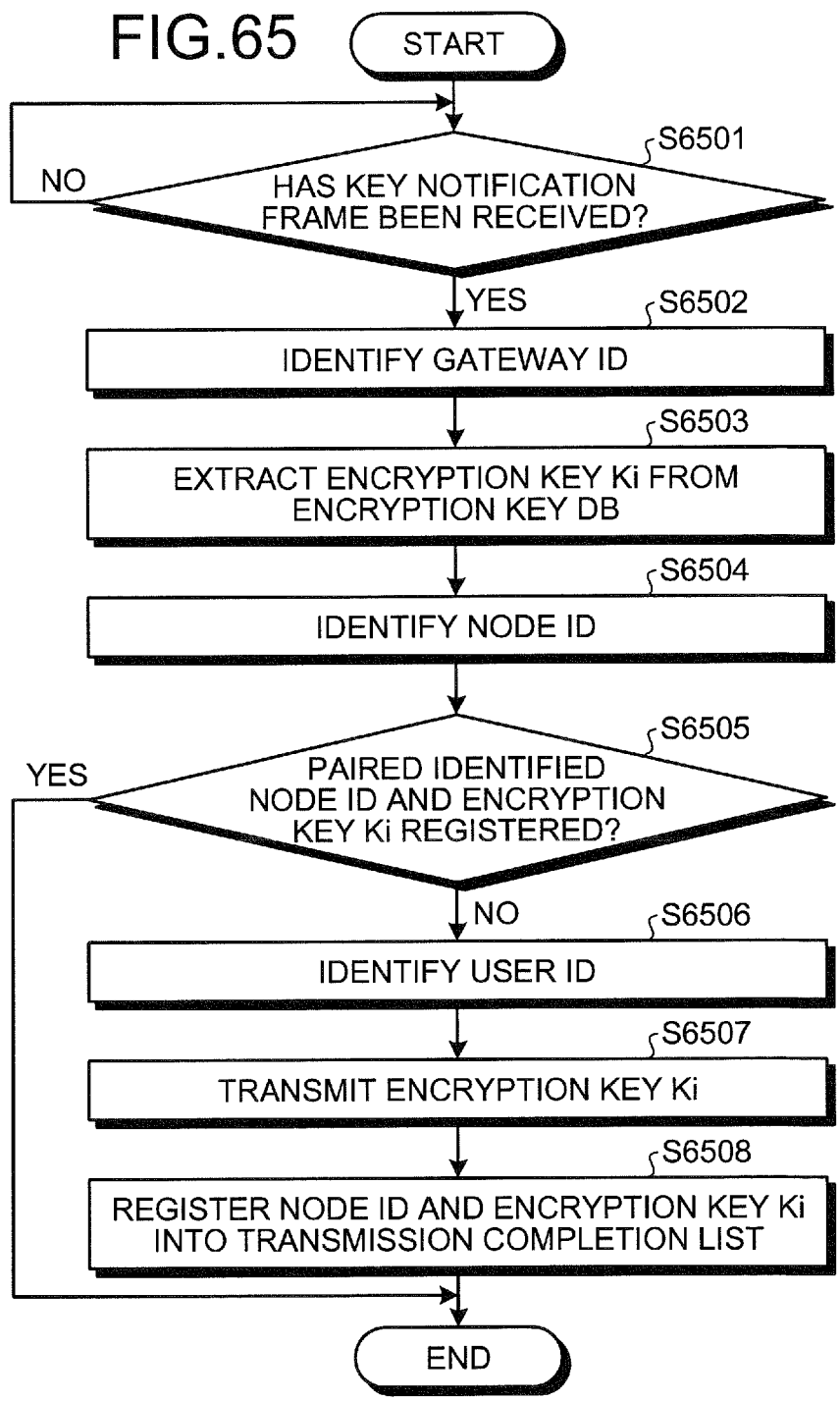
FIG. 65 is a flowchart (part 2) of an example of the key providing process procedure of the management server according to the third embodiment.

FIG. 65 is a flowchart (part 2) of an example of the key providing process procedure of the management server 101 according to the third embodiment. In the flowchart of FIG. 65, first, the management server 101 determines whether the SV receiving unit 5901 has received a key notification frame AFi via the network NW1 from the gateway Gi (step S6501).

Receipt of a key notification frame AFi is awaited (step S6501: NO), and when received (step S6501: YES), the management server 101 causes the extracting unit 5904 to identify a gateway ID included in the received key notification frame AFi (step S6502). The management server 101 causes the extracting unit 5904 to extract from the encryption key DB 6100, the encryption key Ki stored and correlated with the identified gateway ID (step S6503).

The management server 101 causes the determining unit 5903 to identify a node ID included in the received key notification frame AFi (step S6504). The management server 101 causes the determining unit 5903 to determine whether the pair of the identified node ID and the extracted encryption key Ki is registered in the transmission completion list 6000 (step S6505).

If the pair of the node ID and the encryption key Ki is not registered in the transmission completion list 6000 (step S6505: NO), the management server 101 causes the SV transmitting unit 5902 to identify a user ID included in the received key notification frame AFi (step S6506). The management server 101 causes the SV transmitting unit 5902 to transmit the extracted encryption key Ki via the network NW2 to the mobile terminal MT of the identified user ID (step S6507).

The management server 101 causes the determining unit 5903 to register the node ID identified at step S6504 and the encryption key Ki extracted at step S6503 in a correlated manner into the transmission completion list 6000 (step S6508) and terminates the series of the operations according to this flowchart.

On the other hand, if the pair of the node ID and the encryption key Ki is registered in the transmission completion list 6000 at step S6505 (step S6505: YES), the series of the operations according to this flowchart is terminated. As a result, the amount of data at the time of communication with the gateway Gi can be reduced as compared to the case of receiving the key notification frame AFi including the encryption key Ki from the gateway Gi.

As described above, according to the third embodiment, a temporary communication channel can be established between the new node Nx and the management server 101 via the mobile terminal MT of the operator OP. In response to connection with the mobile terminal MT, the new node Nx can broadcast the GW search frame TF on the ad-hoc network Ai. The encryption key Ki transmitted from the gateway Gi to the management server 101 as a result of the transfer of the GW search frame TF to the gateway Gi can be received via the mobile terminal MT by the new node Nx.

Therefore, at the time of the key setting of the new node Nx located at the boundary between multiple ad-hoc networks Ai, the multiple encryption keys Ki settable in the new node Nx can be acquired easily and the efficiency in the setting operation of the encryption keys Ki used by the new node Nx can be increased. For example, in such a case when the new node Nx is initially introduced, the operator OP does not have to perform an operation such as thoroughly confirming communication states between geographically narrowed-down candidate gateways Gi and the new node Nx and, the efficiency in the setting operation of the encryption key Ki for the new node Nx can be increased. Since it is not necessary to record the encryption keys of the candidate gateways in the mobile terminal MT, etc. for the confirming operation, the risk of information leaks can be reduced when the mobile terminal MT is transported.

In response to the transmission instruction data 5400 of the GW search frame TF from the mobile terminal MT, the GW search frame TF can be broadcasted from the new node Nx onto the ad-hoc network Ai. As a result, when the mobile terminal MT is utilized to perform a setting operation different from the key setting for the new node Nx, the broadcast of the GW search frame TF from the new node Nx can be prevented at the time of detection of the connection with the mobile terminal MT.

The GW search frame TF including the identifier of the mobile terminal MT can be broadcasted from the new node Nx onto the ad-hoc network Ai. As a result, if multiple mobile terminals MT are connected in a communicable manner, the management server 101 can properly identify the mobile terminal MT that is the transmission destination of the key notification frame AFi.

The GW search frame TF including the identifier of the new node Nx can be broadcasted from the new node Nx to the ad-hoc network Ai. As a result, the management server 101 can manage the nodes N to which the key notification frame AFi has been transmitted and a redundant transmission of the key notification frame AFi can be prevented.

According to the third embodiment, since a specific encryption key is set in each ad-hoc network, nodes in an ad-hoc network have the same encryption key. On the other hand, the encryption keys of the respective ad-hoc networks are set in a node (the new node Nx) communicable with the multiple ad-hoc networks. Therefore, if communication cannot be performed with an ad-hoc network consequent to communication failure, data can be transmitted through another ad-hoc network to the management server 101.

Therefore, while security is maintained, a node having multiple encryption keys set can autonomously select a communicable gateway and prevent drops in robustness. Since multiple encryption keys are set, if one key is leaked, no data is leaked from the ad-hoc network communicable through an encryption key that has not been leaked. Therefore, as compared to an ad-hoc network in which only one encryption key can be set for each gateway, the risk of key leakage can be reduced.

All the encryption keys of respective ad-hoc networks are set only in a node (the new node Nx) within the communication ranges of the multiple ad-hoc networks, while other nodes have only one encryption key set specific to a gateway to which the node belongs. Therefore, since only one encryption key is necessary for the processes (encryption, decryption) in the nodes in the ad-hoc network and transmitted packets are only the encrypted packets encrypted with the one encryption key, increases in the amount of communication can be suppressed.

A fourth embodiment concerning main/sub determination of multiple key in the upstream type will be described. Although an example of setting multiple encryption keys in the new node Nx is described in the third embodiment, the multiple encryption keys Ki set in the new node Nx are separately set as main and sub-keys in the fourth embodiment as depicted in the fifth example of FIG. 5. For example, the encryption and decryption are normally performed with the main key and, if the decryption cannot be achieved with the main key, the sub-key is used. Subsequently, a new node is set to be subordinate to the newly set node Nx. If a new node is present that is subordinate the node Nx, the node Nx is referred to as a "boundary node".

Constituent elements identical to those depicted in the third embodiment are denoted by the same reference numerals used in FIG. the third embodiment and will not be described. The description other than the main/sub determination of encryption keys is common with the third embodiment and therefore will be omitted.

FIGS. 66 to 70 are explanatory views of an example of introduction of a new node subordinate to a node at a boundary between (within communication ranges of) multiple ad-hoc networks of the upstream type according to the fourth embodiment.

Figure 66:
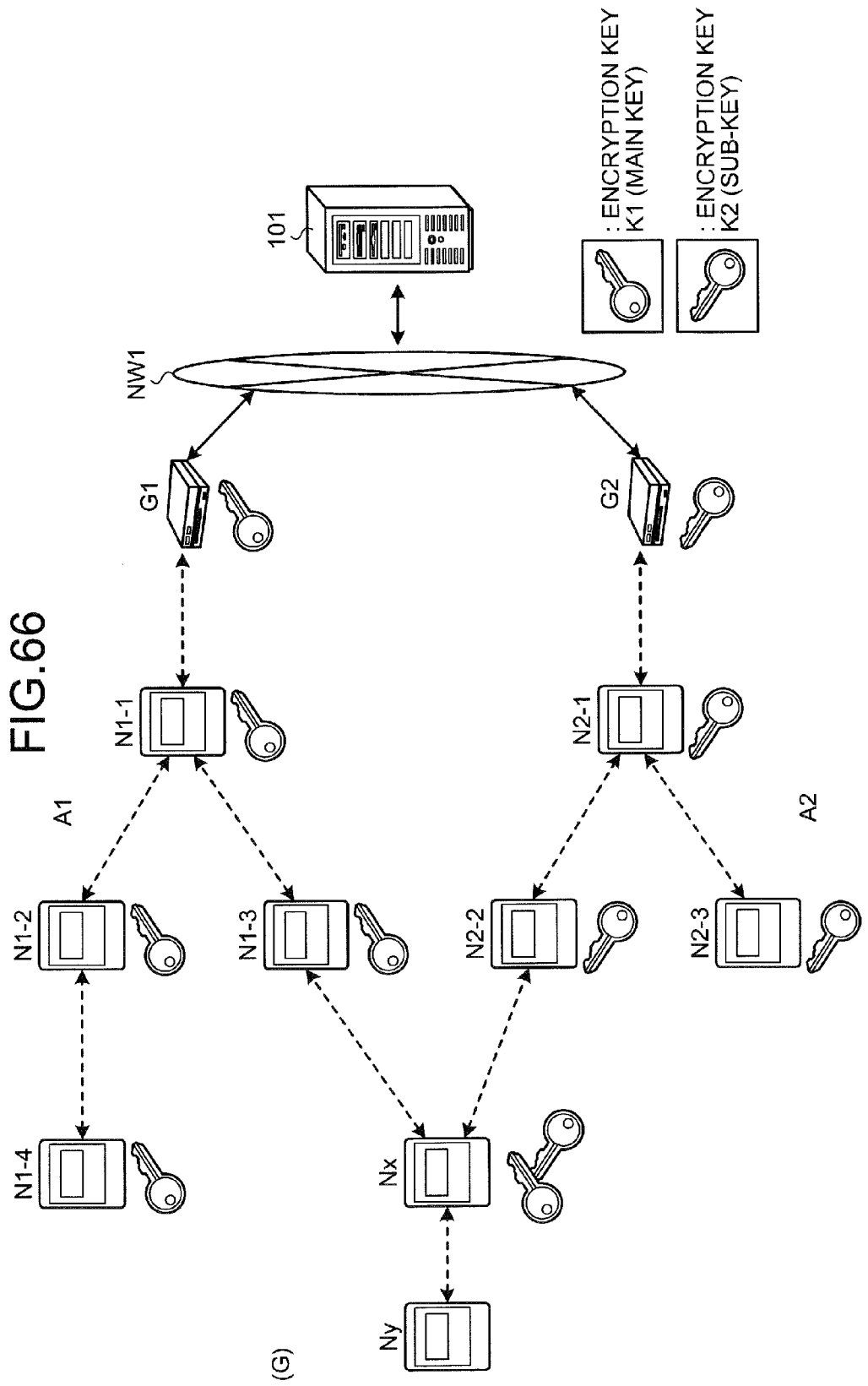
FIGS. 66, 67, 68, 69, and 70 are explanatory views of an example of introduction of a new node subordinate to a node at a boundary between (within communication ranges of) multiple ad-hoc networks of an upstream type according to a fourth embodiment.

In a state (G) depicted in FIG. 66, the encryption keys K1 and K2 are set in the boundary node Nx. The encryption key K1 and the encryption key K2 are defined as a main key and a sub-key, respectively. The main/sub determination of the encryption keys K1 and K2 is performed by the management server 101. This point will be described later.

Figure 67:
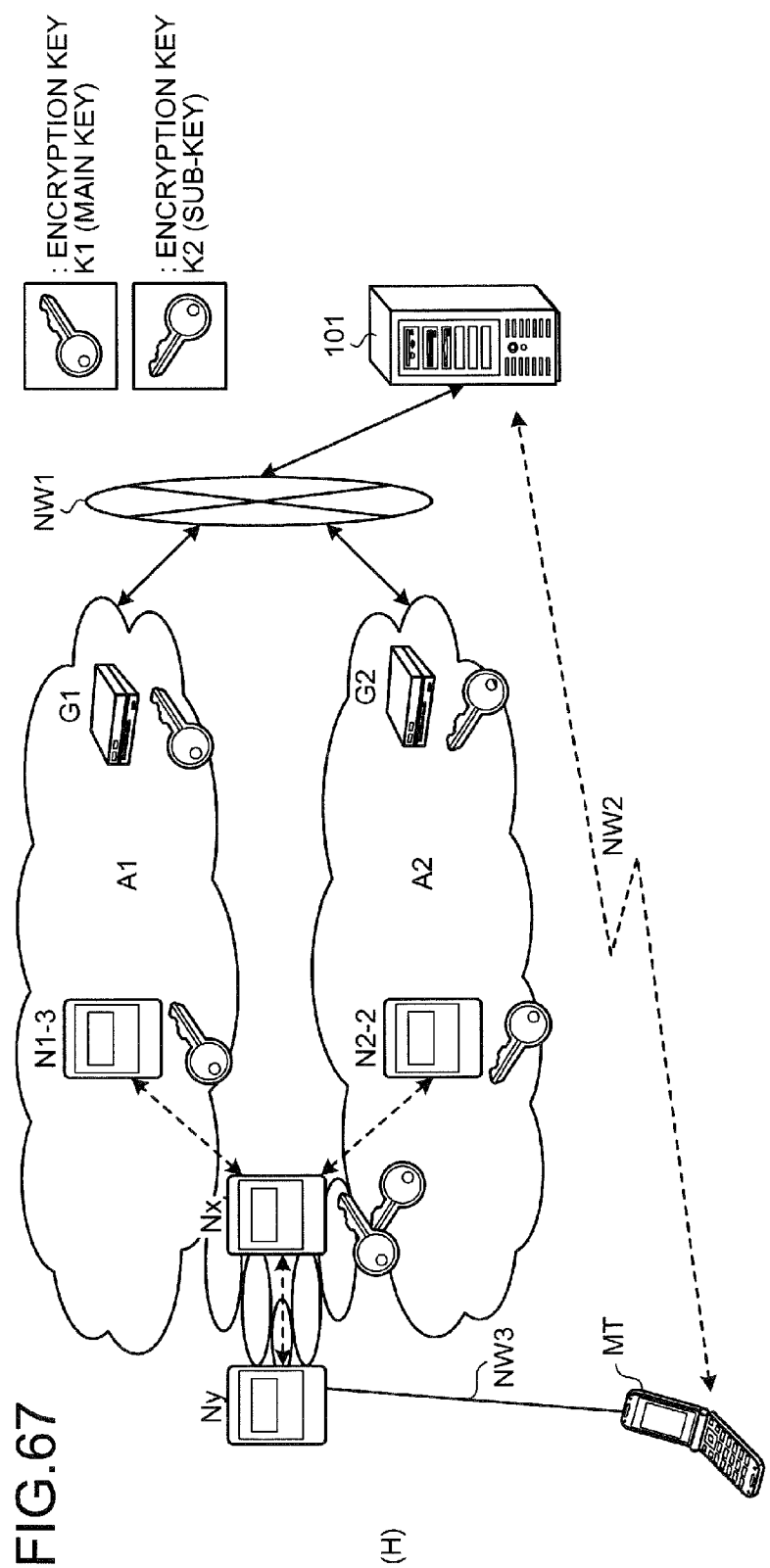

FIG. 67 depicts a state (H) subsequent to the state (G). The state (H) depicts a state in which the mobile terminal MT connectable via the secure network NW2 to the management server 101 is connected to the new node Ny via the network NW3.

Figure 68:
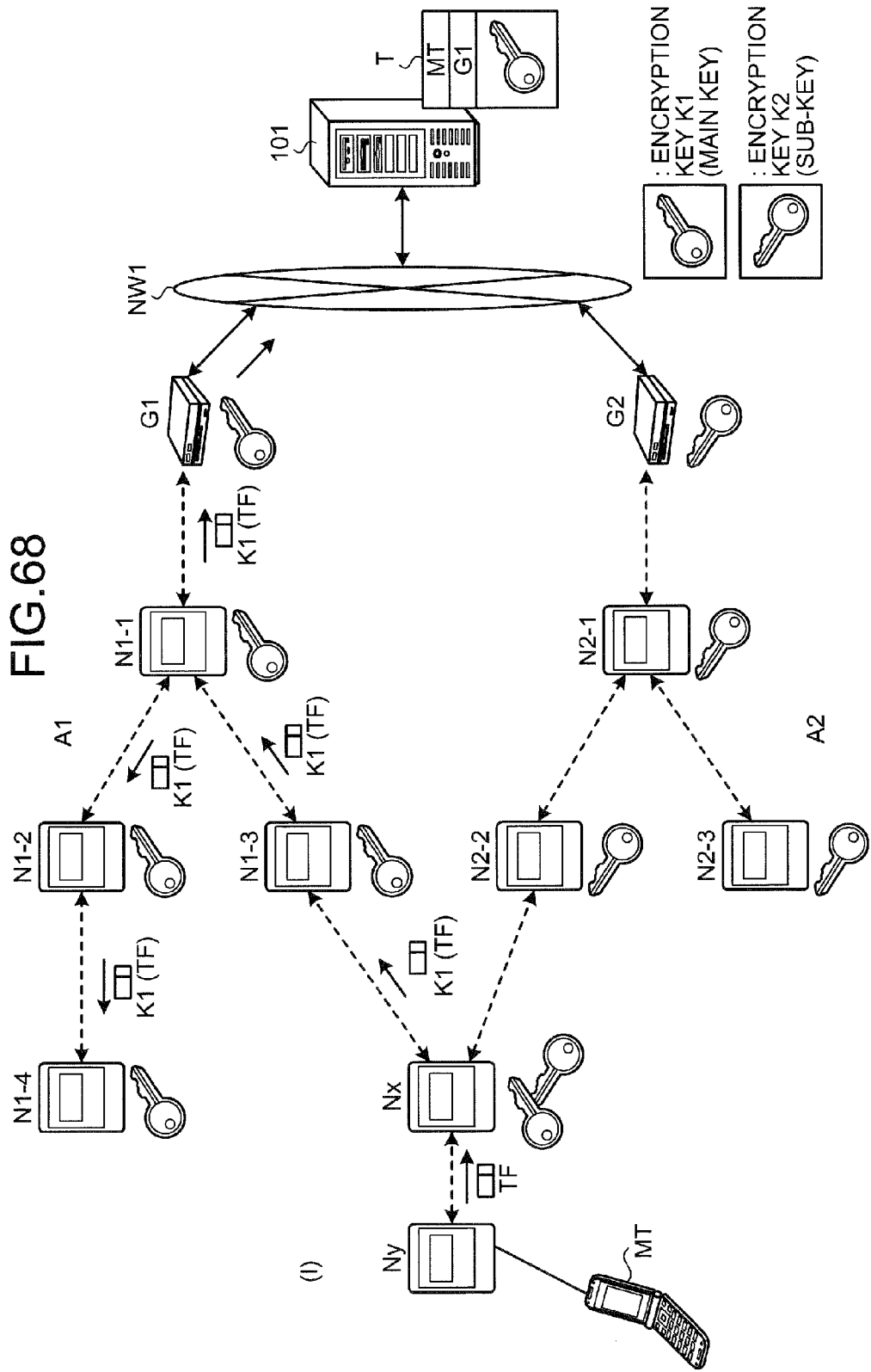

FIG. 68 depicts a state (I) subsequent to the state (H). In the state (I), from the state of (H), the new node Ny broadcasts the GW search frame TF on the ad-hoc neteworks A1 and A2. The gateway Gi receiving the GW search frame TF uploads to the management server 101, the encryption key Ki specific to the gateway Gi.

If the boundary node Nx within the communication range of the new node Ny receives the GW search frame TF from the new node Ny, the boundary node Nx does not discard the GW search frame TF and encrypts the GW search frame TF with the encryption key K1 that is the main key. The boundary node Nx broadcasts the encrypted GW search frame K1(TF) on the ad-hoc network A1. As a result, the encrypted GW search frame K1(TF) goes to all of the nodes N1-1 to N1-4 and the gateway G1.

Similarly, the boundary node Nx does not encrypt the GW search frame TF with the encryption key K2 that is the sub-key and therefor does not transmit the GW search frame TF to the ad-hoc network A2. Even if the node N2-2 of the ad-hoc network A2 intercepts the encrypted GW search frame K1(TF) encrypted by the encryption key K1 that is the main key, the frame is discarded since the node N2-2 cannot decrypt the frame.

When receiving the encrypted GW search frame K1(TF), the gateway G1 decrypts the frame using the encryption key K1 and uploads the encryption key K1 to the management server 101 according to the instruction details in the GW search frame TF. As a result, the management server 101 creates a table T correlating an identifier of the mobile terminal MT (e.g., "D1" described later) with the encryption key K1 of the gateway G1.

Figure 69:
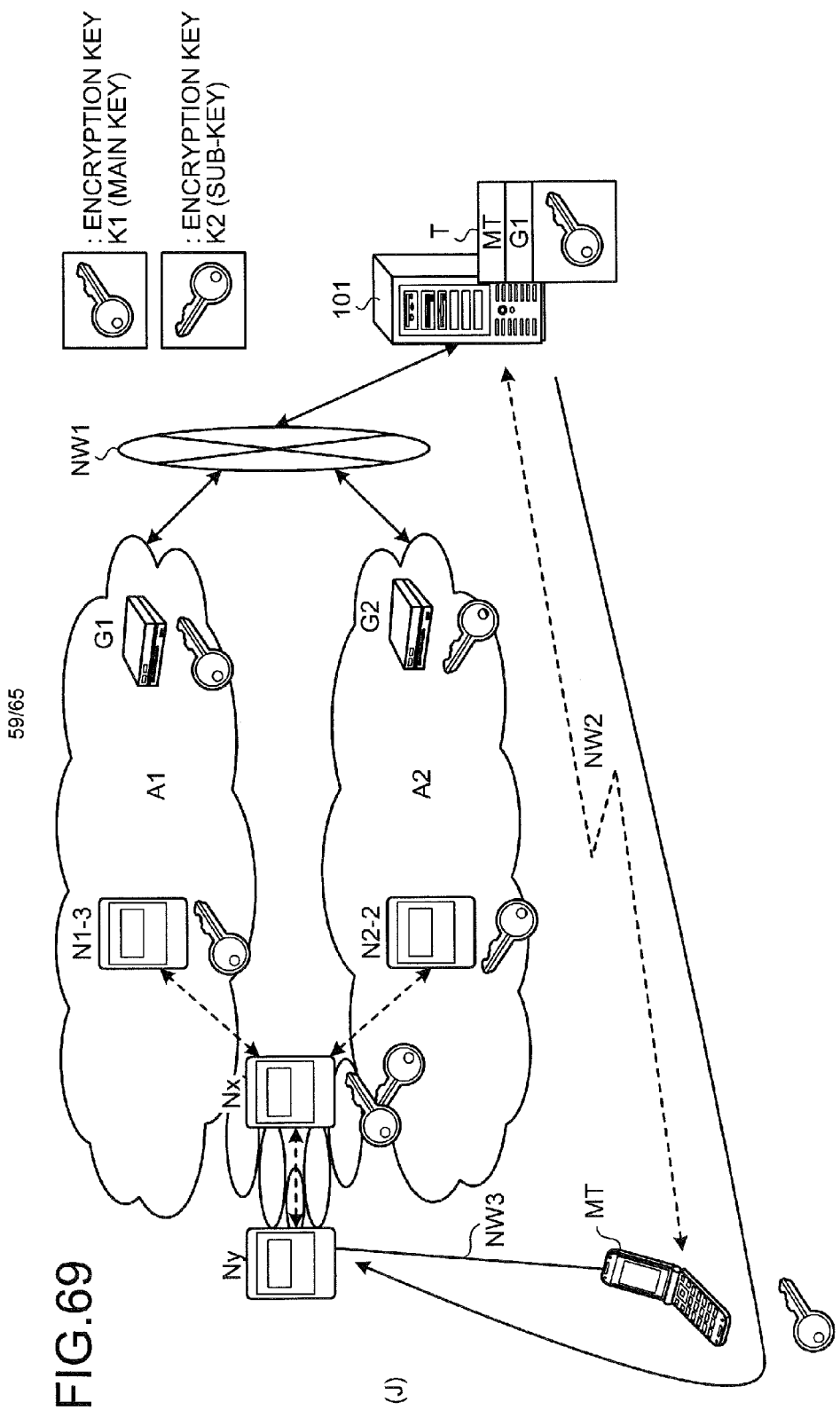

FIG. 69 depicts a state (J) subsequent to the state (I). In the state (J), the management server 101 transmits the encryption key K1 received at the state (I), via the network NW2 to the mobile terminal MT correlated with the encryption key K1 in the table T. The mobile terminal MT transmits the encryption key K1 received from the management server 101 via the network NW3 to the new node Ny.

Figure 70:
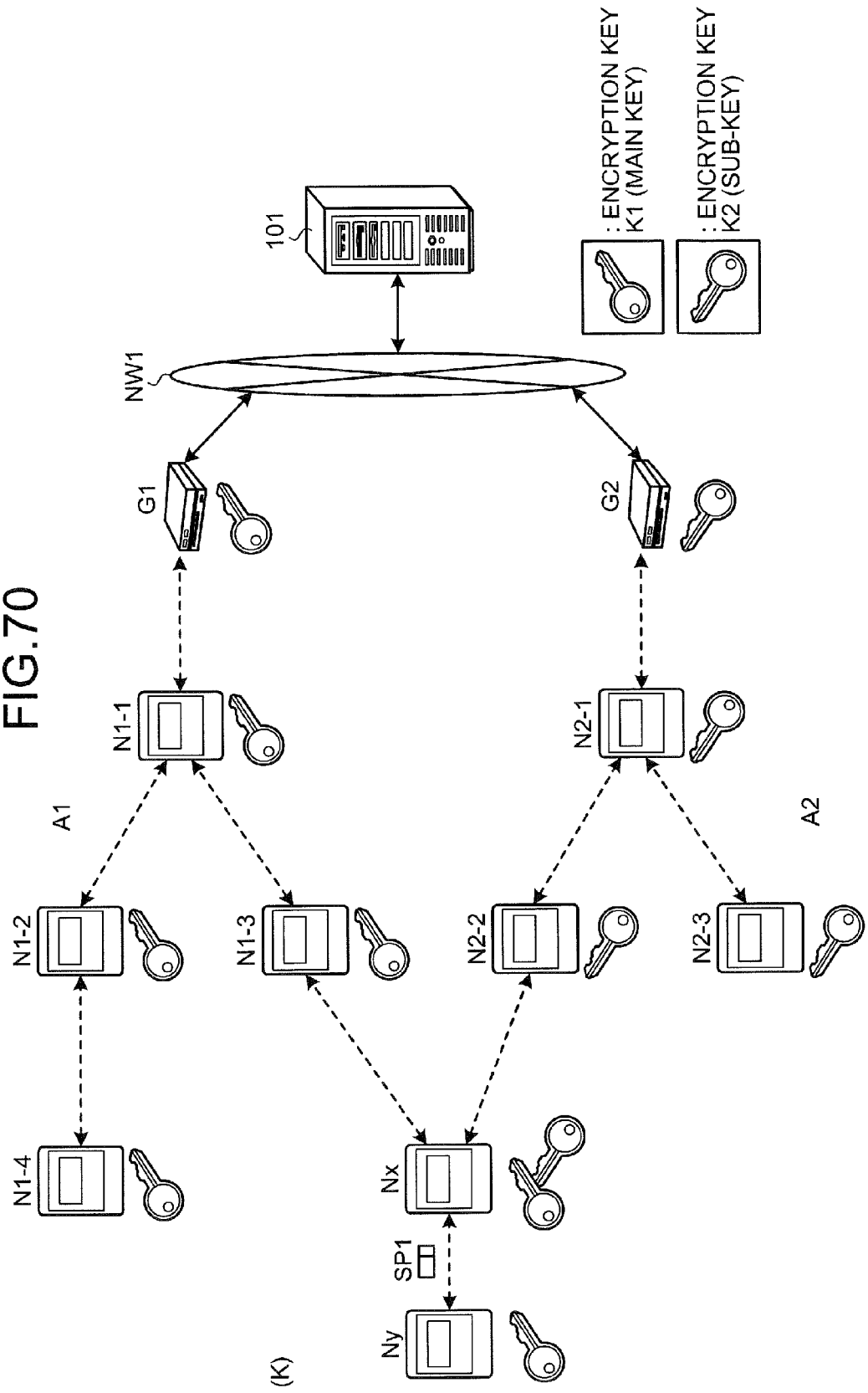

FIG. 70 depicts a state (K) subsequent to the state (J). In the state (K), the new node Ny receives and sets the encryption key K1 transmitted from the management server 101 as a key for encryption and decryption. Therefore, the new node Ny can subsequently decrypt the encrypted packet SP1 from the boundary node Nx using the encryption key K1. From the new node Ny, the encrypted packet SP1 encrypted using the encryption key K1 is transmitted to the boundary node Nx.

As described above, only the main key of the boundary node Nx is set as an encryption key in the new node Ny subordinate to the boundary node Nx and therefore, increases in the amount of communication in each of the ad-hoc networks A1 and A2 can be suppressed while the security and the robustness are maintained.

Hardware configuration examples of the management server 101 and nodes, etc. are the same as in the first to third embodiments and therefore, will not be described. A functional configuration of the boundary node Nx is the configuration as depicted in FIG. 53 and therefore, will not be described. A functional configuration of the new node Ny is identical to a normal node N other than the boundary node Nx and therefore, will not be described.

Figure 71:
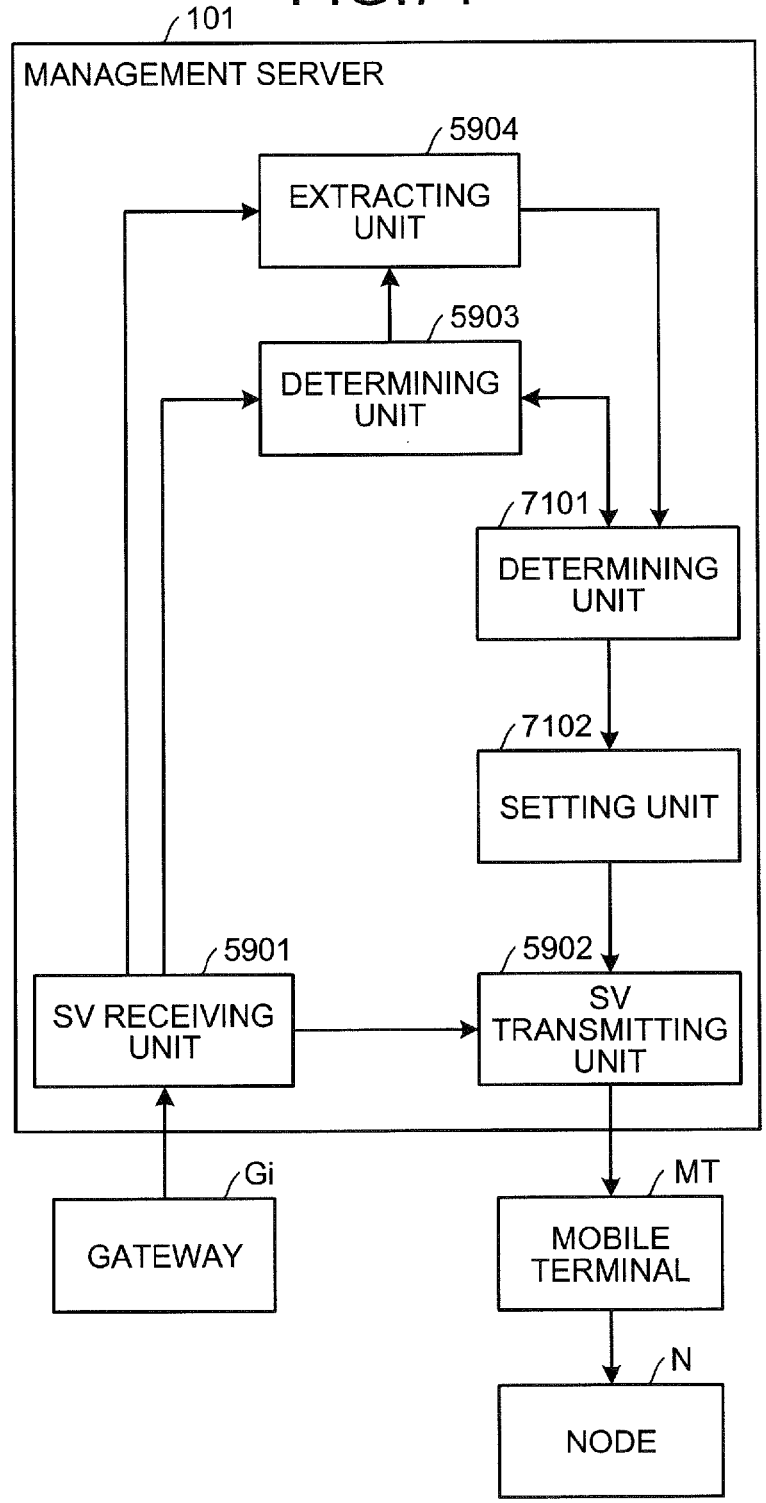
FIG. 71 is a block diagram of a functional configuration of the management server according to the fourth embodiment.

FIG. 71 is a block diagram of a functional configuration of the management server 101 according to the fourth embodiment. The management server 101 of FIG. 71 has a determining unit 7101 and a setting unit 7102, in addition to the management server 101 depicted in FIG. 59. For example, functions of the determining unit 7101 and the setting unit 7102 are implemented by the CPU 1601 executing programs stored in a storage device such as the ROM 1602, the RAM 1603, the magnetic disk 1605, and the optical disk 1607 depicted in FIG. 16 or by the I/F 1608. Process results of the determining unit 7101 and the setting unit 7102 are stored in a storage device such as the RAM 1603, the magnetic disk 1605, and the optical disk 1607, for example.

The determining unit 7101 determines main and sub-keys from among the encryption keys Ki and based on the order of arrival of the key notification frames AFi from the gateways Gi. For example, the determining unit 7101 determines the encryption key Ki in the key notification frame AFi arriving earlier (arriving first) as the main key and determines the encryption keys Ki in the key notification frames AFi arriving later (arriving second or later) as the sub-keys. For example, if the key notification frame AF1 from the gateway 1 is received earlier than the key notification frame AF2 from the gateway 2, the encryption key K1 is determined as the main key and the encryption key K2 is determined as the sub-key.

In other words, when the key notification frame AFi arrives earlier, it is considered that a transfer path of the encrypted GW search frame Ki(TF) is accordingly shorter and enables efficient communication. Therefore, by determining, as the main key, the encryption key Ki in the key notification frame AFi that arrived earlier, the efficiency of communication can be improved.

The determining unit 7101 may determine the main and sub-keys from the encryption keys Ki based on the number of receptions related to the encryption keys Ki for each received encryption key Ki. For example, the determining unit 7101 determines the encryption key Ki having the largest number of receptions of the key notification frame AFi for each gateway Gi as the main key and determines the encryption keys Ki having the second and following numbers of receptions as the sub-keys.

For example, if the number of receptions of the key notification frame AF1 from the gateway G1 is two and the number of receptions of the key notification frame AF2 from the gateway G2 is eight, the encryption key K2 is determined as the main key and the encryption key K1 is determined as the sub-key.

In other words, when the number of receptions of the key notification frame AFi is larger, it is considered that the transfer paths of the encrypted GW search frame Ki(TF) respectively exist for each of the receptions in the ad-hoc network Ai. Therefore, if a communication failure occurs in a given path, packets can more frequently be transferred through an alternate path and thus, the features of the ad-hoc network Ai, i.e., the autonomy and the robustness can be secured, and communication can safely be performed. In any determining method, at least one key needs to be determined as a sub-key.

If the determining unit 7101 determines the main and sub-keys, the setting unit 7102 adds information indicative of main/sub to the key notification frame AFi. An additional example will hereinafter be described.

FIG. 72 is an explanatory view of a first example of setting a key notification frame by the setting unit 7102 according to the fourth embodiment. FIG. 72 depicts the key notification frame AF1 including the encryption key K1 specific to the gateway G1. Since the encryption key K1 is determined as the main key, "MAIN" is added to the key notification frame AF1 as the main/sub information.

FIG. 73 is an explanatory view of a second example of setting a key notification frame by the setting unit 7102 according to the fourth embodiment. FIG. 73 depicts the key notification frame AF2 including the encryption key K2 specific to the gateway G2. Since the encryption key K2 is determined as the sub-key, "SUB" is added to the key notification frame AF2 as the main/sub information. The key notification frames AF1 and AF2 of FIGS. 72 and 73 are transmitted via the mobile terminal MT to the boundary node Nx when the boundary node Nx is newly set.

A key providing process procedure of the management server 101 will be described. First, description will be made of the key providing process procedure when the management server 101 does not retain the encryption keys K1 to Kn specific to the gateways G1 to Gn. Therefore, the key providing process procedure in the following description is a process procedure when the key notification frame AFi transmitted from the gateway Gi to the management server 101 includes the encryption key Ki specific to the gateway Gi.

FIG. 74 is a flowchart (part 1) of an example of the key providing process procedure of the management server 101 according to the fourth embodiment. In the flowchart of FIG. 74, first, the management server 101 determines whether the SV receiving unit 5901 has received from the gateway Gi, a key notification frame AFi via the network NW1 (step S7401).

If a key notification frame AFi has been received (step S7401: YES), the management server 101 causes the determining unit 5903 to identify a node ID and an encryption key Ki included in the received key notification frame AFi (step S7402). The determining unit 5903 determines whether the pair of the identified node ID and the encryption key Ki is registered in the transmission completion list 6000 (step S7403).

If the pair of the node ID and the encryption key Ki is not registered in the transmission completion list 6000 (step S7403: NO), the management server 101 causes the determining unit 5903 to register the node ID and the encryption key Ki identified at step S7402 in a correlated manner into the transmission completion list 6000 (step S7404) and the procedure returns to step S7401. On the other hand, if the pair of the node ID and the encryption key Ki is registered in the transmission completion list 6000 (step S7403: YES), the procedure returns to step S7401.

If a key notification frame AFi has not been received at step S7401 (step S7401: NO), the management server 101 determines whether a time-out has occurred (step S7405). If no time-out has occurred (step S7405: NO), the procedure returns to step S7401. On the other hand, if a time-out has occurred (step S7405: YES), the management server 101 causes the determining unit 7101 to make a main/sub determination (step S7406).

The management server 101 subsequently causes the setting unit 7102 to add the main/sub information to the key notification frame AFi (step S7407) and causes the SV transmitting unit 5902 to identify a user ID included in the received key notification frame AFi (step S7408). The management server 101 transmits the key notification frame AFi to the new node Nx (step S7409), and terminates the series of the operations according to this flowchart.

As a result, the encryption key Ki specific to the gateway Gi in the ad-hoc network Ai can be provided to the boundary node Nx for each encryption key Ki via communication channels (NW2, NW3) temporarily established by utilizing the mobile terminal MT.

Description will be made of the key providing process procedure when the management server 101 retains the encryption keys K1 to Kn specific to the gateways G1 to Gn. Therefore, the key providing process procedure in the following description is a process procedure when the key notification frame transmitted from the gateway Gi to the management server 101 does not include the encryption key Ki specific to the gateway Gi.

FIG. 75 is a flowchart (part 2) of an example of the key providing process procedure of the management server 101 according to the fourth embodiment. In the flowchart of FIG. 75, first, the management server 101 determines whether the SV receiving unit 5901 has received the key notification frame AFi via the network NW1 from the gateway Gi (step S7501).

If received (step S7501: YES), the management server 101 causes the extracting unit 5904 to identify a gateway ID included in the received key notification frame AFi (step S7502). The management server 101 causes the extracting unit 5904 to extract from the encryption key DB 6100, the encryption key Ki stored and correlated with the identified gateway ID (step S7503).

The management server 101 causes the determining unit 5903 to identify a node ID included in the received key notification frame AFi (step S7504). The management server 101 causes the determining unit 5903 to determine whether the pair of the identified node ID and the extracted encryption key Ki is registered in the transmission completion list 6000 (step S7505).

If the pair of the node ID and the encryption key Ki is not registered in the transmission completion list 6000 (step S7505: NO), the management server 101 causes the determining unit 5903 to register the node ID identified at step S7504 and the encryption key Ki in a correlated manner into the transmission completion list 6000 (step S7506), and the procedure returns to step S7501. On the other hand, if the pair of the node ID and the encryption key Ki is registered in the transmission completion list 6000 (step S7505: YES), the procedure returns to step S7501.

If the key notification frame AFi has not been received at step S7501 (step S7501: NO), the management server 101 determines whether a time-out has occurred (step S7507). If no time-out has occurred (step S7507: NO), the procedure returns to step S7501. On the other hand, if a time-out has occurred (step S7507: YES), the management server 101 causes the determining unit 7101 to make a main/sub determination (step S7508).

The management server 101 subsequently causes the setting unit 7102 to add the main/sub information to the key notification frame AFi (step S7509) and causes the SV transmitting unit 5902 to identify a user ID included in the received key notification frame AFi (step S7510). The management server 101 transmits the key notification frame AFi to the new node Nx (step S7511) for each of the main and sub-keys and, terminates the series of the operations according to this flowchart.

As a result, the amount of data at the time of communication with the gateway Gi can be reduced as compared to the case of receiving from the gateway Gi, the key notification frame AFi that includes the encryption key Ki.

A communication process of the boundary node Nx located at the boundary of multiple ad-hoc networks Ai will be described.

FIG. 76 is a flowchart of a communication process procedure of the boundary node Nx according to the fourth embodiment. First, the boundary node Nx awaits receipt of a packet (step S7601: NO), and when a packet is received (step S7601: YES), the boundary node Nx determines whether the packet can be decrypted using the main key (step S7602).

If the packet can be decrypted (step S7602: YES), the boundary node Nx determines whether the destination address of the received packet is the address of the node (the boundary node Nx) (or address for broadcast) (step S7603). If the destination address is the address of the node (the boundary node Nx) (or address for broadcast) (step S7603: YES), the boundary node Nx executes a data process based on the decrypted data (step S7604) and transfers the received packet to a transfer destination (step S7605). The communication process is then terminated.

On the other hand, if the destination address is not the address of the node (the boundary node Nx) (or address for broadcast) at step S7603 (step S7603: NO), the boundary node Nx transfers the received packet to a transfer destination (step S7605). The transfer destination is a node prescribed by a routing table acquired through a broadcast packet from the gateway Gi.

If the packet cannot be decrypted using the main key at step S7602 (step S7602: NO), the boundary node Nx determines whether the packet can be decrypted by a sub-key (step S7606).

If the packet can be decrypted (step S7606: YES), the boundary node Nx determines whether the destination address of the received packet is the address of the node (the boundary node Nx) (or address for broadcast) (step S7607). If the destination address is the address of the node (the boundary node Nx) (or address for broadcast) (step S7607: YES), the boundary node Nx executes a data process based on the decrypted data (step S7608). The boundary node Nx encrypts the decrypted data using the main key (step S7609), and transfers the packet encrypted using the main key to a transfer destination (S7610). The communication process is then terminated.

On the other hand, if the destination address is not the address of the node (the boundary node Nx) (or address for broadcast) at step S7607 (step S7607: NO), the boundary node Nx encrypts the decrypted data with the main key (step S7609) and transfers the packet encrypted with the main key to a transfer destination (S7610). The communication process is then terminated.

If the packet cannot be decrypted with any sub-key at step S7606 (step S7606: NO), the boundary node Nx determines whether the received packet is the GW search frame TF (step S7611). Whether the packet is the GW search frame TF can be identified by checking the frame type.

If the packet is not the GW search frame TF (step S7611: NO), this means that the received packet has been intercepted and therefore, the boundary node Nx discards the received packet (step S7612) and terminates the communication process.

On the other hand, if the packet is the GW search frame TF at step S7611 (step S7611: YES), the boundary node Nx encrypts the GW search frame TF using the main key (step S7613). The boundary node Nx transfers the encrypted GW search frame to a transfer destination (step S7614). The transfer destination is a node prescribed by a routing table acquired through a broadcast packet from the gateway Gi. A communication process of the new node Ny is the same as the communication process depicted in FIG. 30 and therefore will not be described.

As described, the key setting method, the node, the server, and the network system according to the fourth embodiment can achieve reductions in the workload of the operator and in the work hours required for the encryption key setting operation for nodes in ad-hoc networks as is the case with the third embodiment.

Since the multiple encryption keys set in the boundary node Nx are classified into and used as main and sub-keys, only the main key (e.g., the encryption key K1) can be assigned to the new node Ny set to be subordinate to the node Nx without the need of assigning the sub-keys (e.g., the encryption key K2). Therefore, since the number of keys can be set to one in the subordinate node Ny and subsequent nodes of the boundary node Nx, increases in the amount of communication in each of the ad-hoc networks Ai can be suppressed while the security and the robustness are maintained.

As described, the key setting method, the node, the server, and the network system according to the first to fourth embodiments can achieve reductions in the workload of the operator and in the work hours required for the encryption key setting operation for nodes in ad-hoc networks. Regardless of whether in the downstream type or the upstream type, the risk in the event of key leakage can be reduced and the efficiency of communication can be increased while the autonomy and the robustness of the ad-hoc networks are maintained after introduction of a new node.

The key setting method, the node, the server, and the network system improve efficiency in the setting operation of the encryption keys used by the nodes in the ad-hoc network and further enable risk in the event of key leakage to be reduced and efficiency to be improved while maintaining autonomy and robustness of the ad-hoc network after the introduction of a new node.

(Note 1) A key setting method executed by a node within communication ranges of a plurality of ad-hoc networks, the key setting method comprising:
receiving a plurality of encrypted packets encrypted by respective keys specific to gateways and broadcasted from the gateways in the ad-hoc networks;
detecting connection with a mobile terminal communicable with a server retaining the keys specific to the gateways in each ad-hoc network among the ad-hoc networks;
transmitting to the server when connection with the mobile terminal is detected, the encrypted packets via the mobile terminal;
receiving from the server via the mobile terminal, the keys that are specific to the gateways in the ad-hoc networks and that are for decrypting each encrypted packet among the encrypted packets; and
setting each of the received keys as a key to encrypt data that is to be encrypted in the node and decrypt data that is to be decrypted in the node.

(Note 2) The key setting method according to note 1, wherein
the receiving of the keys includes receiving from the server via the mobile terminal, a main key and a sub-key that are determined by the server from among the keys that are specific to the gateways in the ad-hoc networks and that are for decrypting each encrypted packet among the encrypted packets, and
the setting includes setting the main key as a key to encrypt the data that is to be encrypted and to decrypt the data that is to be decrypted, and setting the sub-key as the key to encrypt the data that is to be encrypted and to decrypt the data that is to be decrypted, when the data that is to be decrypted cannot be decrypted by the main key.

(Note 3) The key setting method according to note 2, wherein
the receiving of the keys includes receiving the main key and the sub-key that are determined based on a sequence in which the encrypted packets arrive at the server.

(Note 4) The key setting method according to note 2, wherein
the receiving of the keys includes receiving the main key and the sub-key that are determined based on a number of transfers of each encrypted packet among the encrypted packets acquired by the server.

(Note 5) The key setting method according to note 2, further comprising:
recording a sequence in which the encrypted packets arrive; and
determining based on the recorded sequence, a priority of each encrypted packet among the encrypted packets, wherein
the transmitting includes transmitting to the server, the priority of each encrypted packet, and
the receiving of the keys includes receiving the main key and the sub-key that are determined, by the server, based on the priority of each encrypted packet.

(Note 6) The key setting method according to note 2, further comprising:

recording a number of transfers of each encrypted packet among the encrypted packets; and determining based on the number of transfers of each encrypted packet, a priority of each encrypted packet, wherein the transmitting includes transmitting to the server, the priority of each encrypted packet, and the receiving of the keys includes receiving the main key and the sub-key that are determined, by the server, based on the priority of each encrypted packet.

(Note 7) A key setting method executed by a second node within only a communication range of a first node that is within communication ranges of a plurality of ad-hoc networks and has a key that is set as a main key and is specific to a given gateway in a given ad-hoc network among the ad-hoc networks and a plurality of keys that are respectively set as a sub-key and are respectively specific to gateways in other ad-hoc networks other than the given ad-hoc network and among the ad-hoc networks, the key setting process comprising:

receiving from the first node, a given encrypted packet encrypted using the main key and broadcast from the given gateway;

detecting connection with a mobile terminal communicable with a server retaining the keys respectively specific to the given gateway and the gateways in the other ad-hoc networks;

transmitting to the server when connection with the mobile terminal is detected, the given encrypted packet via the mobile terminal;

receiving from the server via the mobile terminal, the main key for decrypting the transmitted given encrypted packet; and setting the received main key as a key to encrypt data that is to be encrypted in the second node and to decrypt data that is to be decrypted in the second node.

(Note 8) A key setting method executed by a node within communication ranges of a plurality of ad-hoc networks, the key setting method comprising:

detecting connection with a mobile terminal communicable with a server connected to a gateway in each ad-hoc network among the ad-hoc networks;

broadcasting on the ad-hoc networks when connection with the mobile terminal is detected, an acquisition request for a key to encrypt data that is to be encrypted and to decrypt data that is to be decrypted;

receiving from the server via the mobile terminal, keys specific to gateways and respectively transmitted to the server from the gateways consequent to the broadcasted acquisition request being encrypted using the keys specific to the gateways in the ad-hoc networks and transferred to the gateways; and setting each of the received keys as the key to encrypt the data to be encrypted and to decrypt the data to be decrypted.

(Note 9) The key setting method according to note 8, further comprising receiving from the mobile terminal detected as being connected, a transmission instruction for the acquisition request, wherein the broadcasting includes broadcasting the acquisition request, when the transmission instruction is received.

(Note 10) The key setting method according to note 9, wherein the broadcasting includes broadcasting the acquisition request that includes an identifier of the mobile terminal by which the server identifies a communication destination included in the transmission instruction.

(Note 11) The key setting method according to note 9 or 10, wherein the broadcasting includes broadcasting the acquisition request that includes an identifier of the node by which the server identifies a node that has received transmission of the keys specific to the gateways.

(Note 12) The key setting method according to any one of notes 8 to 10, wherein the receiving of the keys includes receiving from the server via the mobile terminal, a main key and a sub-key that are determined by the server from among the keys that are specific to the gateways and transmitted to the server, and the setting includes setting the main key as the key to encrypt the data that is to be encrypted in the node and to decrypt the data that is to be decrypted in the node, and when the data that is to be decrypted cannot be decrypted by the main key, setting the sub-key as the key to encrypt the data that is to be encrypted and to decrypt the data that is to be decrypted.

(Note 13) A key setting method executed by a second node within only a communication range of a first node that is within communication ranges of a plurality of ad-hoc networks and has a key that is set as a main key and is specific to a given gateway in a given ad-hoc network among the ad-hoc networks and a plurality of keys that are respectively set as a sub-key and are respectively specific to gateways in other ad-hoc networks other than the given ad-hoc network and among the ad-hoc networks, the setting process comprising:

detecting connection with a mobile terminal communicable with a server connected to a gateway in each ad-hoc network among the ad-hoc networks;

broadcasting on the ad-hoc networks when connection with the mobile terminal is detected, an acquisition request for a key to encrypt data that is to be encrypted and to decrypt data that is to be decrypted;

receiving from the server via the mobile terminal, the main key transmitted to the server from the given gateway consequent to the broadcasted acquisition request being encrypted using the main key in the first node and transferred only to the given gateway among the gateways; and setting the received main key as the key to encrypt the data that is to be encrypted and to decrypt the data that is to be decrypted.

(Note 14) A node within communication ranges of a plurality of ad-hoc networks, the node comprising a processor configured to:

receive a plurality of encrypted packets encrypted by respective keys specific to gateways and broadcasted from the gateways in the ad-hoc networks;

detect connection with a mobile terminal communicable with a server retaining the keys specific to the gateways in each ad-hoc network among the ad-hoc networks;

transmit to the server when connection with the mobile terminal is detected, the encrypted packets via the mobile terminal;

receive from the server via the mobile terminal, the keys that are specific to the gateways in the ad-hoc networks and that are for decrypting each encrypted packet among the encrypted packets; and set each of the received keys as a key to encrypt data that is to be encrypted in the node and decrypt data that is to be decrypted in the node.

(Note 15) The node according to note 14, wherein the processor receives from the server via the mobile terminal, a main key and a sub-key that are determined by the server from among the keys that are specific to the gateways in the ad-hoc networks and that are for decrypting each encrypted packet among the encrypted packets, and the processor sets the main key as a key to encrypt the data that is to be encrypted and to decrypt the data that is to be decrypted, and sets the sub-key as the key to encrypt the data that is to be encrypted and to decrypt the data that is to be decrypted, when the data that is to be decrypted cannot be decrypted by the main key.

(Note 16) The node according to note 15, wherein the processor receives the main key and the sub-key that are determined based on a sequence in which the encrypted packets arrive at the server.

(Note 17) The node according to note 15, wherein the processor receives the main key and the sub-key that are determined based on a number of transfers of each encrypted packet among the encrypted packets acquired by the server.

(Note 18) The node according to note 15, the processor further configured to:

record a sequence in which the encrypted packets arrive; and determine based on the recorded sequence, a priority of each encrypted packet among the encrypted packets, wherein the processor transmits to the server, the priority of each encrypted packet, and the processor receives the main key and the sub-key that are determined, by the server, based on the priority of each encrypted packet.

(Note 19) The node according to note 15, the processor further configured to:

record a number of transfers of each encrypted packet among the encrypted packets; and determine based on the number of transfers of each encrypted packet, a priority of each encrypted packet, wherein the processor transmits to the server, the priority of each encrypted packet, and the processor receives the main key and the sub-key that are determined, by the server, based on the priority of each encrypted packet.

(Note 20) A second node within only a communication range of a first node that is within communication ranges of a plurality of ad-hoc networks and has a key that is set as a main key and is specific to a given gateway in a given ad-hoc network among the ad-hoc networks and a plurality of keys that are respectively set as a sub-key and are respectively specific to gateways in other ad-hoc networks other than the given ad-hoc network and among the ad-hoc networks, the second node comprising a processor configured to:

receive from the first node, a given encrypted packet encrypted using the main key and broadcast from the given gateway;

detect connection with a mobile terminal communicable with a server retaining the keys respectively specific to the given gateway and the gateways in the other ad-hoc networks;

transmit to the server when connection with the mobile terminal is detected, the given encrypted packet via the mobile terminal;

receive from the server via the mobile terminal, the main key for decrypting the transmitted given encrypted packet; and set the received main key as a key to encrypt data that is to be encrypted in the second node and to decrypt data that is to be decrypted in the second node.

(Note 21) A node within communication ranges of a plurality of ad-hoc networks, the node comprising a processor configured to:

detect connection with a mobile terminal communicable with a server connected to a gateway in each ad-hoc network among the ad-hoc networks;

broadcast on the ad-hoc networks when connection with the mobile terminal is detected, an acquisition request for a key to encrypt data that is to be encrypted and to decrypt data that is to be decrypted;

receive from the server via the mobile terminal, keys specific to gateways and respectively transmitted to the server from the gateways consequent to the broadcasted acquisition request being encrypted using the keys specific to the gateways in the ad-hoc networks and transferred to the gateways; and set each of the received keys as the key to encrypt the data to be encrypted and to decrypt the data to be decrypted.

(Note 22) The node according to note 21, the processor further configured to receive from the mobile terminal detected as being connected, a transmission instruction for the acquisition request, wherein the processor broadcasts the acquisition request, when the transmission instruction is received.

(Note 23) The node according to note 22, wherein the processor broadcasts the acquisition request that includes an identifier of the mobile terminal by which the server identifies a communication destination included in the transmission instruction.

(Note 24) The node according to note 22 or 23, wherein the processor broadcasts the acquisition request that includes an identifier of the node by which the server identifies a node that has received transmission of the keys specific to the gateways.

(Note 25) The node according to any one of notes 21 to 23, wherein the processor receives from the server via the mobile terminal, a main key and a sub-key that are determined by the server from among the keys that are specific to the gateways and transmitted to the server, and the processor sets the main key as the key to encrypt the data that is to be encrypted in the node and to decrypt the data that is to be decrypted in the node, and when the data that is to be decrypted cannot be decrypted by the main key, sets the sub-key as the key to encrypt the data that is to be encrypted and to decrypt the data that is to be decrypted.

(Note 26) A second node within only a communication range of a first node that is within communication ranges of a plurality of ad-hoc networks and has a key that is set as a main key and is specific to a given gateway in a given ad-hoc network among the ad-hoc networks and a plurality of keys that are respectively set as a sub-key and are respectively specific to gateways in other ad-hoc networks other than the given ad-hoc network and among the ad-hoc networks, the second node comprising a processor configured to:

detect connection with a mobile terminal communicable with a server connected to a gateway in each ad-hoc network among the ad-hoc networks;

broadcast on the ad-hoc networks when connection with the mobile terminal is detected, an acquisition request for a key to encrypt data that is to be encrypted and to decrypt data that is to be decrypted;

receive from the server via the mobile terminal, the main key transmitted to the server from the given gateway consequent to the broadcasted acquisition request being encrypted using the main key in the first node and transferred only to the given gateway among the gateways; and set the received main key as the key to encrypt the data that is to be encrypted and to decrypt the data that is to be decrypted.

(Note 27) A server comprising:
a storage unit that stores a key specific to a gateway in each ad-hoc network among a plurality of ad-hoc networks; and
a processor configured to:
receive via a mobile terminal connected to a node, a plurality of encrypted packets from the node that receives the encrypted packets that are encrypted by the keys specific to the gateways and broadcasted from the gateways;
extract from the storage unit and for each of the encrypted packets, a key correlated with the gateway that broadcasted the encrypted packet; and
transmit to the node, each extracted key via the mobile terminal.

(Note 28) The server according to note 27, the processor further configured to determine a main key and a sub-key from among of the extracted keys and based on a sequence in which the encrypted packets arrive at the server, wherein
the processor transmits to the node, the main key and the sub-key via the mobile terminal.

(Note 29) The server according to note 27, the processor further configured to determine a main key and a sub-key from among the extracted keys and based on a number of transfers of each of the encrypted packets, in the ad-hoc network of the gateway that broadcasted the encrypted packet, wherein
the processor transmits to the node, the main key and the sub-key via the mobile terminal.

(Note 30) The server according to note 27, the processor further configured to determine a main key and a sub-key from among the extracted keys and based on priority determined, by the node, for each of the encrypted packets, wherein
the processor transmits to the node, the main key and the sub-key via the mobile terminal.

(Note 31) The server according to note 30, wherein
the processor determines the main key and the sub-key from among the extracted keys and based on the priority determined for each of the encrypted packets based on a sequence in which the encrypted packets arrive at the node.

(Note 32) The server according to note 30, wherein
the processor determines the main key and the sub-key from among the extracted keys and based on the priority determined for each of the encrypted packets based on a number of transfers of each of the encrypted packets, in the ad-hoc network of the gateway that broadcasted the encrypted packet.

(Note 33) A server connected to a gateway in each ad-hoc network among a plurality of ad-hoc networks, the server comprising
a processor configured to:
receive from the gateways, keys specific to the gateways; and
transmit to a node, the received keys via a mobile terminal connected to the node that broadcasts on the ad-hoc networks, an acquisition request for a key to encrypt data that is to be encrypted and to decrypt data that is to be decrypted.

(Note 34) The server according to note 33, the processor further configured to determine a main key and a sub-key from among the keys and based on a sequence in which the received keys arrive, wherein
the processor transmits to the node, the main key and the sub-key via the mobile terminal.

(Note 35) The server according to note 33, the processor further configured to determine a main key and a sub-key from among the keys and based on a reception count for each of the received keys, wherein
the processor transmits to the node, the main key and the sub-key via the mobile terminal.

(Note 36) A network system comprising a node within communication ranges of a plurality of ad-hoc networks, and a server communicable with the ad-hoc networks and having a storage unit that stores a key specific to a gateway in each ad-hoc network among the ad-hoc networks, wherein
the node comprises a processor configured to:
receive a plurality of encrypted packets encrypted by the keys respectively specific to the gateways and broadcasted from the gateways in the ad-hoc networks,
detect connection with a mobile terminal communicable with the server,
transmit to the server when connection with the mobile terminal is detected, the encrypted packets via the mobile terminal,
receive from the server via the mobile terminal, the keys that are specific to the gateways in the ad-hoc networks and that are for decrypting each encrypted packet among the encrypted packets, and
set each of the received keys as a key to encrypt data that is to be encrypted in the node and decrypt data that is to be decrypted in the node; and
the serve comprises a processor configured to:
receive via a mobile terminal connected to the node, the encrypted packets transmitted by the node,
extract from the storage unit and for each of the received encrypted packets, a key correlated with the gateway that broadcasted the encrypted packet, and
transmit to the node, each extracted key via the mobile terminal.

(Note 37) A network system comprising node within communication ranges of a plurality of ad-hoc networks, and a server connected to a gateway in each ad-hoc network among the ad-hoc networks, wherein
the node comprises a processor configured to:
detect connection with a mobile terminal communicable with the server,
broadcast on the ad-hoc networks when connection with the mobile terminal is detected, an acquisition request for a key to encrypt data that is to be encrypted and to decrypt data that is to be decrypted,
receive from the server via the mobile terminal, keys specific to the gateways and respectively transmitted to the server from the gateways consequent to the broadcasted acquisition request being encrypted using the keys specific to the gateways in the ad-hoc networks and transferred to the gateways, and
set each of the received keys as the key to encrypt the data to be encrypted and to decrypt the data to be decrypted; and
the server comprises a processor configured to:
receive from the gateways, the keys specific to the gateways, and
transmit to the node, the received keys via the mobile terminal connected to the node.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A key setting method executed by a node within communication ranges of a plurality of ad-hoc networks, the key setting method comprising:
    receiving a plurality of encrypted packets encrypted by respective keys specific to gateways and broadcasted from the gateways in the ad-hoc networks;
    detecting connection with a mobile terminal communicable with a server retaining the keys specific to the gateways in each ad-hoc network among the ad-hoc networks;
    transmitting to the server when connection with the mobile terminal is detected, the encrypted packets via the mobile terminal;
    receiving from the server via the mobile terminal, the keys that are specific to the gateways in the ad-hoc networks and that are for decrypting each encrypted packet among the encrypted packets; and
    setting each of the received keys as a key to encrypt data that is to be encrypted in the node and decrypt data that is to be decrypted in the node.

2. The key setting method according to claim 1, wherein
    the receiving of the keys includes receiving from the server via the mobile terminal, a main key and a sub-key that are determined by the server from among the keys that are specific to the gateways in the ad-hoc networks and that are for decrypting each encrypted packet among the encrypted packets, and
    the setting includes setting the main key as a key to encrypt the data that is to be encrypted and to decrypt the data that is to be decrypted, and setting the sub-key as the key to encrypt the data that is to be encrypted and to decrypt the data that is to be decrypted, when the data that is to be decrypted cannot be decrypted by the main key.

3. The key setting method according to claim 2, wherein
    the receiving of the keys includes receiving the main key and the sub-key that are determined based on a sequence in which the encrypted packets arrive at the server.

4. The key setting method according to claim 2, wherein
    the receiving of the keys includes receiving the main key and the sub-key that are determined based on a number of transfers of each encrypted packet among the encrypted packets acquired by the server.

5. The key setting method according to claim 2, further comprising:
    recording a sequence in which the encrypted packets arrive; and
    determining based on the recorded sequence, a priority of each encrypted packet among the encrypted packets, wherein
    the transmitting includes transmitting to the server, the priority of each encrypted packet, and
    the receiving of the keys includes receiving the main key and the sub-key that are determined, by the server, based on the priority of each encrypted packet.

6. The key setting method according to claim 2, further comprising:
    recording a number of transfers of each encrypted packet among the encrypted packets; and
    determining based on the number of transfers of each encrypted packet, a priority of each encrypted packet, wherein
    the transmitting includes transmitting to the server, the priority of each encrypted packet, and
    the receiving of the keys includes receiving the main key and the sub-key that are determined, by the server, based on the priority of each encrypted packet.

7. A node within communication ranges of a plurality of ad-hoc networks, the node comprising
    a processor configured to:
        receive a plurality of encrypted packets encrypted by respective keys specific to gateways and broadcasted from the gateways in the ad-hoc networks;
        detect connection with a mobile terminal communicable with a server retaining the keys specific to the gateways in each ad-hoc network among the ad-hoc networks;
        transmit to the server when connection with the mobile terminal is detected, the encrypted packets via the mobile terminal;
        receive from the server via the mobile terminal, the keys that are specific to the gateways in the ad-hoc networks and that are for decrypting each encrypted packet among the encrypted packets; and
        set each of the received keys as a key to encrypt data that is to be encrypted in the node and decrypt data that is to be decrypted in the node.

8. The node according to claim 7, wherein
    the processor receives from the server via the mobile terminal, a main key and a sub-key that are determined by the server from among the keys that are specific to the gateways in the ad-hoc networks and that are for decrypting each encrypted packet among the encrypted packets, and
    the processor sets the main key as a key to encrypt the data that is to be encrypted and to decrypt the data that is to be decrypted, and sets the sub-key as the key to encrypt the data that is to be encrypted and to decrypt the data that is to be decrypted, when the data that is to be decrypted cannot be decrypted by the main key.

9. The node according to claim 8, wherein
    the processor receives the main key and the sub-key that are determined based on a sequence in which the encrypted packets arrive at the server.

10. The node according to claim 8, wherein
    the processor receives the main key and the sub-key that are determined based on a number of transfers of each encrypted packet among the encrypted packets acquired by the server.

11. The node according to claim 8, the processor further configured to:
    record a sequence in which the encrypted packets arrive; and
    determine based on the recorded sequence, a priority of each encrypted packet among the encrypted packets, wherein
    the processor transmits to the server, the priority of each encrypted packet, and
    the processor receives the main key and the sub-key that are determined, by the server, based on the priority of each encrypted packet.

12. The node according to claim 8, the processor further configured to:
    record a number of transfers of each encrypted packet among the encrypted packets; and
    determine based on the number of transfers of each encrypted packet, a priority of each encrypted packet, wherein the processor transmits to the server, the priority of each encrypted packet, and the processor receives the main key and the sub-key that are determined, by the server, based on the priority of each encrypted packet.

13. A server comprising:

a storage unit that stores a key specific to a gateway in each ad-hoc network among a plurality of ad-hoc networks; and a processor configured to:

receive via a mobile terminal connected to a node, a plurality of encrypted packets from the node that receives the encrypted packets that are encrypted by the keys specific to the gateways and broadcasted from the gateways;

extract from the storage unit and for each of the encrypted packets, a key correlated with the gateway that broadcasted the encrypted packet; and transmit to the node, each extracted key via the mobile terminal.

14. The server according to claim 13, the processor further configured to determine a main key and a sub-key from among of the extracted keys and based on a sequence in which the encrypted packets arrive at the server, wherein the processor transmits to the node, the main key and the sub-key via the mobile terminal.

15. The server according to claim 13, the processor further configured to determine a main key and a sub-key from among the extracted keys and based on a number of transfers of each of the encrypted packets, in the ad-hoc network of the gateway that broadcasted the encrypted packet, wherein the processor transmits to the node, the main key and the sub-key via the mobile terminal.

16. The server according to claim 13, the processor further configured to determine a main key and a sub-key from among the extracted keys and based on priority determined, by the node, for each of the encrypted packets, wherein the processor transmits to the node, the main key and the sub-key via the mobile terminal.

17. The server according to claim 16, wherein the processor determines the main key and the sub-key from among the extracted keys and based on the priority determined for each of the encrypted packets based on a sequence in which the encrypted packets arrive at the node.

18. The server according to claim 16, wherein the processor determines the main key and the sub-key from among the extracted keys and based on the priority determined for each of the encrypted packets based on a number of transfers of each of the encrypted packets, in the ad-hoc network of the gateway that broadcasted the encrypted packet.

* * * * *